United States Patent [19]

El-Gohary et al.

[11] 4,456,956
[45] Jun. 26, 1984

[54] METHOD AND APPARATUS FOR CONTROLLING ACCESS OF A NETWORK TRANSMISSION BUS BETWEEN A PLURALITY OF SPACED APART COMPUTER STATIONS

[75] Inventors: Hussein T. El-Gohary, Harvard; Gary P. Vaillette, Marlboro; Keith F. Nelson, Chestnut Hill, all of Mass.

[73] Assignee: Data General Corp., Westboro, Mass.

[21] Appl. No.: 295,537

[22] Filed: Aug. 24, 1981

[51] Int. Cl.³ .............................................. G06F 3/04
[52] U.S. Cl. ...................................... 364/200; 370/85
[58] Field of Search ... 364/200 MS File, 900 MS File; 370/85; 340/825

[56] References Cited

U.S. PATENT DOCUMENTS

| | | | |
|---|---|---|---|
| 3,810,100 | 5/1974 | Hungerford et al. | 364/900 |
| 4,128,883 | 12/1978 | Duke et al. | 364/200 |
| 4,161,786 | 7/1979 | Hopkins et al. | 370/85 |
| 4,170,038 | 10/1979 | Bouvier et al. | 364/200 |
| 4,245,299 | 1/1981 | Words et al. | 364/200 |
| 4,281,380 | 7/1981 | De Mesa et al. | 370/85 |
| 4,335,426 | 6/1982 | Manwell et al. | 364/200 |

*Primary Examiner*—Eddie P. Chan
*Attorney, Agent, or Firm*—Jacob Frank; Joel Wall; Irving M. Kriegsman

[57] ABSTRACT

A computer network is disclosed in which a plurality of computer stations are interconnected by a single bi-directional bus and wherein access to the bus is controlled by the computer stations themselves through an adapter unit at each station. Each adapter unit includes a microcontroller, a transmitter, a receiver, a send buffer, a receive buffer, a line activity indicator, a pulse producing device, a read circuit and a write circuit. Each adapter unit has a unique assigned number. When the network is running and stable, control of the bus is continually passed from one live adapter unit to another in numerical sequence according to its unique assigned number and the bus is active with messages, control signals or status signals separated by relatively short intervals. If only one adapter unit is live, control is continually passed to itself. If an adapter unit in control attempts to access another adapter unit to send data to it and the other adapter unit is unable to comply with the request because its buffers are full, the numerical control passing sequence is temporarily interrupted and control is passed out of turn to that other adapter unit so that it can unload its buffers. After the buffers are unloaded, control is then passed back to the adapter unit from which it received control and the normal passing sequence is resumed. If the bus is inactive for a certain time interval, all adapter units detecting this condition enter an election mode to elect from amongst themselves one adapter unit to assume control and resume activity.

20 Claims, 63 Drawing Figures

CLOCK GENERATION CIRCUIT

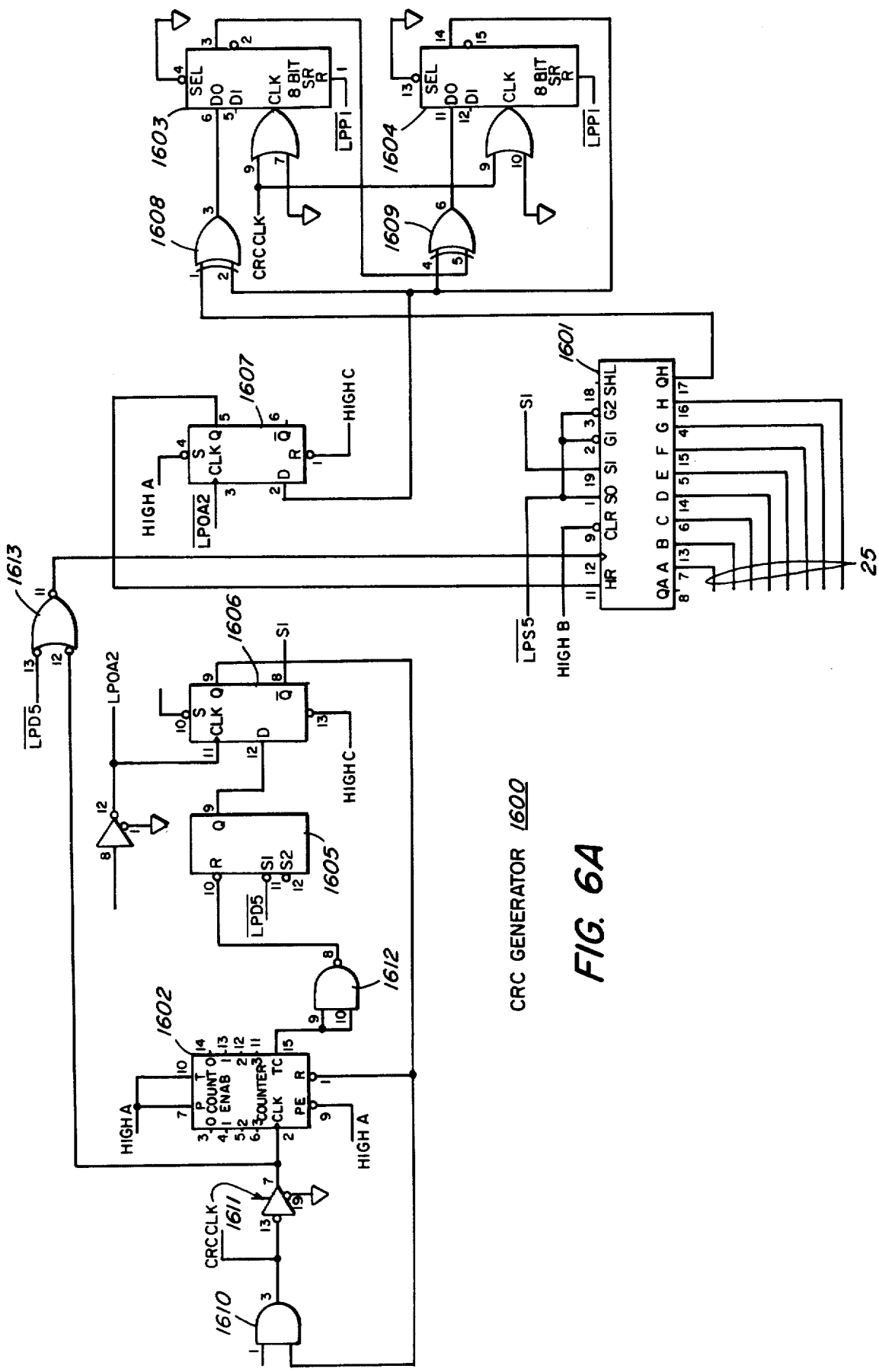
FIG. 6A  CRC GENERATOR 1600

[SELF TEST]

[SELF TEST]

[SELF TEST]

[SELF TEST]

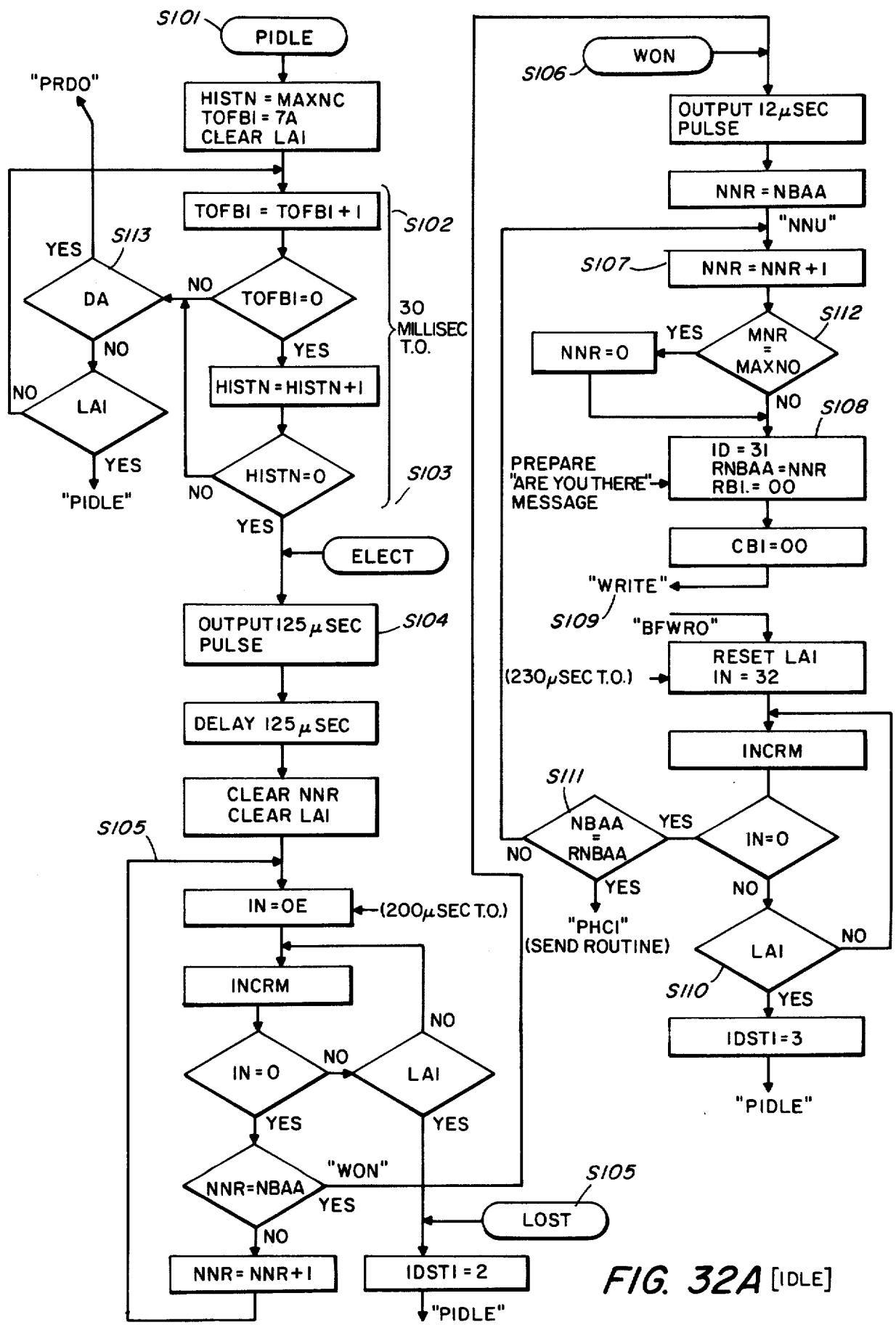
FIG. 32A [IDLE]

[IDLE]

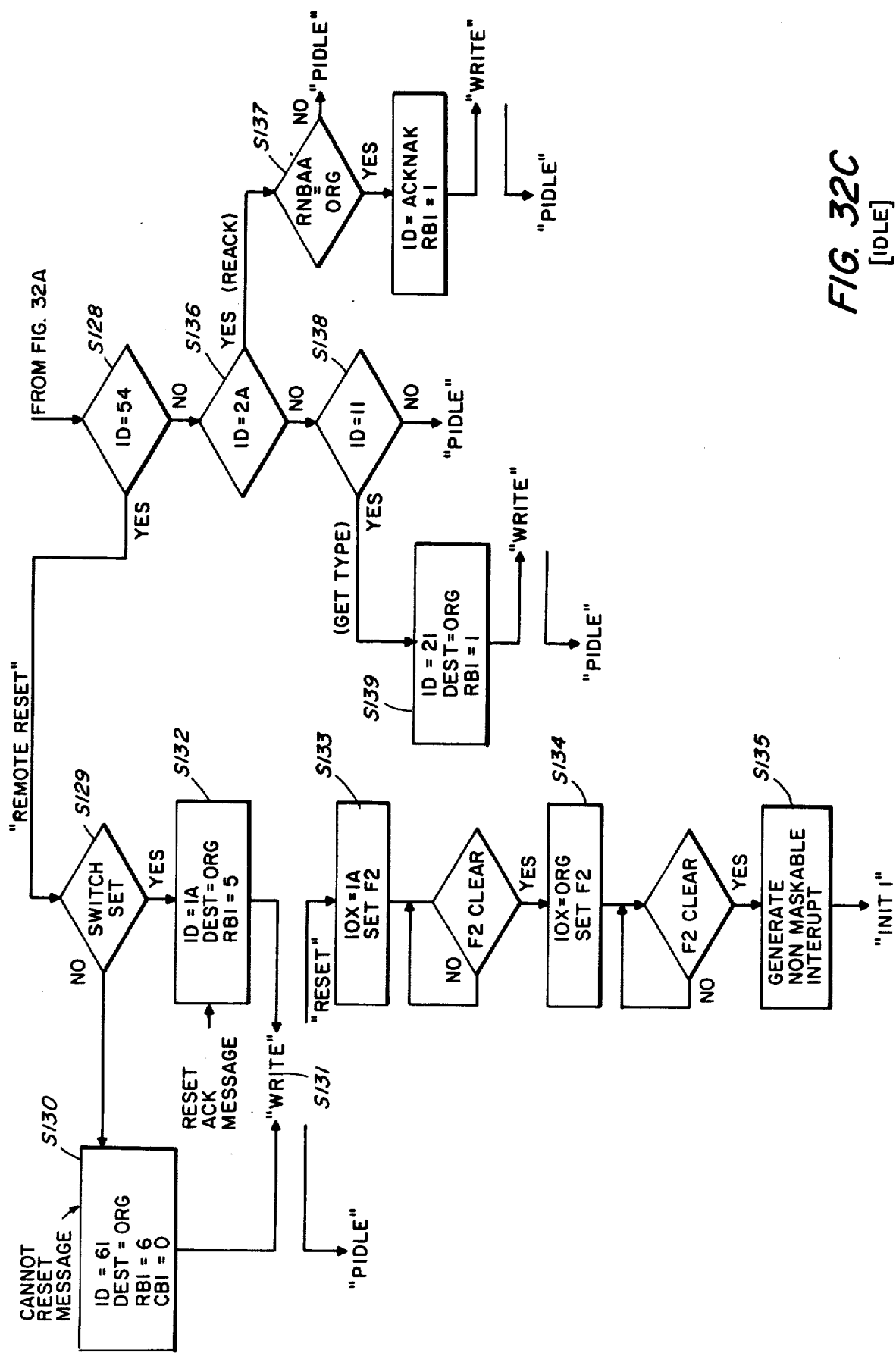
FIG. 32C [IDLE]

[SEND]

[SEND]

[SEND]

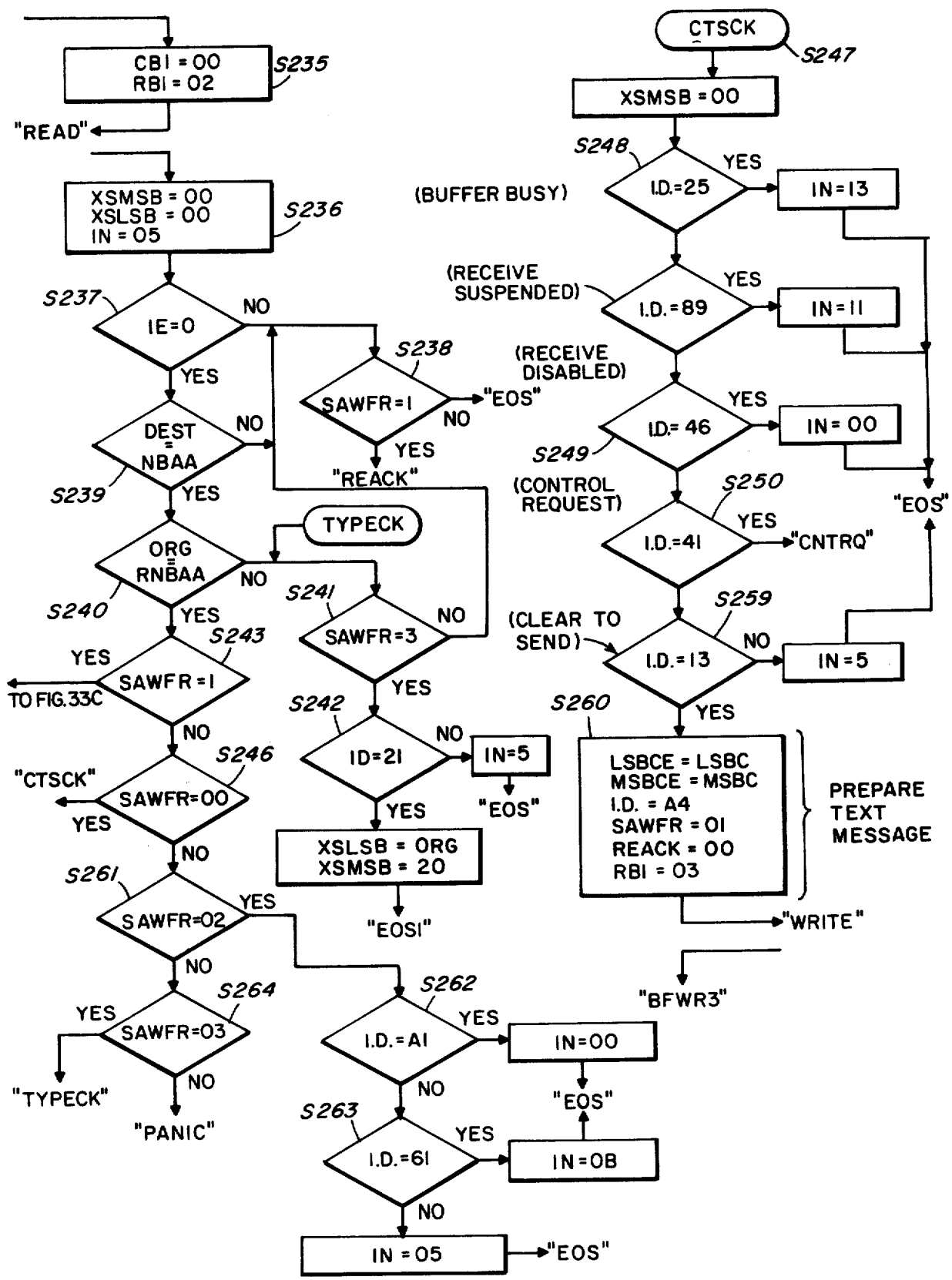
FIG. 33D [SEND]

[SEND]

[SEND]

[WRITE]

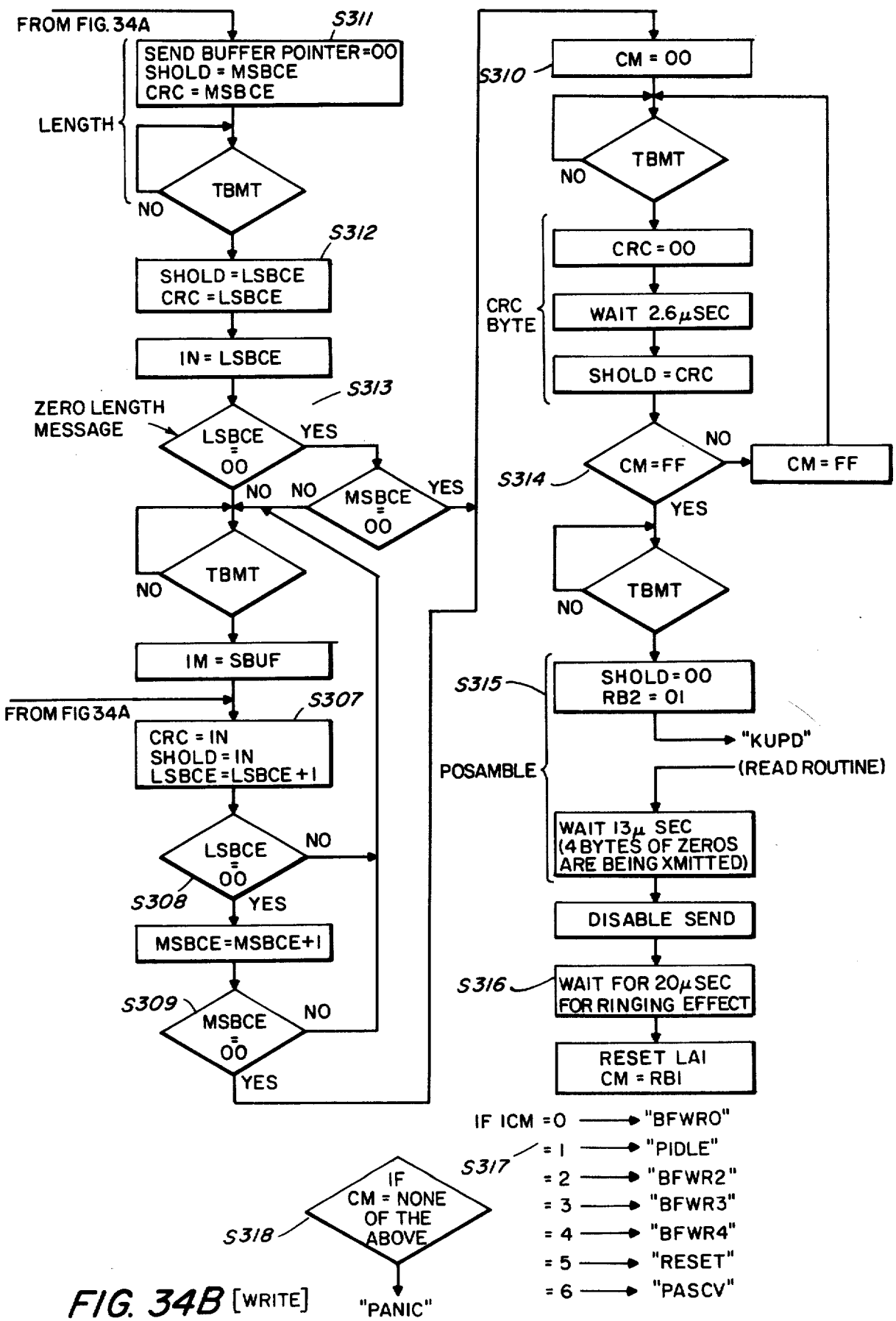
FIG. 34B [WRITE]

[RECEIVE]

[RECEIVE]

[READ]

[READ]

[READ]

METHOD AND APPARATUS FOR CONTROLLING ACCESS OF A NETWORK TRANSMISSION BUS BETWEEN A PLURALITY OF SPACED APART COMPUTER STATIONS

CROSS-REFERENCE TO RELATED APPLICATIONS

This application is a related application to copending U.S. patent application Ser. No. 150,713 to Hussein El Gohary, filed on May 19, 1980, now U.S. Pat. No. 4,387,425, and assigned the assignee of this application. U.S. patent application Ser. No. 150,713 is incorporated herein by reference.

BACKGROUND OF THE INVENTION

The present invention relates generally to computer networks and more particularly to computer networks of the type in which a plurality of geographically dispersed computer stations are interconnected for inter-station communications by a single bi-directional bus.

In recent years a number of different types of computer networks have been proposed and in some cases actually implemented wherein a plurality of geographically dispersed computers stations are interconnected either for communication purposes, for collectively performing system tasks from different locations or for sharing a data storage facility at one of the computer stations. If the network is one in which computer stations are relatively close, that is, within around one kilometer from each other, the network is often called a local computer network.

In one type of local computer network, the computer stations are interconnected by a single bi-directional bus which is used by the stations in a message or packet switching mode. Some of the advantages of the single bi-directional bus type network are its low cost, its overall simplicity and its capability for easily adding or removing computer stations when desired or required. In the single bi-directional bus type network, all station-to-station communications, including status and control signals, take place over the bus. A message can be sent by any computer station connected to the bus and can be received by every other computer station connected to the bus. Only one message, however can be transmitted over the bus at one time. If two or more computer stations attempt to send messages over the bus at the same time, the messages will collide and be lost. Also the colliding messages may create a new message which is different from all of the original messages. The new message may be received by an intended recipient of one of the original messages or even by a computer station that was not intended to be a recipient of any of the original messages. Therefore, in the operation of a single bi-directional bus network it is necessary that access to the bus be controlled.

A number of different techniques have been devised for controlling access to the bus in a single bi-directional bus network. As far as is known, however, no technique has been devised which is completely reliable, as far as performance is concerned.

In one prior art technique, known as the selection technique, a computer station may access the bus only when it has been signalled that it is its turn to do so. In one class of networks using this technique, the signals placing the computer station in control are generated by a central controller unit and then sent to the various computer stations either by a daisy chaining arrangement, by a polling arrangement or by an arrangement known as independent requests. In another class of networks using this technique, there is no central controller unit. Instead, the control logic is distributed evenly among the computer stations. The control signals which are generated by the computer stations are sent from one to the other by daisy chaining, by polling or by independent requests. The main problem with the selection technique for controlling access is that the network is completely dependent on the operation of one unit. If the network includes a central controller unit and the central controller unit fails, the network becomes inoperative. If the network does not contain a central controller unit and the computer station in temporary control fails, the network becomes inoperative.

In another prior art technique known as the random access technique, a computer station desiring to access the bus does not have to wait until it is placed in control but simply monitors the bus for activity. If there is activity, the computer station waits. If there is no activity for a predetermined time interval, the computer station assumes the bus is clear and transmits its message. The problem with this technique is that, because of the axiomatic relationship between time and space that "one cannot be in more than one place at a given point in time", two (or more) computer stations can arrive at the same conclusion at the same time and access the bus simultaneously. When this happens, the two messages will collide and be lost. Thus, although the system is masterless it is not collission free. An example of a system employing the random access technique may be found in U.S. Pat. No. 4,063,220 to R. M. Metcalfe et al.

In still another prior art technique known as the reservation technique, a computer station desiring to transmit a message places a request to do so and then receives a future reserved time during which it may transmit its message. The main problems with this technique are that it is dependent on the operation of the unit through which the requests must be made and is relatively slow.

As can be appreciated, the selection technique suffers in that the network operation is dependent on one unit for continuous operation, the random acces technique suffers in that it is subject to collision situations and the reservation technique suffers in that it is relatively slow and that the network is dependent on one unit for continuous operation.

A more detailed discussion of the above techniques may be found in an article entitled Global Bus Computer Communications Techniques by E. C. Luczak appearing in the January 1978, I.E.E.E., pages 58–62.

For many proposed or actual applications, a single bus network is needed which does not merely eliminate or reduce one shortcoming at the expense of creating another but rather does not possess any of the aforementioned problems or limitations. The present invention provides such a network.

Accordingly, it is an object of this invention to provide a new and improved computer network.

It is another object of this invention to provide a new and improved computer network of the type in which a plurality of computer stations are interconnected by a single bus.

It is another object of this invention to provide a computer network in which a plurality of computer stations are interconnected by a single bus and wherein access to the bus is controlled by a scheme that is completely reliable.

It is still another object of this invention to provide a computer network in which a plurality of computer stations are interconnected by a single bus and wherein access to the bus is controlled by a scheme which is not dependent on the operation of a central controller unit or a master computer station and is not subject to collision situations.

It is another object of this invention to provide a novel scheme for enabling a plurality of computer stations connected to a single bus to decide amongst themselves which computer station should assume control of the bus.

It is still another object of this invention to provide an adapter unit for connecting a computer at computer station to a single bi-directional network transmission bus and controlling its access to the bus.

It is yet still another object of this invention to provide a new and improved phase locked loop circuit.

It is a further object of this invention to provide a computer network in which a plurality of computer stations are interconnected by a single bus and wherein access to the bus is controlled by the computer stations themselves by a technique which involves continually passing control from one computer station to the next.

It is still a further object of this invention to provide computer network as described above in which the control passing technique is arranged to prevent traffic jams at those computer stations which handle more network traffic than other computer stations.

It is yet still a further object of this invention to provide a novel method for enabling a plurality of computer stations interconnected by a single bus to share access to the bus in a masterless and contentionless fashion.

It is another object of this invention to provide a method as described above wherein access to the bus is controlled by the computer stations themselves by a technique which involves passing control from one computer station to another in a manner which enables each computer station to acquire control and which avoids traffic jams at computer stations having heavier network traffic than other computer stations.

It is a further object of this invention to provide a computer network as described above wherein a computer at one computer station can find out the type of computer present at another computer station.

SUMMARY OF THE INVENTION

A computer network constructed according to this invention includes a single bi-directional bus and a plurality of computer stations. Each computer station includes a computer and an adapter unit with the adapter unit being connected in series between the bus and the computer. Each adapter unit includes a means for storing a unique number indicating its own address, means for storing a unique number indicating the address of a next adapter unit to which control is to be passed, means responsive to the operation of said adapter unit for generating a control pass signal for passing control to said next adapter unit, means responsive to the operation of said adapter unit for sensing if an adapter unit to which control has been passed has control, means for generating a request to access signal to any one of said other adapter units in order to send or receive data, means responsive to a request to access signal received from another adapter unit for generating a first reply signal for accepting said request if said adapter unit is able to accept said request, means responsive to a request signal received from another adapter unit for generating a second reply signal indicating it is unable to accept said request, and means responsive to said second reply signal for generating a special control pass signal for passing control to said adapter unit generating said second reply signal.

The method of passing control from one adapter unit to another according to this invention includes storing in each adapter unit a unique number indicating its own address, storing in each adapter unit a unique number indicating the address of a next adapter unit to which control is to be passed, generating in the operation of said adapter unit a control pass signal for passing control to said next adapter unit, sensing if an adapter unit to which control has been passed has received control, generating a request to access signal to any other adapter unit to send or receive data, generating a first reply signal for accepting said request to access if said adapter unit is able to accept said request and responding thereto, generating a second reply signal indicating it is unable to accept said request to access, and generating a special control pass signal for passing control to said adapter unit generating said second reply signal.

BRIEF DESCRIPTION OF THE DRAWINGS

While the novel features of this invention are set forth with particularity in the appended claims, the invention both as to organization and content will be better understood and appreciated along with other objects and features thereof from the following detailed description taken in conjunction with the drawings in which like reference numerals represent like parts and wherein:

FIG. 6A is a schematic diagram of the CRC generator shown in the adapter unit in FIG. 2;

FIGS. 32A, 32B and 32C is a system flow chart for the IDLE subroutine;

FIGS. 33A, 33B, 33C, 33D, 33E and 33F is a system flow chart for the SEND subroutine;

FIGS. 34A and 34B is a system flow chart for the WRITE subroutine;

DETAILED DESCRIPTION OF PREFERRED EMBODIMENTS

Introduction

Figure 1:
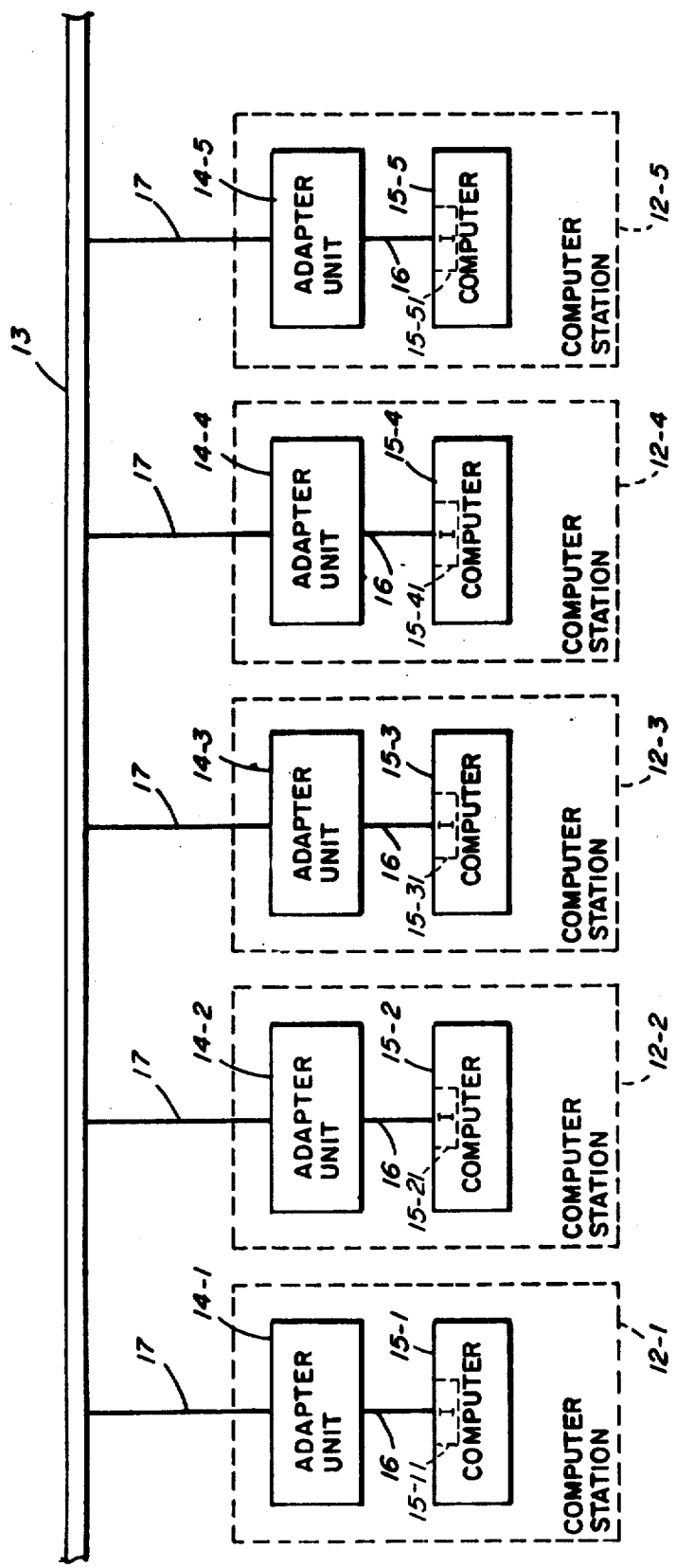
FIG. 1 is a block diagram of a computer network configured according to the teachings of this invention.

The present invention is directed to a computer network which a plurality of geographically dispersed computer stations are inteconnected by a single bi-directional bus which is used by the computer stations to transmit messages, control signals and status signals and wherein access to the bus is controlled by the computer stations themselves through an adapter unit located at each computer station. The adapter units collectively engage in a process by which one, and only one, member of the communicating group is selected to assume control over the bus. At all times, the absence of control over the bus triggers the selection of an adapter unit to assume control. The outcome of the selection process is 100% certain.

The computer network is both masterless and contentionless. The network is masterless in the sense that it does not involve the use of a central controller unit and is not dependent at any time on the operation of any one particular adapter unit for continuous operation. The network is contentionless in the sense that at no time will two or more adapter units access the bus simultaneously to send messages.

In addition to coordinating access to the bus, each adapter unit also serves as an interface between the bus and the computer located at its computer station.

The adapter units control access to the bus in the following manner.

Each adapter unit is assigned a unique number.

When the network is running and stable, control of the bus is continually passed from one live adapter unit to another in numerical sequence; each adapter unit passing control to the adapter unit having the next highest assigned number and the adapter unit with the highest assigned number passing control to the adapter unit with the lowest assigned number. An adapter unit obtaining control in this manner is considered as having "normal" control. If, however, an adapter unit in control of the bus attempts to access another adapter unit in order to send data to it and the other adapter unit is unable to comply with the request because both of its buffers are full, the numerical passing sequence is temporarily interrupted and control is passed directly (out of turn) to that adapter unit so that it can unload its buffers. An adapter unit obtaining control in this manner is considered as having "special" control. After the adapter unit utilizes the "special" control, the control is passed back to the adapter unit from which it received control and the "normal" control passing sequence is resumed. Polls are periodically taken by the live adapter units to determine which adapter units connected to the bus are powered up and then to make changes, if needed, in the control passing arrangement so that each adapter unit can acquire control in turn. If only one adapter unit is live, control is continually passed to itself. While an adapter unit is in control, it is either transmitting messages status signals or control signals over the bus which are separated by relatively short itme intervals and the bus is thus continually active.

If, for any reason, the bus would become inactive for more than a predetermined time interval, all adapter units detecting this condition enter an election mode to decide amongst themselves which adapter unit should acquire control and resume activity. The absence of activity may be the result of a failure of an adapter unit while it is in control or may be the result of simply powering up the network either for the first time or after a total power failure. In the election, each participating adapter unit sends a pulse over the bus and then monitors the bus for a time period directly proportional to its unique number. If a participating adapter unit detects activity before the expiration of its particular monitoring period it has lost the election. If a non-participating adapter unit detects the pulse sent by any participating adapter unit before the expiration of the predetermined time interval it does not become a participant since it has not met the basic requirement for taking part in the election. The first participating adapter unit that does not detect activity during its particular monitoring period is the winner of the election and sends another pulse out over the bus which causes all remaining participating adapter units to detect activity before the expiration of their respective time periods and become losers in the election. As can be appreciated, the winner of the election is always the participating adapter unit having the smallest assigned number since that adapter unit will have the shortest time period in which to monitor the bus for inactivity. As can be further appreciated, there is always only one winner since the second pulse causes all other participating adapter units to become losers.

After the adapter unit that has won the election assumes control over the bus it initiates a configuration cycle to determine the assigned numbers of all live adapter units.

As can be appreciated, the scheme is not dependent on the operation of any individual computer station or central controller unit and is not subject to collision situations. In addition the scheme prevents traffic bottlenecks at adapter units having proportionately larger amounts of network traffic by enabling such adapter units to acquire control out of turn, when needed.

Each adapter unit includes an address store for holding its unique assigned number, a line activity indicator for monitoring the bus for activity, a timer for measuring time and a device for causing pulses to be emitted over the bus in the election procedure. Each adaptor unit also includes microcontroller for controlling the operations of the adaptor unit and interface circuitry for processing data received from the bus into a form suitable for processing by its associated computer and for processing data received from its associated computer to a form suitable for transmission over the bus. Included in the microcontroller is a memory for storing information such as the address of the live adapter unit having the next highest number and the type of the computer to which the adapter unit is coupled.

The basic rules of the protocol by which control is passed from one adapter unit to another are as follows:

1. Each adapter unit is assigned a different number.
2. Only an adapter unit designated by the network as having control of the bus can initiate a transmission of data.
3. Data message flow control from one adapter unit to another is based on the negotiation of each data message transfer using a selection and acknowledgement/rejection mechanism. Data transfer error recovery is based on receiver acknowledgement with a transmitter reply timeout and limited retry mechanism.
4. While an adapter unit is in control, it must either send a message or status or control signals.
5. After a transmission, the adapter unit in control passes control to the live adapter unit having the next highest number, or in the case of the adapter unit with the highest number to the adapter unit with the lowest number.
6. If a transmission cannot be made to or from another adapter unit because it is "busy"(i.e. both of its buffers are full), control is passed to that other adapter unit out of turn so that it can unload its buffers. Control is then returned to the adapter unit from which it received control.
7. Polls are conducted periodically by the adapter units to accommodate adapter units leaving and coming on to the bus.
8. If only one adapter unit is live, control is continually passed to itself for a predetermined number of time. Then a signal is sent out over the bus to see if there are newcomers. If there are not, the adapter passes control again to itself for a predetermined number of times etc.
9. While an adapter unit is in control, it can establish a data link beteen itself and other adapter units if instructed by its computer to do so.
10. If activity ceases on the bus for a certain length of time, an election is held by the adapter units detecting this condition to select one and only one adapter unit to acquire control.

THE ELECTION PROCEDURE

The particular period of time over which there must be inactivity over the bus to prompt an election is expressed by the formula:

$$T_i \geq N \times \Delta$$

where:

$T_i$ = the time interval of inactivity;

N = the maximum number of computer stations that can be handled by the bus;

$\Delta = 2\lambda$;

$\lambda = 1/v$;

l = the largest distance between any two computer stations connected to the bus; and v = the propogation speed of electric waves over the bus.

Inactivity may be caused on the bus for any reason, such as initial power up, power up after a power failure or failure of a computer station while it is in control. Whatever the cause, whenever there is inactivity on the bus for a time interval $T_i$ (or greater), all adapter units recognizing this condition enter into an election mode.

In the election mode, each adapter unit that has measured inactivity for a time interval $T_i$, becomes a participant and sends a single pulse $P_a$ out over the bus. Any adapter unit detecting a pulse $P_a$ before its own time period $T_i$ has expired does not take part in the election since it has not observed inactivity for the necessary time interval. The width of pulse $P_a$ is made at least equal to $\lambda$ to insure that any pulses emitted by participants subsequent to the first participant, After sending a pulse $P_a$ out over the bus, each participating adapter unit monitors the bus for activity over a time interval $T_b$, where:

$T_b = \Delta \times n$; and $n$ = The assigned unique number of the particular adapter unit.

If an adapter unit detects activity before its particular monitoring period has expired, it has lost the election. The first adapter unit whose time period $T_b$ expires without detecting activity on the bus is the winner of the election and sends another pulse $P_b$ out over the bus. Pulse $P_b$ causes all remaining adapter units to detect activity before the expiration of their respective time periods $T_b$ and thus also become losers in the election. Thus, the adapter unit sending out the second pulse $P_b$ is the sole winner. As can be appreciated, the winner will always be the adapter unit having the lowest number N. The width of pulse $P_b$ is a matter of choice.

For example, if the maximum number of computer stations that can be connected to the bus is sixteen and, if, there are in fact five computer stations connected in the network the assigned numbers of the logic units in the computer stations are 2,5,6,7 and 11, the distance between the furthest two of the sixteen computer stations is one kilometer and the propogation speed of electric waves over the bus is $2 \times 10^{10}$ cm/sec then:

$T_a = 160$ microseconds;
$N = 16$;
$\lambda = 5$ microseconds;
$\Delta = 10$ microseconds;
$1 = 100,000$ cm.;
$v = 2 \times 10^{10}$ cm/sec.
$P_a = 5$ microseconds; and
$T_b = 20$ microseconds for adapter unit number 2;
$T_b = 50$ microseconds for adapter unit number 5;
$T_b = 60$ microseconds for adapter unit number 6;
$T_b = 70$ microseconds for adapter unit number 7 and;
$T_b = 110$ microseconds for adapter unit number 11.

BASIC SYSTEM

Referring now to FIG. 1, there is illustrated a computer network constructed according to the teachings of this invention and identified generally by reference numberal 11.

Computer network 11 includes a plurality of spatially dispersed computer stations or nodes 12 individually labelled 12-1, 12-2, 12-3, 12-4, and 12-5; the particular number of computer stations shown being for illustrative purposes only. Computer stations 12 are interconnected by a single bi-directional communications channel 13 which may be in the form of a coaxial cable or a twisted pair of wires or an optical link or a radio transmission channel. In the embodiment shown, channel 13 is a length of coaxial cable terminating at either end in suitable impedance matching devices (not shown) such as resistors which are selected to limit reflections.

Each node or computer station includes an adapter unit 14 and a computer 15; the adapter units 14 being individually labelled 14-1, 14-2, 14-3, 14-4 and 14-5 and the computers 15 being individually labelled 15-1, 15-2, 15-3, 15-4 and 15-5. Each computer 15 is connected to its associated adapter unit 14 by a bus line 16 and each adapter unit is connected to bus 13 by a line 17.

Computers 15 may be intelligent display terminals, computer operated typewriters, computer operated storage devices or other types of intelligent data processing devices and may differ in form from station to station. For example, computers 15-1, 15-2, 15-3 and 15-4 may be intelligent display terminals and computer 15-4 may be a computer operated storage device in which case nodes 12-1, 12-2, 12-3 and 12-5 are customer type nodes and node 12-4 is a server type node. The particular form of computer 15 is capable of operating as in independent data processing device. Each computer 15 is also capable of communicating with any one of the other computers 15 over bus 13.

Each computer includes an appropriate interface I individually labelled with reference numerals 15-11, 15-21, 15-31, 15-41 and 15-51 for interfacing its associated computer 15 to its associated adapter unit. Interface I, which is sometimes referred to hereinafter as an I-0 Handler may comprise a microcontroller similar to the microcontroller hereinafter described in adapter unit 14 and related logic circuitry.

Adapter units 14, which are sometimes referred to hereinafter as line processors or NBA-2's are functionally equal. Each adapter unit 14 serves as an interface between its associated computer 15 and bus 13. In addition, adapter units 14 collectively coordinate access to bus 13.

Figure 2:
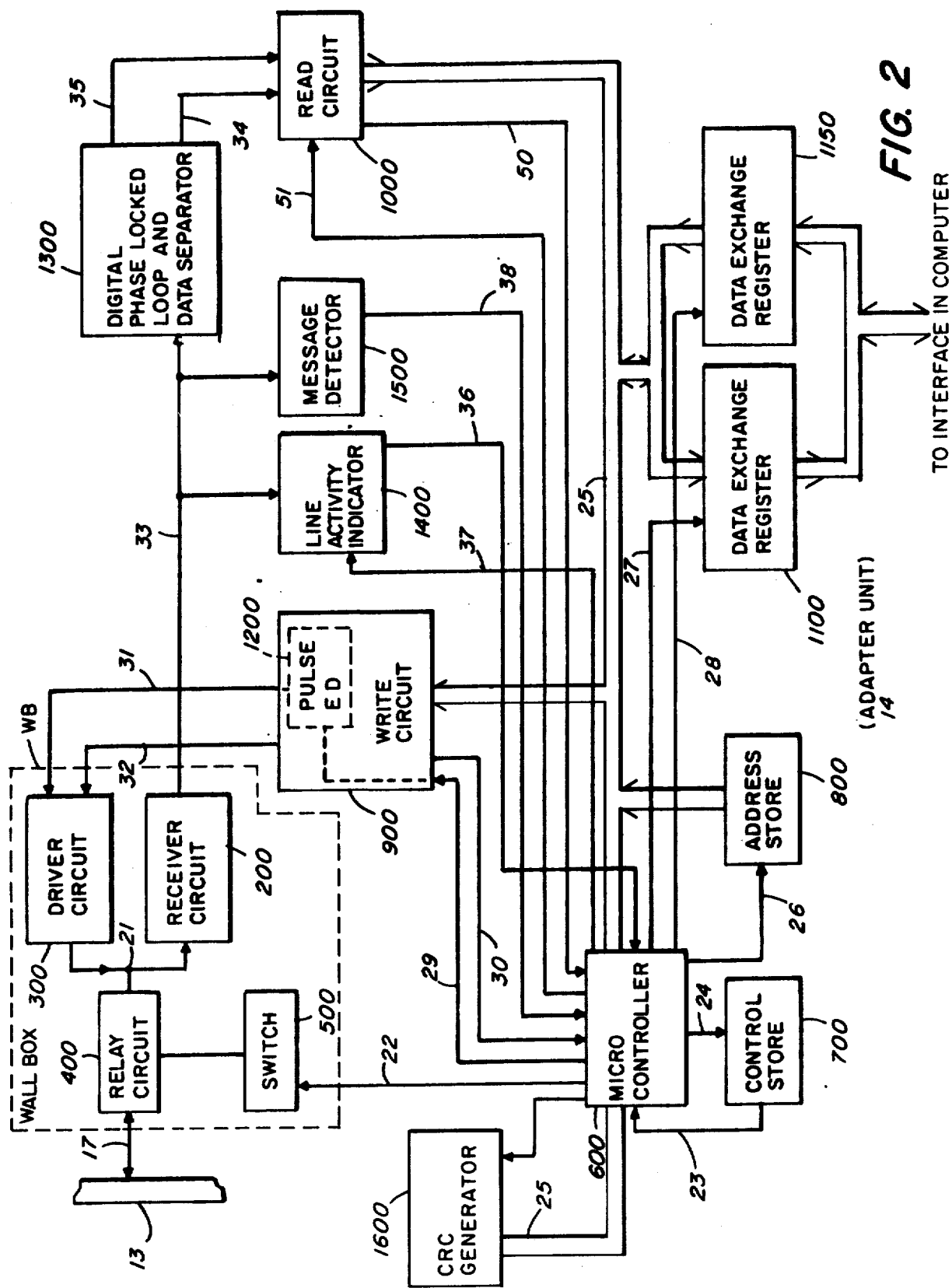
FIG. 2 is a block diagram of one of the adapter units in the computer network shown in FIG. 1.

Referring now to FIG. 2, there is illustrated in block diagram form the details of adapter unit 14.

There is a receiver circuit 200 for receiving incoming signals from bus 13 and a driver circuit 300 for transmitting outgoing signals to bus 13. Receiver circuit 200 translates the incoming analog signals from bus 13 to digital levels while driver circuit 300 converts the outgoing digital signals to analog levels. The input of receiver circuit 200 and the output of driver circuit 300 are connected to a junction 21 which is connected on one side of a relay circuit 400. The other side of relay circuit 400 is connected to bus 13 by a line 17. When relay circuit 400 is open, receiver circuit 200 and driver circuit 300 are electrically disconnected from bus 13 and when relay circuit 400 is closed, receiver circuit 200 and driver circuit 300 are electrically coupled to bus 13. Relay circuit 400 is driven by a digital switch 500 whose state is controlled by signals received from a microcontroller 600 over a pair of lines 22. For clarity, the pair of lines 22 are illustrated as a single line. Receiver circuit 200, driver circuit 300, relay circuit 400 and switch 500 may be physically located in a wall box WB which is remotely located from the other components in adapter unit 14.

Microcontroller 600 receives its instruction from a control store 700 which is connected to microcontroller 600 by a group of sixteen lines 23 and a group of ten lines 24. For clarity, both groups of lines 23 and 24 are illustrated as single lines. The functions performed by microcontroller 600 include generating control signals for certain of the other units within adapter unit 14, interpreting status or condition signals received from other units within adapter unit 14 and moving data signals between various units in adapter unit 14 and itself.

Microcontroller 600 is connected to an 8 bit bi-directional bus 25. Also connected to bus 25 are an address store 800, a write circuit 900, a read circuit 1000, a pair of data exchange registers or buffers 1100 and 1150 and a CRC (cyclical redundancy checkword) generator 1600 for detecting transmission errors. Address store 800 contains the 7 bit number that is the unique assigned number of the particular adapter unit 14. This number is placed on bus 25 when address store 800 is instructed to do so by microcontroller 600 over a line 26. Data exchange registers 1100 and 1150 transfer data between bus 25 and computer 15 on signals sent from microcontroller 600 over lines 27 and 28, respectfully. Write circuit 900 receives parallel data from bus 25 and converts the data into serial form. Write circuit 900 is controlled by signals sent from microcontroller 600 over a group of four lines 29. For clarity, the group of four lines is illustrated as a single line. Status signals telling microcontroller 600 whether or not a byte is needed are sent to microcontroller 600 from write circuit 900 over a line 30. Read circuit 1000 converts serial data to parallel data, informs microcontroller 600 when a byte is available over a line 50, and deposits the parallel data onto bus 25 when instructed to do so by a signal from microcontroller 600 over a line 51.

The output of write circuit 900 is connected to the input of driver circuit 300 by a positive channel 31 and a negative channel 32. Write circuit 900 includes an element 1200 connected to positive channel 31 which is used in certain instances to generate a single pulse or signals received by microcontroller 600 over none of the lines 29.

The output of receiver circuit 200 is connected to the input of a digital phase locked loop and data separator 1300 by a line 33. Also connected to line 33 are a line activity indicator 1400 and a message detector 1500. Digital phase locked loop and data separator 1300 separates the data received from receiver circuit 200 into clock and data pulses and sends the separate signals to read circuit 1000 along individual lines 34 and 35. Line activity indicator 1400 monitors activity of line 33. Signals indicating the presence or absense of activity are sent to microcontroller 600 over line 36 and control signals for controlling line activity indicator 1400 are sent from microcontroller 600 over a line 37. Message detector 1500 detects the presence of a message (i.e. a multiplicity of transitions within a given time period) on line 33 and communicates this condition to microcontroller 600 over a line 38.

Thus, incoming signals from bus 13 which are in serial form and at analog levels are conditioned to digital levels by receiver circuit 211, separated into clock and data signals by the digital phase locked loop and data separator 1300, converted into parallel form by read circuit 1000 and then deposited on bus 25, while outgoing signals from bus 25 which are in parallel from and at digital levels are converted into serial form by write dircuit 900, conditioned to analog levels by driver circuit 300 and then transmitted to bus 13.

Figure 3:
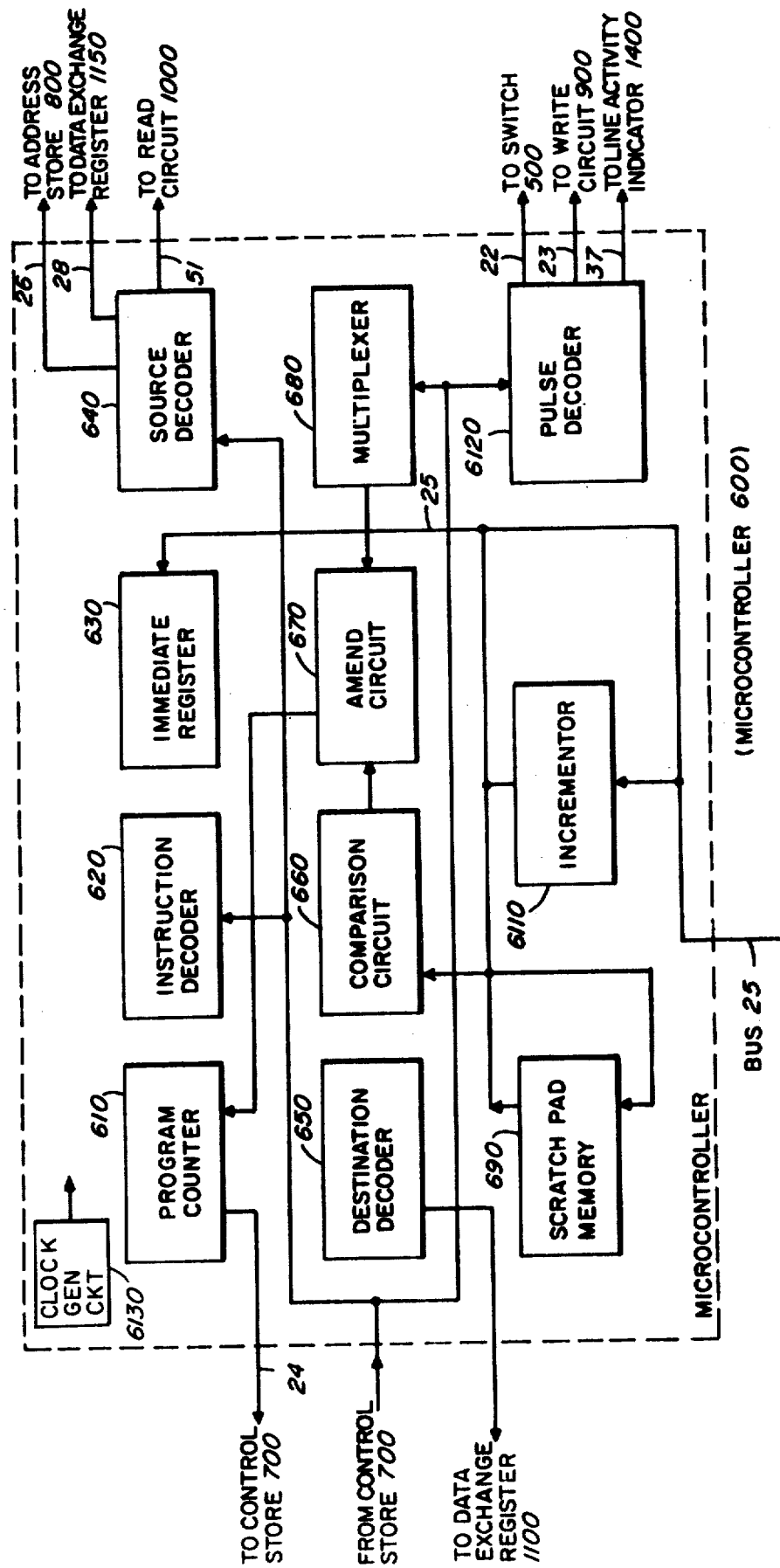
FIG. 3 is a block diagram of the microcontroller of the adapter unit shown in FIG. 2.

Referring now to FIG. 3, there is shown a block diagram of the microcontroller 600. As can be seen, microcontroller 600 includes a program counter 610, an instruction decoder 620, an immediate register 630, a source decoder 640, a destination decoder 650, a comparison circuit 660, an amend circuit 670, a multiplexer 680, a scratch pad memory 690, an incrementrr 6110 a pulse decoder 6120 and a clock generation circuit 6130. The functions of these components and the manner in which these components are interconnected will be described in detail in conjunction with FIGS. 5A through 5L below.

The details of microcontroller 600 and control store 700 are shown in FIGS. 4 and 5A through 5L. In FIGS. 4 and 5A through 5L as well as the Figures illustrating the details of other components in adapter unit 14, inputs appear generally on left-hand sides of components and outputs appear on right-hand sides of components. Control lines generally appear at tops and bottoms of components. An output line labelled with a particular designation is intended to be interpreted as connected to an input line having the same destination. Each interconnection is not described verbally for clarity of purposes of illustration, and full meaning and understanding of the invention will be better achieved by referring to the drawings wherein the line labellings clearly show the connections.

Control store 700 includes four 1K ×4 programmable read only memories 710, 720, 730, and 740. Each one of the memories may be a Monolithic Memories chip number 6353-1J.

Figure 5A:
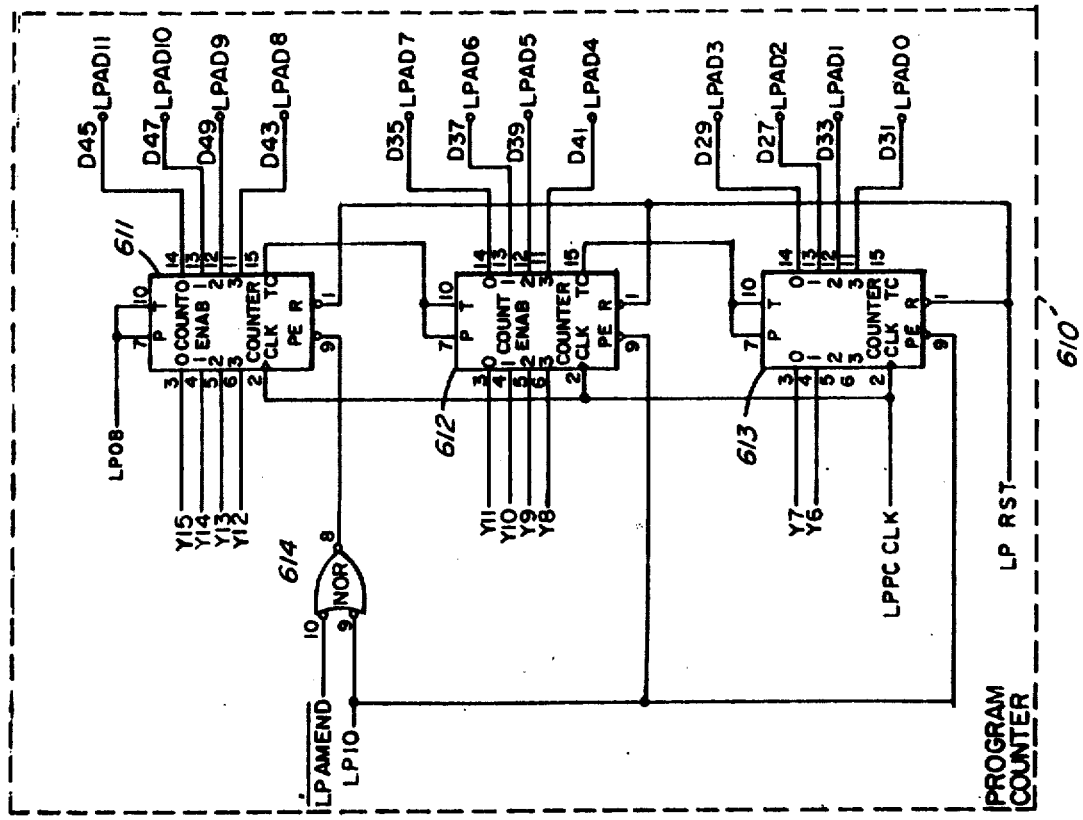
FIG. 5A is a schematic diagram of the program counter in the microcontroller shown in FIG. 3.

Program counter 610, as can be seen in FIG. 5A, includes three program counter chips 611, 612, and 613 which are connected in series and a gate 614. Each one of the program counter chips may be a Texas Instrument chip number 74S163. The gate may be ¼ of Signetics chip number 74S08. Each chip contains 4 bits. Output lines LPAD2 through LPAD11 of program counters chips 611–613 are connected to each one of the PROMS 710, 720, 730 and 740. At all times program counter 610 is addressing PROMS 710, 720, 730 and 740. Thus, if program counter 610 reads a bit pattern of 200 (i.e. the binary number 11001000) then program counter chip 610 reads $\phi$, program counter chip 602 reads $\phi$ and program counter chip 603 reads 2. According to the executed instruction, the program counter reading may be incremented or totally or partially modified according to the logic levels present in the "Y" lines at the execution of the instruction. Lines Y$\phi$, Y1, and Y2 also go to instruction decoder 620 (FIG. 5B) which decodes all the instructions from PROMS 710–740 and outputs these instructions over eight lines <LP$\phi$-IP7>. Instruction decoder 620 may be a Texas Instrument chip number 74S138. Seven different catagories of instruction can be outputed from instruction decoder 620. They are the MOVE instruction, the PULSE instruction, the JUMP instruction, the STORE IMMEDIATE instruction, the BRANCH ON EQUAL REGISTER instruction, the BRANCH ON EQUAL IMMEDIATE instruction and the BRANCH ON CONDITION TRUE instruction.

Immediate register 630 includes a register 631, which may be a Motorola chip number 74LS244 and a gate 632, which may be ¼ of a Signetics chip number 74S08. As a part of the "MOVE" instruction, immediate register 630 (FIG. 5C) is used to place a data byte on bus 25 whose source is the program store 700 (lines Y4 to Y11).

Source decoder 640, (FIG. 5D) which may be a Texas Instrument chip number 74S138, receives inputs from control store 700 over lines Y9 to Y11 and outputs over lines LPS$\phi$ through LPS7. If the decoded instruction is MOVE 1, source decoder 640 will decode the source field of the instruction and hold the selected source control line low. Each line LPS$\phi$-$\overline{\text{LPS7}}$, causes a register that can output on bus 25 to output its contents. Destination decoder 650 (FIG. 5E) includes a chip 651 which may be a Texas Instrument chip number 74S138 and a gate, 652, which may be ¼ of a Signetics chip number 74S08. Destination decoder 650 receives inputs from control store 700 over lines Y13 and Y15 and outputs over lines LPD$\phi$ through LPD7. If the decoded operation is MOVE destination decoder 650 decodes the Destination Field of the instruction and outputs a pulse on the appropriate destination control line.

Comparison circuit 660 (FIG. 5F) includes a register 661 an 8-bit comparator 662 and a gate 663. Register 661 may be a Signetics chip number 74LS374; comparator 662 may be an American Mico Devices chip number 25LS2521; and gate 663 may be ¼ of a Signetics chip number 74S08. Comparator 662 compares a byte previously moved to register 661 to the byte appearing on bus 25 at the time of executing a conditional JUMP instruction. The output E OUT of comparator 662 is LA=LB. If the bytes compared are equal, the output E OUT is low. If the bytes compared are not equal, LA=LB is high. The output Eo of comparator 662 is fed into amend circuit 670 through the 8 to 1 multiplexer 680.

Amend circuit 670 (FIG. 5G) is made up of a flip-flop 671 and a NOR gate 672. Flip-flop 671 may be a Texas Instrument chip number 74S74 and a gate 672 may be ¼ of a Signetics chip number 74S08. Multiplexer 680 maybe a Texas Instrument chip number 74LS151. Multiplexer 680 (FIG. 5H) receives inputs from lines LPC0, LPC1, LPC2, $\overline{LPC3}$, $\overline{LPC4}$, $\overline{LPC5}$, LPC6 and DA and selects which signal is to appear on the output at pin 6 by the addresses coming in at pins So, or S1 and S2 over lines Y5, Y6 and Y7 from control store 700. By this manner the conditions are tested. Then, if a particular condition is met, the output of amend circuit 670 ($\overline{LPA}$ $\overline{MEND}$) goes low causing program counter 611 to amend its value in conjunction with the Y12–Y15 values. If the tested condition is not met, program counter 611 will increment in the regular fashion.

Scratch pad memory 690 (FIG. 5I) carries the adapter state information, the next adapter unit register number, information as to the type of the computer to which the adapter unit is coupled (i.e. a "user" or a "server") and all information pertaining to the send and receive functions. Scratch pad memory 690 includes four random access memories (RAMS) 691, 692, 693 and 694, a buffer 695, a pull-up resistor bank 696 and a gate 697. Each RAM may be an American Micro Devices chip number AM3101A, buffer 695 may be a Motorola chip number 74LS240 and a gate 697 may be a ¼ of Texas Instrument chip number 74LS08. Each RAM is organized as 16 words by 4 bits. Thus, collectively, the RAMS provide 32 bytes of scratch pad memory. Buffer 695 is used to place the contents of the addressed RAM location onto bus 25 at the time of executing the MOVE instruction and is enabled and disabled by gate 697, Incrementer 6110 (FIG. 5J) includes two tri-state up/down counters 6111 and 6112, an inverter 6113 and a NOR gate 6114. The up/down counters 6111 and 6112 may each be an American Micro Devices chip number AM25LS2569, inverter 6113 may be ¼ of a Motorola chip number 74LS240 and OR gate 6114 may be ¼ of a Signetics chip number 74S08.

Microcontroller 600 can (1) increment the contents of counter 6111 and 6112, (2) test for the contents to equal $\phi$, and (3) deposit a byte into counters 6111 and 6112. Thus, incrementer 6110 is the mechanism by which microcontroller 600 can count events or time. Using incrementer 6110, microcontroller 600 can count events such as a number of bytes transmitted or received or count time such as a time period of inactivity over line 33 to determine if an election should be conducted or the nΔ time period used while adapter unit 14 is in the election mode.

Pulse decoder unit 6120 (FIG. 5K) includes two pulse decoder 6121 and 6122. Each pulse decoder 6121 and 6122 may be a Texas Instrument chip number 74S138. One of the pulse decoders 6121 outputs pulses over lines LPP$\phi$ through LPP7 while the other pulse decoder 6122 outputs pulses over lines LPP8 through LPP15. If the decoded instruction is a PULSE, pulse decoder unit 6120 decodes the pulse field of the instruction and outputs a pulse on the appropriate line (LPP$\phi$–LPP15).

clock generation circuit 6130 (FIG. 5L) generates all the clocks necessary to control the operations of microcomputer 600 and all components connected thererto and includes a 24MHZ crystal oscillator 6131, a counter 6132, a D type flip-flop 6133 and a pair of AND gates 6134 and 6135. Oscillator 6131 feeds counter 6132. Oscillator 6131 may be a Motorola chip number K-114, counter 6132 may be a Texas Instrument chip number 74S163. Flip-flop 6133 may be a chip number 74S74 and AND gates 6134 and 6135 may each be a ¼ Sygnetics chip number 74S08.

Figure 6:
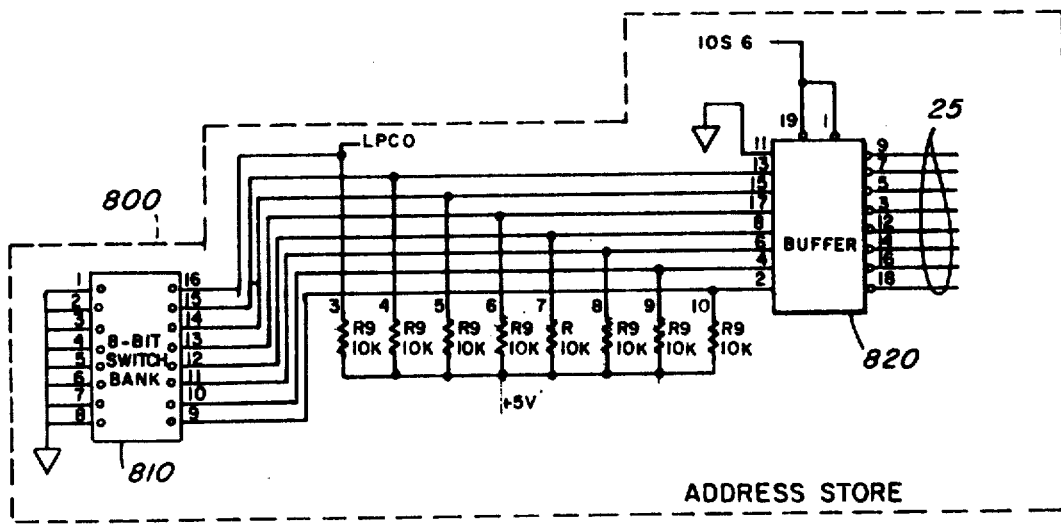
FIG. 6 is a schemactic diagram of the address store in the adapter unit in FIG. 2.

Referring now to FIG. 6, address store 800 includes an 8 bit switch bank 810 and a buffer 820. Switch bank 810 contains the 8 bit number that is the physical address of the particular adapter unit 14. Buffer 820 places that number on bus 25 when instructed to do so.

Figure 7:
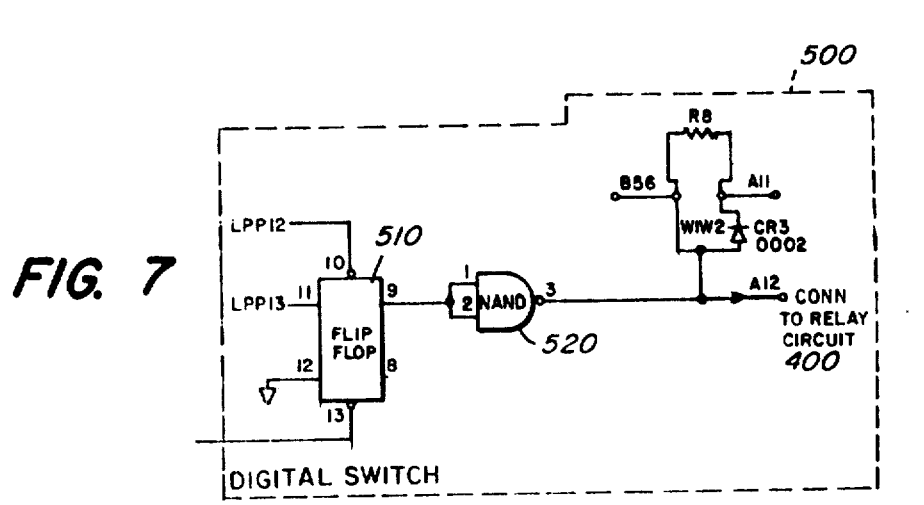
FIG. 7 is a schematic diagram of the digital switch in the adapter unit in FIG. 2.

Referring now to FIG. 7, digital switch 500 includes a flip-flop 510, a buffer 520 and a termination resistor circuit 530. Flip-flop 510 may be ¼ of a Texas Instrument chip number 74LS74 and buffer 520 may be ¼ of a Texas Instrument chip number 75452. Digital switch 500 controls relay circuit 400. Using the pulse instructions, microcontroller 600 turns the relay in relay circuit 400 on via line $\overline{LPP12}$ and OFF via line $\overline{LPP13}$.

Figure 8:
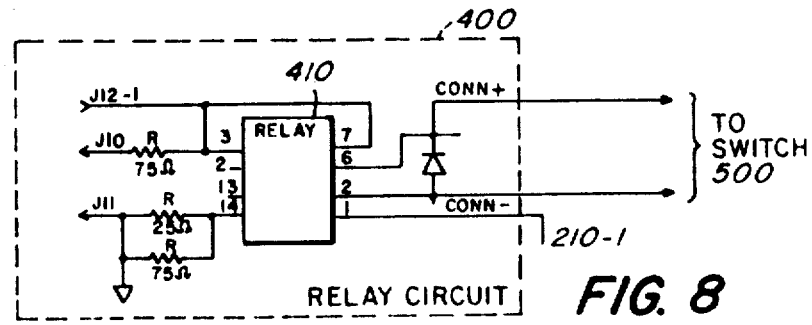
FIG. 8 is a schematic diagram of the relay circuit in the adapter unit in FIG. 2.

Referring now to FIG. 8, relay circuit 400 includes a relay 410. The inputs of relay 410 are connected to CONN+ and CONN−, which are the outputs of digital switch 500. The normally open contacts (terminals 7 and 14) of relay 410 are connected to bus 13.

Figure 9:
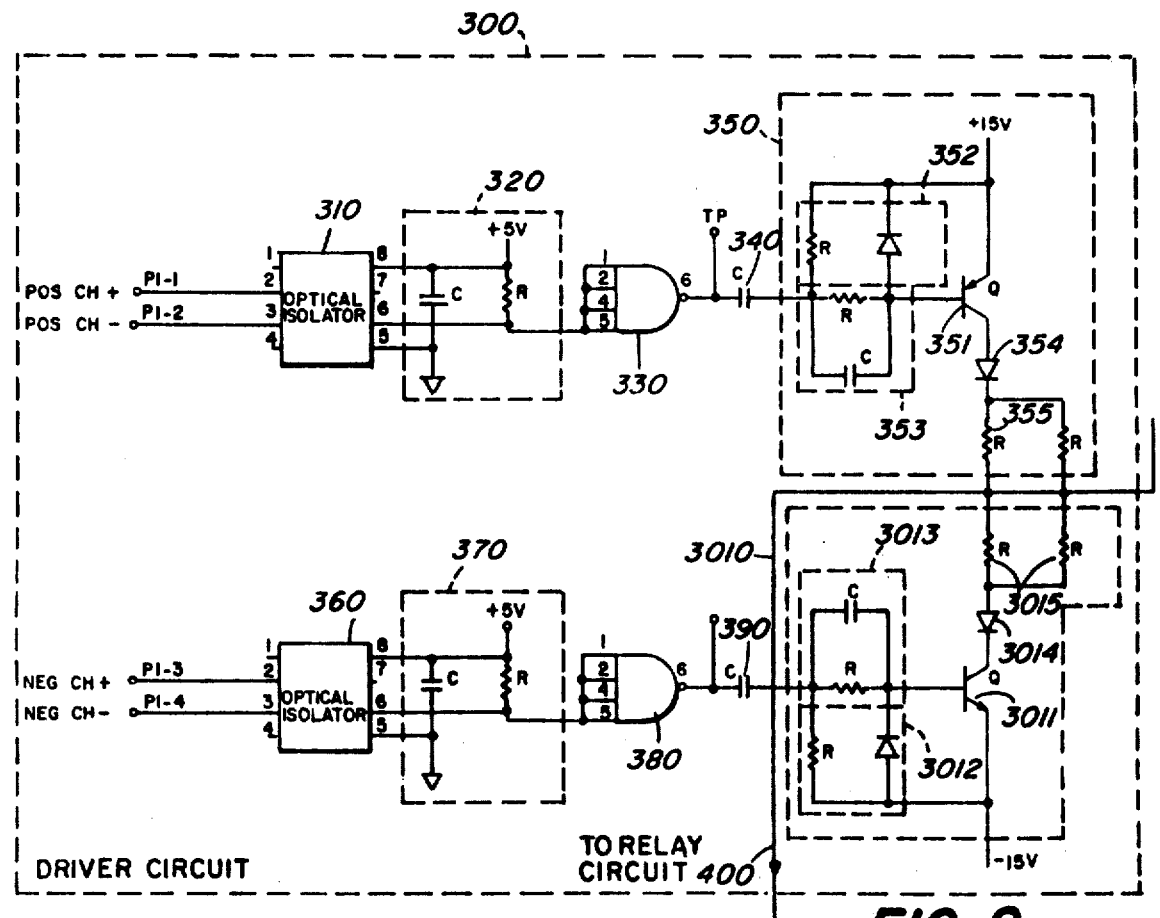
FIG. 9 is a schematic diagram of the driver circuit in the adapter unit in FIG. 2.

Referring now to FIG. 9, driver circuit 300 includes two sections, one for processing signals received from write circuit 900 over positive channel 31 and the other for processing signals received from write circuit 900 over negative channel 32. The section for processing signals received from positive channel 31 includes an optical isolator 310 for ground isolation, a pull-up resistor and bi-pass capacitor 320, a buffer 330, a dc blocking capacitor 340 and a driver transistor circuit 350. The driver transistor circuit 350 includes a transistor 351, emitter components 352, base components 353, a diode 354 and a pair of parallel resistors 355. Similarly, the section for processing signals received from negative channel 2 includes an optical isolator 360, a pull-up resistor and bipass capacitor 370, a buffer 380, a dc blocking capacitor 390 and a driver transistor circuit 3010 having a transistor 3011, emitter components 3012, base components 3013, a diode 3014 and a pair of parallel resistors 3015. In transistor circuits 350 and 3010, the signals are boosted to levels compatable for transmission over bus 13 and sent to bus 13 over line 17.

Figure 10:
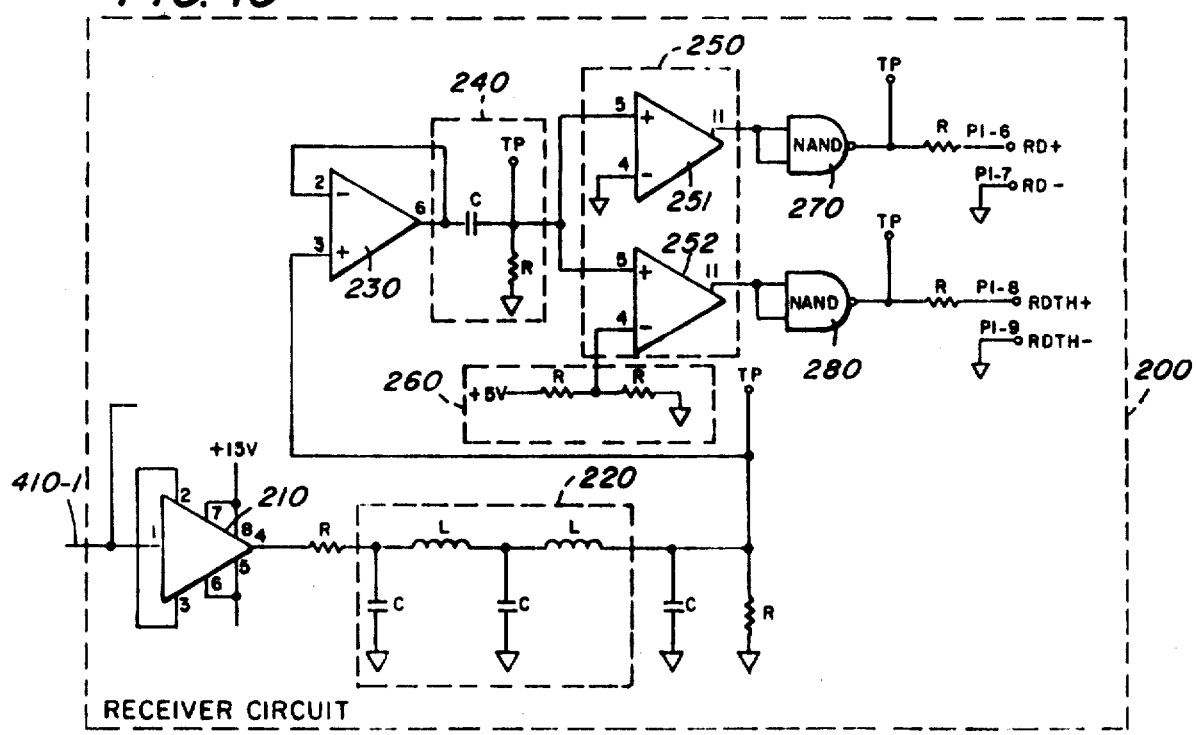
FIG. 10 is a schematic diagram of the receiver circuit in the adapter unit in FIG. 2.

Referring now to FIG. 10, receiver circuit 200 include an input operational amplifier 210 whose output is passed through a low pass filter circuit 220. The output of low pass filter circuit 220 is fed into another operational amplifier 230 and from there to a differentiator circuit 240 which counteracts the signal distortion occurring over bus 13. The output from the differentiator circuit 240 is fed into a comparator section 250 which includes two comparators 251 and 252. One comparator 251 compares the input to ground while the other comparator 252 compares the input to a small level above ground through a threshhold circuit 260. The outputs from comparators 251 and 252 are fed into buffers 270 and 280 (NAND gates) respectively. The output of buffer 270 is sent out on line 22 to the digital phase locked loop and data separator 1300 while the output of buffer 280 is sent to line activity indicator 1400 message detector 1500. Thus, the two outputs are produced, one for processing and the other to crudely detect the presence of useable signals on the line.

Figure 11:
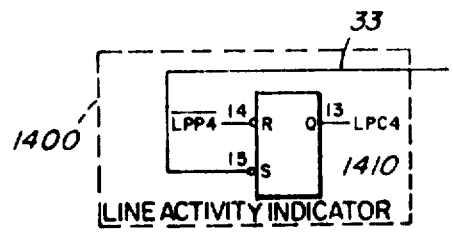
FIG. 11 is a schematic diagram of the line activity indicator in the adapter unit in FIG. 2.

Referring now to FIG. 11, line activity indicator 1400 comprises a Flip-lop 1410 which may be ¼ of a Texas Instrument chip number 74279. Flip-flop 1410 has an input S which is connected to Line 33 an input R connected to pulse decoder unit 6120 over line LPP4 and an output Q connected to 8 to 1 multiplexer 680 over line LPC4.

Microcontroller 600 resets flip-flop 1410 and then monitors the Q output for activity over line 33. So long as there is no activity, the set input S remains high and flip-flop 1410 remains reset. If the set input S goes low for any period of time, flip-flop 1410 sets and the Q output goes high signalling microcontroller 600 that activity has occurred on bus 13 (that is, over line 33). Flip-flop 1410 remains set until microcontroller 600 resets it by pulsing the reset input R.

Figure 12:
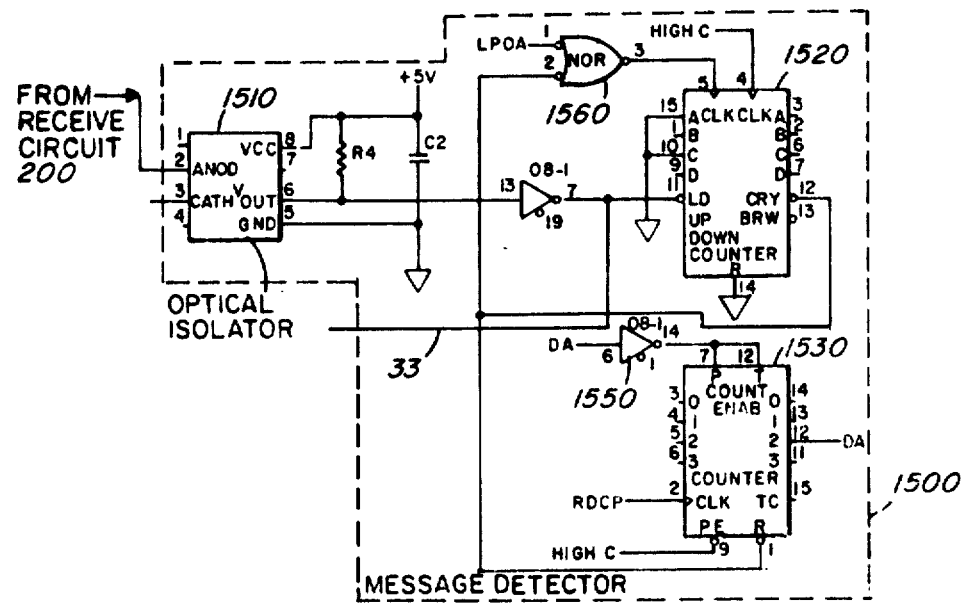
FIG. 12 is a schematic diagram of the message detector in the adapter unit in FIG. 2.

Referring now to FIG. 12, message detector 1500 includes an optical isolator 1510 for ground isolation, a 4 bit binary counter 1520 to detect if the line 33 is pulsing, a 4 bit binary counter 1530 to count four transitions before the signal goes high signifying that data is arriving, a pair of inverters 1540 and 1550 and a negative OR gate 1560. Optical isolator 1510 may be a Hewlitt Packard Chip number HPCL-2602, counter 1520 may be a Signetics chip number 74LS193, counter 1530 may be a Texas Instrument chip number 74LS161, inverters 1530 and 1540 may each be ¼ of a Motorola chip number 74LS240 and OR gate 1560 may be ¼ of a Signetics chip number 74S08.

Figure 13:
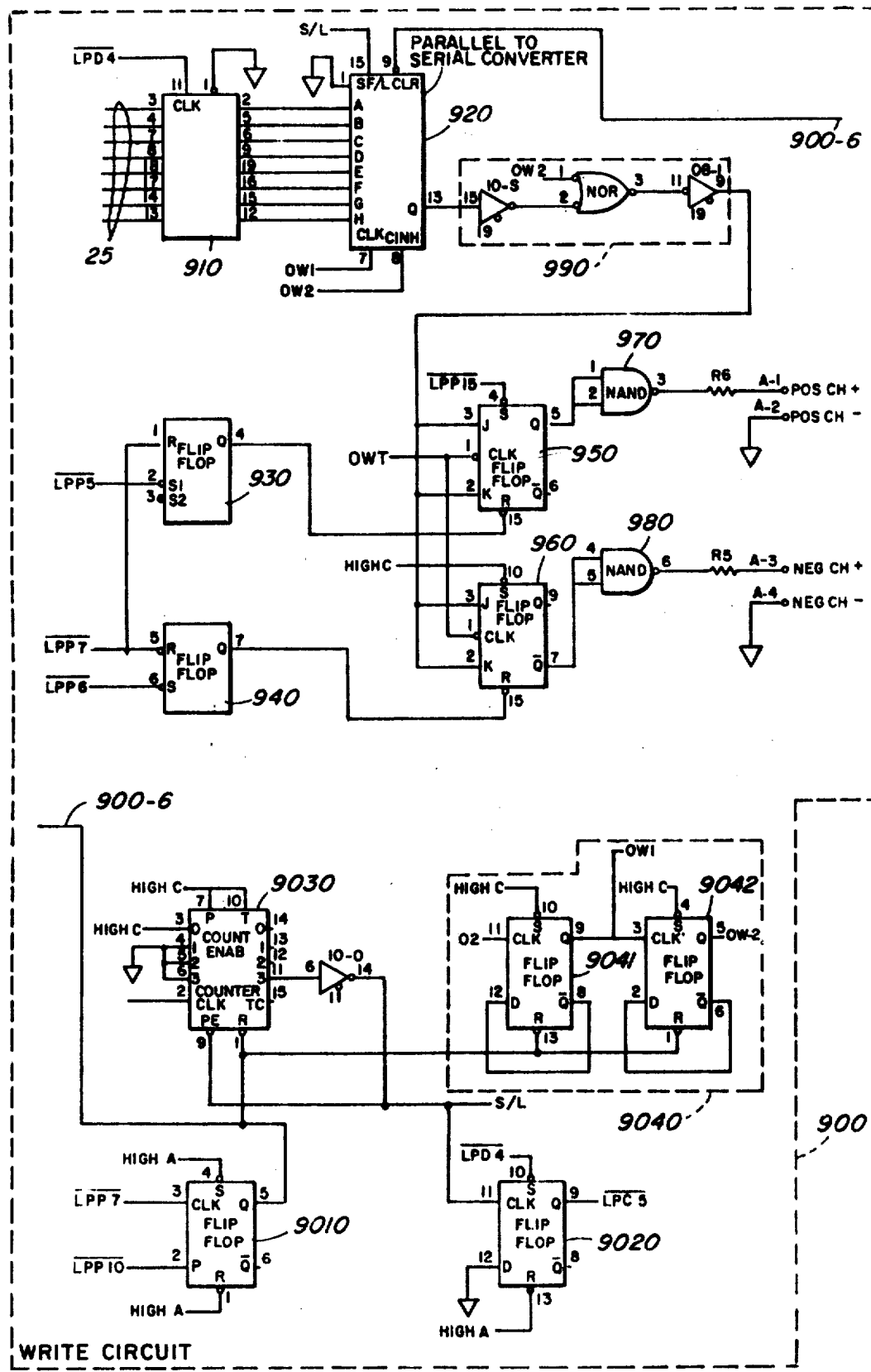
FIG. 13 is a schematic diagram of the write circuit in the adapter unit in FIG. 2.

Referring now to FIG. 13, write circuit 900 includes a holding register 910, a parallel to serial converter 920, a pair of flip-flops 930 and 940, a pair of output flip-flops 950 and 960, pair of buffer gates 970 and 980, a series of gates 990, a pair of flip-flops 9010 and 9020, a counter 9030 and a timer 9040. Timer 9040 includes a pair of flip-flops 9041 and 9042. Holding register 910 may be a Signetics chip number 74LS374, parallel to serial converter 920 may be a Texas Instrument chip number 74166, each one of the flip-flops 930 and 940 may be ¼ of a Texas Instrument chip number 74279 and flip-flops 950 and 960 may each be ¼ of a Signetics chip number 74LS112. Each one of the buffers 970 and 980 may be ¼ of a Signetics chip number 74S37, the series of gates 990 may be ¼ of a Motorola chip number 74LS240, flip-flop 9010 and 9020 may each be ¼ of a Texas Instrument chip number 74LS161 and flip-flops 9041 and 9042 may each be ¼ of a Texas Instrument chip number 74LS74. Data is received from bus 25 by holding register 910 and then shifted in parallel to the parallel to serial converter 920 where it is converted to serial form. The output from parallel to serial converter 920 is sent to flip-flops 950 and 960 through gate circuit 990. The outputs of flip-flops 950 and 960 are sent through buffer gates 970 and 980, respectively. The output from buffer gate 980 is coupled to positive channel 31 and the output from buffer gate 970 being coupled to negative channel 32. Flip-flops 950 and 960 also receive input from flip-flops 930 and 940 respectively which receive signals from microcontroller 600 over lines $\overline{LPP5}$, $\overline{LPP6}$ and $\overline{LPP7}$. Counter 9030 counts the number of bits serialized out.

Flip-flops 930 and 950 also function as a single emitting device 1200; that is, in one mode they are used as part of write circuits 900 and in another mode they are used to pulse positive channel line 31. A pulse is produced by sending a signal to pin S of flip-flop 950 over line $\overline{LPP15}$ causing the output Q at pin 5 of flip-flop 950 to go high and then sending a signal to input R of flip-flop 950 a period of time later causing the output Q to go low. The period of time (i.e. the pulse width) is controlled by controller 600.

Figure 14:
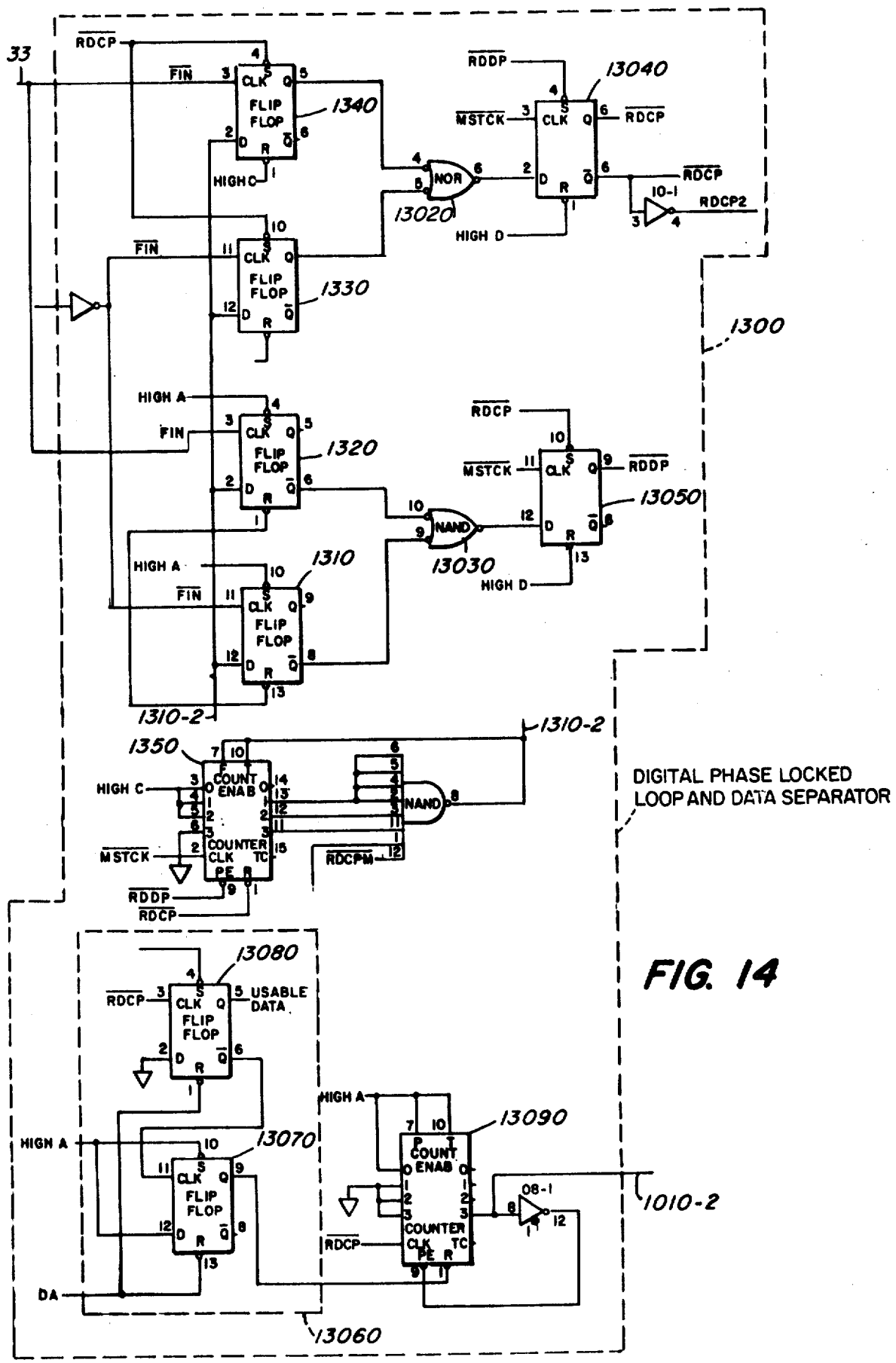
FIG. 14 is a schematic diagram of the digital phase locked loop and data separator in the adapter unit in FIG. 2.

Referring now to FIG. 14, digital phase locked loop and data separator 1300 includes four flip-flops 1310, 1320, 1330, and 1340 which detect the occurrence of any transitions on the Fin or $\overline{Fin}$ lines. Fin and $\overline{Fin}$ are the digitized version of what appears on the network bus 13. Since a double frequency modulation scheme is employed, there is always a transition occurring at the beginning of each bit cell plus another transition in the middle of the bit cell, if the bit cell is a ONE bit. Flip-flops 1310, 1320, 1330 and 1340 also receive inputs on their data inputs from counter 1350 and state "7" decoding AND gate 1360. Counter 1350 is preset to zero each time a transition occurs corresponding to a bit cell boundary (READ DATA CLOCK PULSE, RDCP). With such an arrangement, one of the flip-flops of pairs 1310 and 1320 will change state on every clock transition and one of the 1330, 1340 pair will change state on every data transistion. The output of each flop pair is treated by gates 13020 or 13030 and presented as input to flip-flops 13040 and 13050. The output of flip-flop 13140 is the clock pulse (RDCP) and the output of flip-flop 13050 is the data pulse (RDDP). Phase lock loop and data separator 1300 also includes a synch stripper 13060 which strips out the synch bit and which is made up of two flip-flops 13070 and 13080. The output of synch stripper 13060 is fed through a counter 13090 which counts the number of the received serialized bits.

Each one of the flip-flops 1310, 1320, 1330 and 1340 may be ¼ of a Texas Instrument chip number 74S74, counter 1350 may be a Texas Instrument chip number 74S163, gate 1360 may be a National Semiconductor chip number 74S30 and each one of the "OR" gates may be ¼ of a Signetics chip number 74S08. Flip-flops 13040 and 13050 may be each ¼ of a Texas Instrument chip number 74S74, flip-flops 13070 and 13080 may each be ¼ of a Texas Instrument chip number 74LS74 and counter 13090 may be an American Micro Device Chip number 74LS161.

Figure 15:
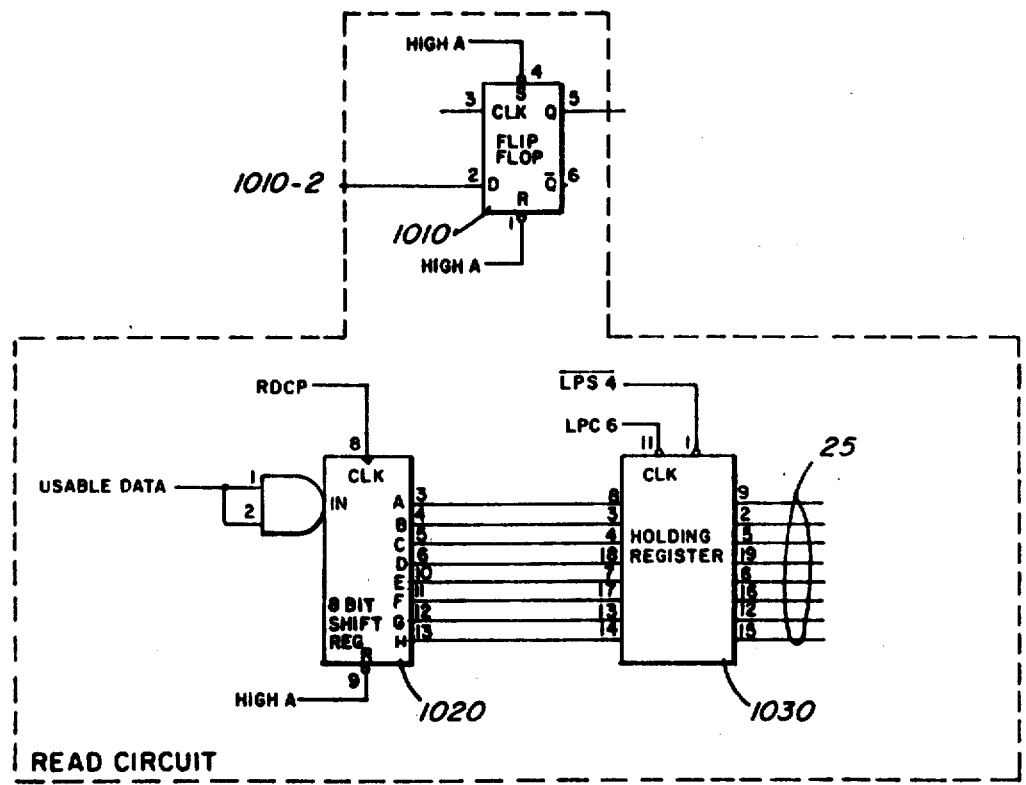
FIG. 15 is a schematic diagram of the read circuit in the adapter unit in FIG. 2.

Read circuits 1000, which is shown in FIG. 15 includes a flip-flop 1010, a 8 bit shift register 1020 which functions as a serial to parallel converter and which outputs into a holding register 1030. The outputs from holding register 1030 are transferred to bus 25 on command signals from microcontroller 600. The parallel to serial converter 1020 may be a Texas Instrument chip number 74LS164 and holding register 1030 may be a Signetics chip number 74LS374.

CRC generator 1600, which is shown in FIG. 6A isused to verify that the data is correct and includes a parallel in, serial out/serial in, parallel out shift register 1601, a counter 1602 which counts pulses and then shifts shift register 1601, a serial in/serial out shift register 1603, a serial in/serial out shift register 1604, an SR type flip-flop 1605, a pair of conventional D flip-flops 1606 and 1607, a pair of exclusive OR gates 1608 and 1609, an AND gate 1610, a pair of inverter 1611-1 and 1611-2 with an enable line and an NAND gate 1612. Shift register 1601 may be a Texas Instrument chip number 74LS299. Counter 1602 may be a Texas Instrument chip number 74LS161. Shift registers 1603 and 1604 may each be a Fairchild chip number 9328. Flip-flop 1605 may be a ¼ Texas Instrument chip number 74279. Flip-flop 1606 and 1607 may each be a ½ Texas Instrument chip number 74LS74. OR gates 1608 and 1609 may each be a ¼ Texas Instrument chip number 74LS86. AND gate 1610 may be a ¼ Signetics chip number 74S08. Inverters 1611 may each be a ⅙ Motorola chip number 74LD240. NAND gate 1612 may be a ¼ Signetics chip number 74S37.

In the operation of the CRC generator circuit 1600, shift registers 1603 and 1604 in conjunction with the exclusive OR gates 1608 and 1609 perform a CRC function which is X to the sixteenth plus X to the eighth plus X. When a byte is put into register 1601, the logic circuitry including gate 1610, counter 1602, gate 1612 and flip-flop 1606 generates eight pulses which shifts the byte out into first shift register 1603. When the next byte is put in, that byte is shifted out in shift register 1603 and the first byte is moved to shift register 1604. When a third byte is put in to shift register 1603 the second byte is moved to shift register 1604 and in the process is exclusively OR'd with the first byte. Thus it is not merely the bytes that end up in shift register 1604 but rather an exclusive OR'd version of the bytes and this is what generates the complex number.

Referring now to FIGS. 24 through 29, there are illustrated a number of timing diagrams showing different waveforms generated in the operation of the adapter unit 14. In many of the timing diagrams arrows are shown extending from one or more waveforms to one or more other waveforms. For clarification purposes the circle at the beginning of an arrow on a particular waveform indicates the particular state of that waveform that is used to generate the waveform at the head of the arrow at the state where the arrow is directed.

Figure 4:
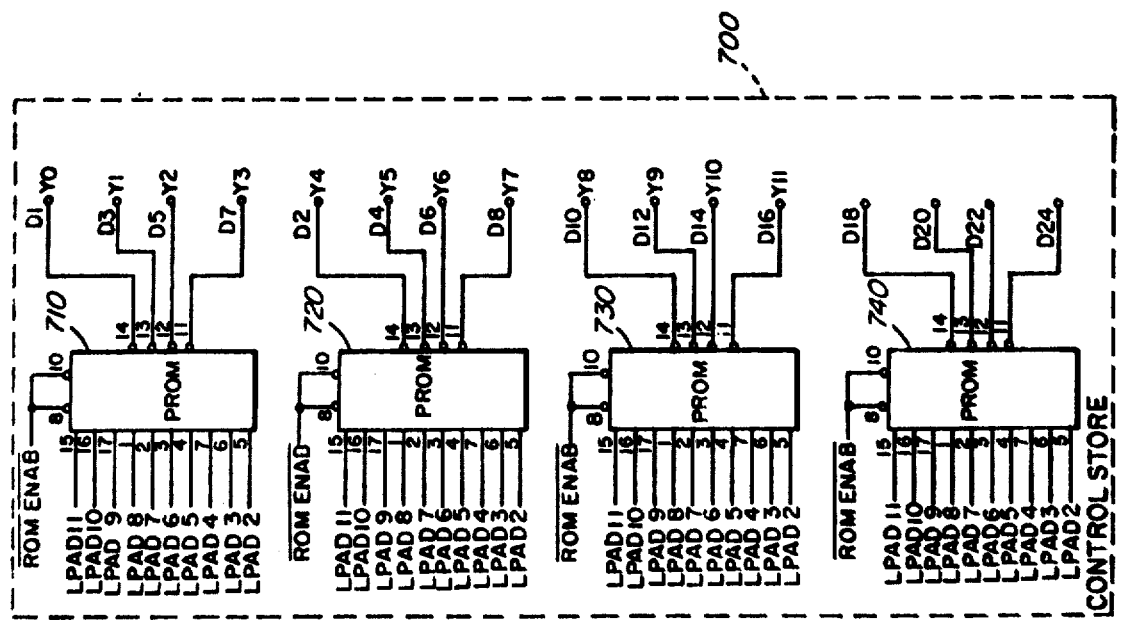
FIG. 4 is a schematic diagram of the control store shown in the adapter unit in FIG. 2.
Figure 5B:
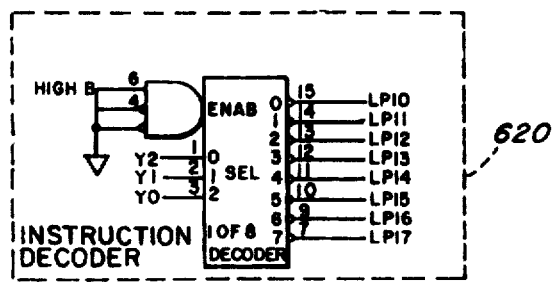
FIG. 5B is a schematic diagram of the instruction decoder in the microcontroller shown in FIG. 3.
Figure 5D:
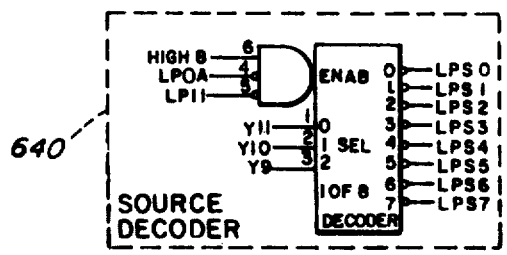
FIG. 5D is a schematic diagram of the source decoder in the microcontroller shown in FIG. 3.
Figure 5C:
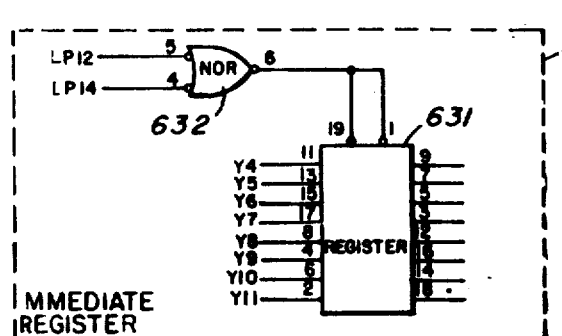
FIG. 5C is a schematic diagram of the immediate register in the microcontroller shown in FIG. 3.
Figure 5E:
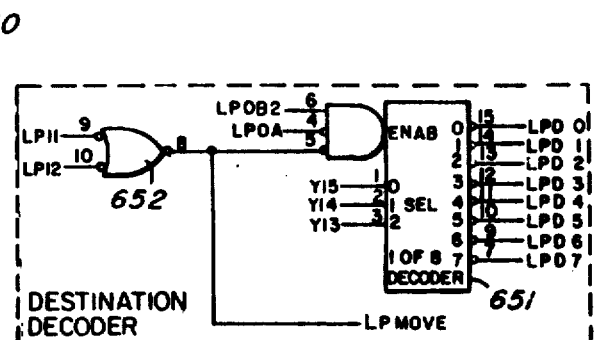
FIG. 5E is a schematic diagram of the destination decoder in the microcontroller shown in FIG. 3.
Figure 5F:
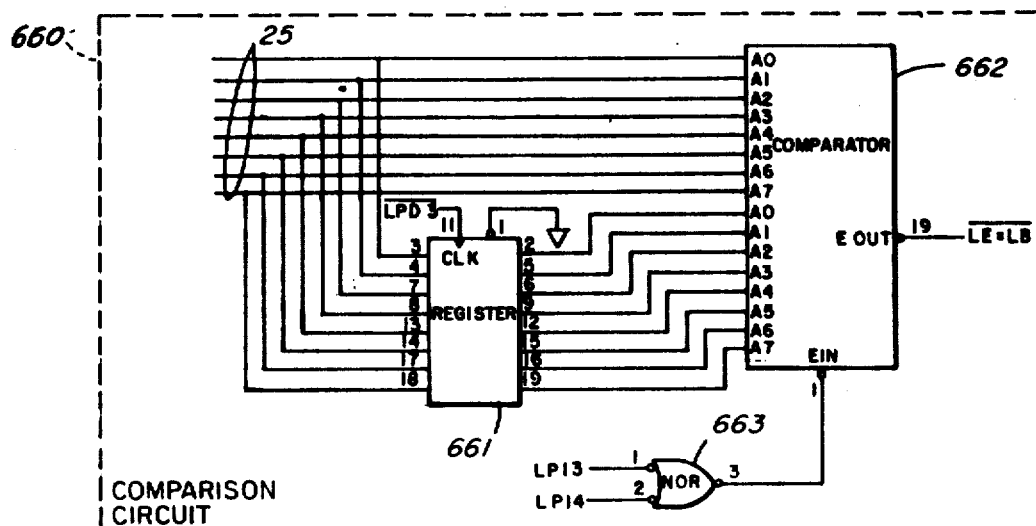
FIG. 5F is a schematic diagram of the comparison circuit in the microcontroller shown in FIG. 3.
Figure 5G:
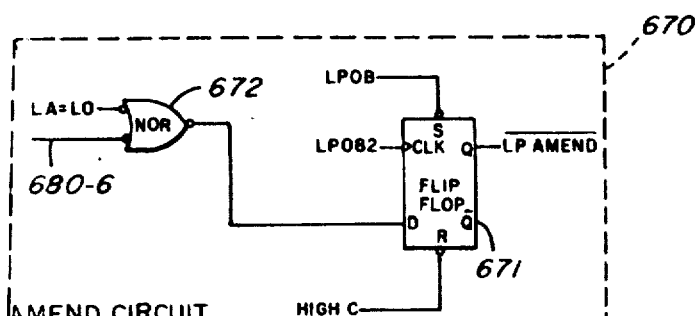
FIG. 5G is a schematic diagram of the amend circuit in the microcontroller shown in FIG. 3.
Figure 5H:
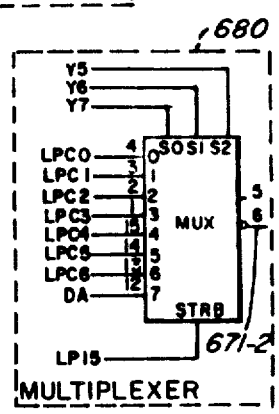
FIG. 5H is a diagram of the multiplexer in the microcontroller shown in FIG. 3.
Figure 5I:
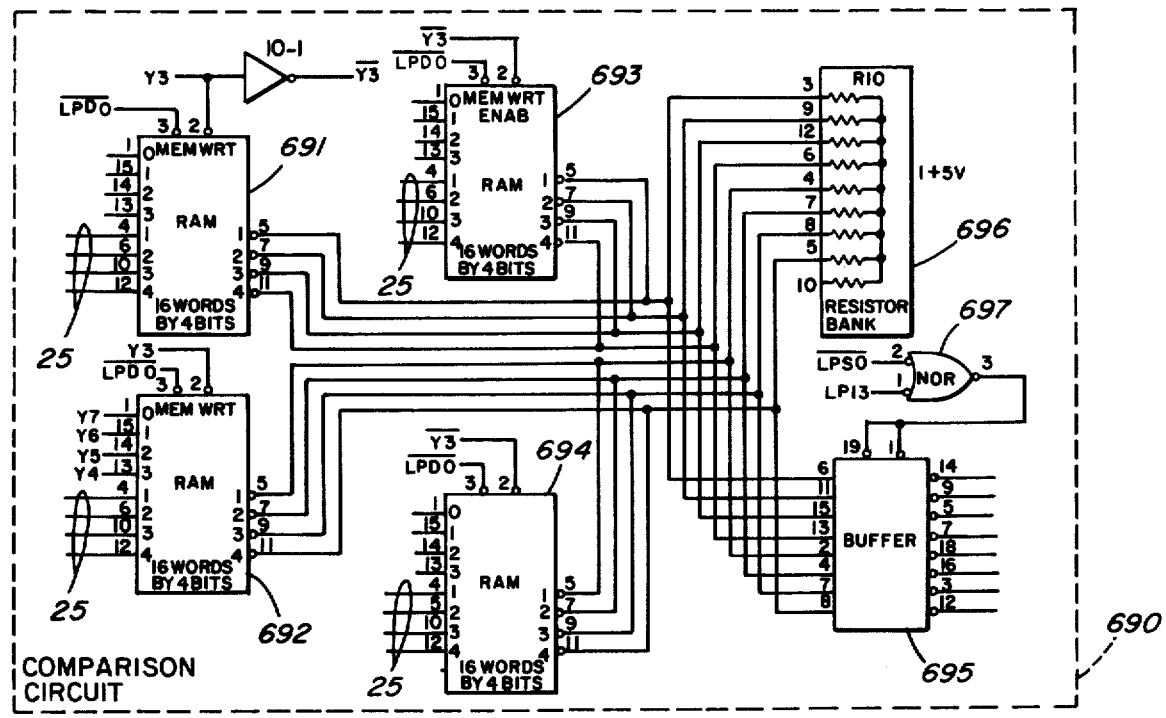
FIG. 5I is a schematic diagram of the scratch pad memory in the microcontroller shown in FIG. 3.
Figure 5J:
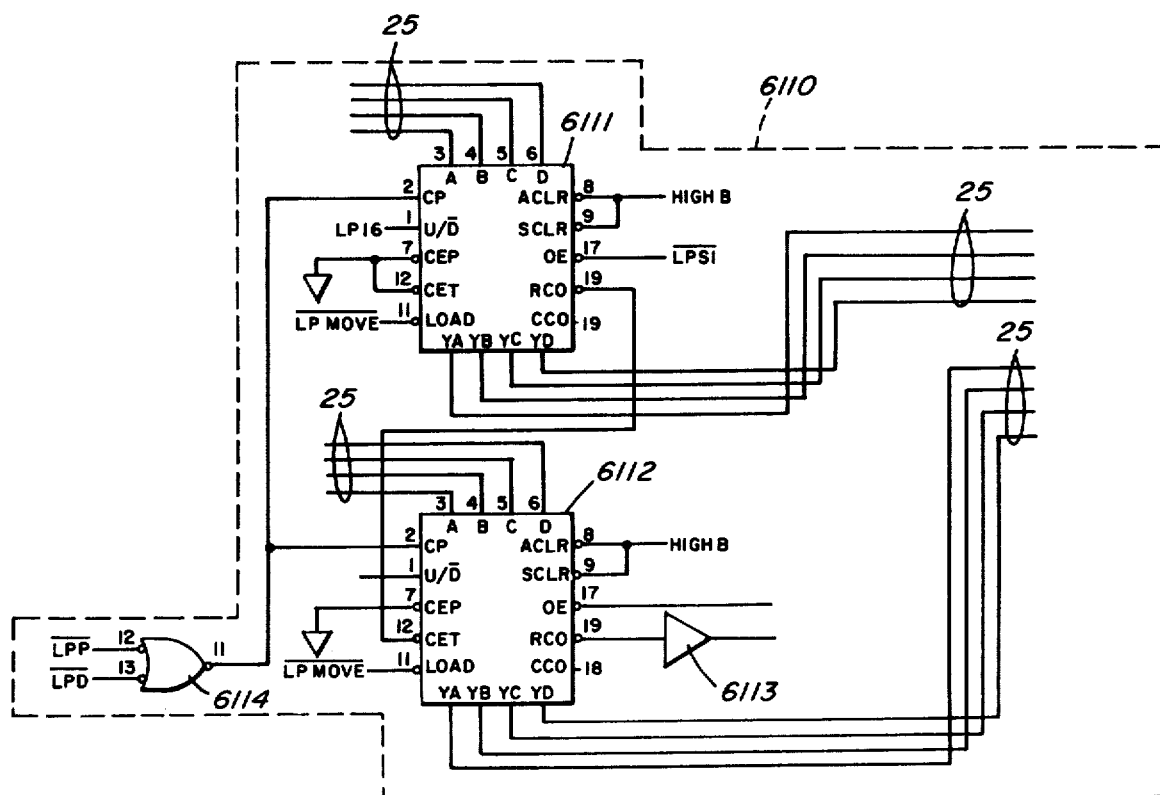
FIG. 5J is a schematic diagram of the incrementor in the microcontroller shown in FIG. 3.
Figure 5K:
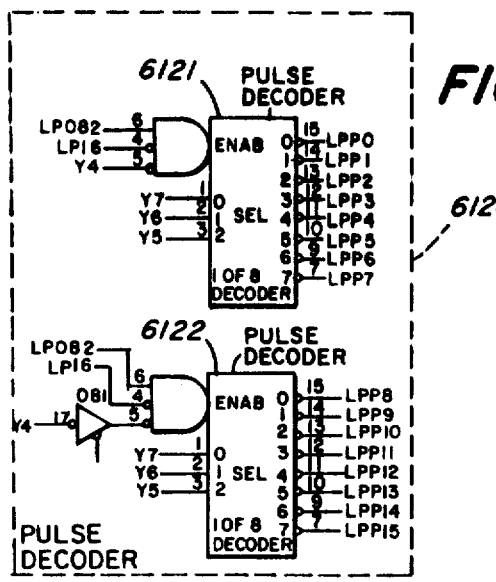
FIG. 5K is a schematic diagram of the pulse decoder in the microcontroller shown in FIG. 3.
Figure 5L:
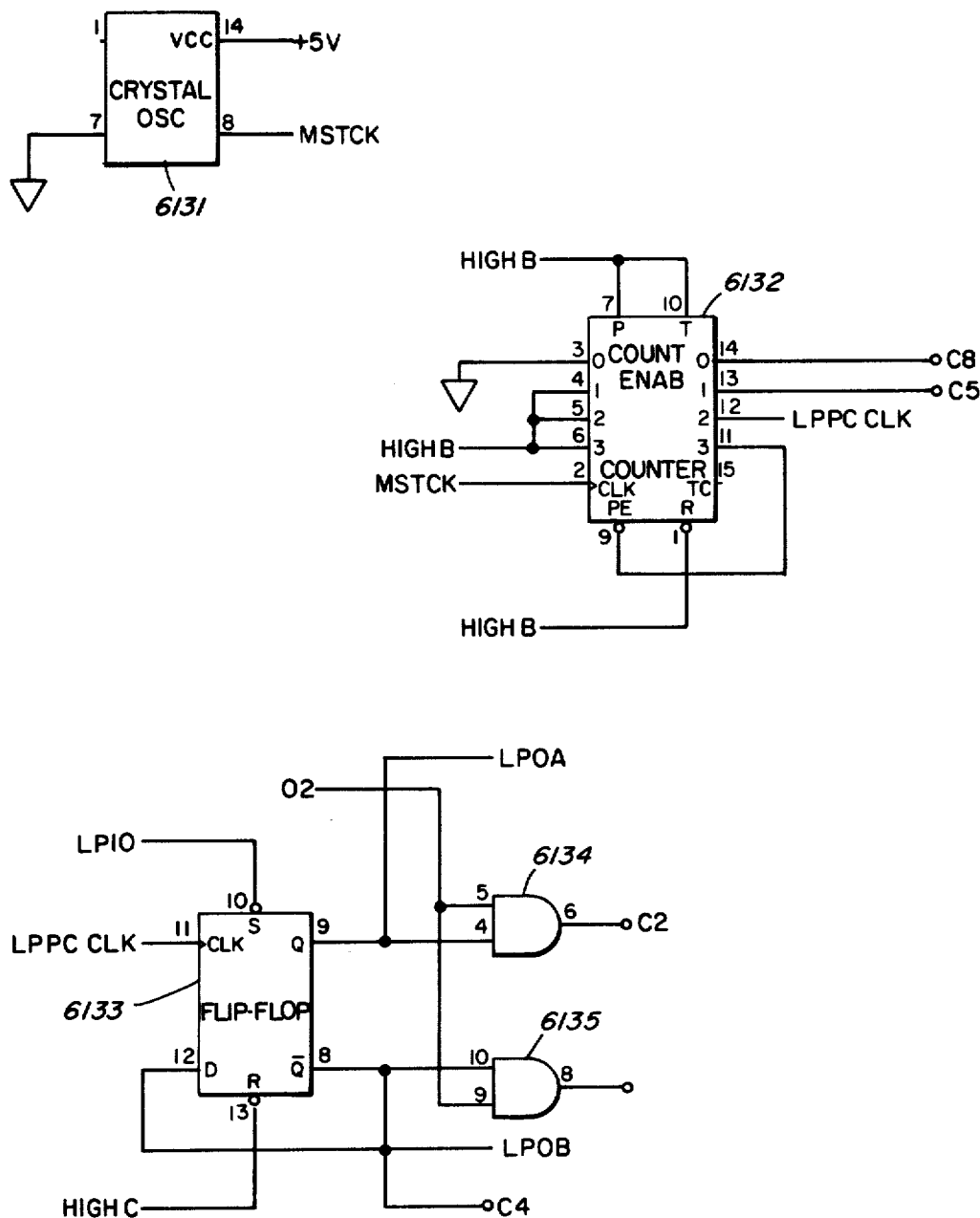
FIG. 5L is a schematic diagram of the clock generation circuit in the microcontroller shown in FIG. 3.
Figure 24:
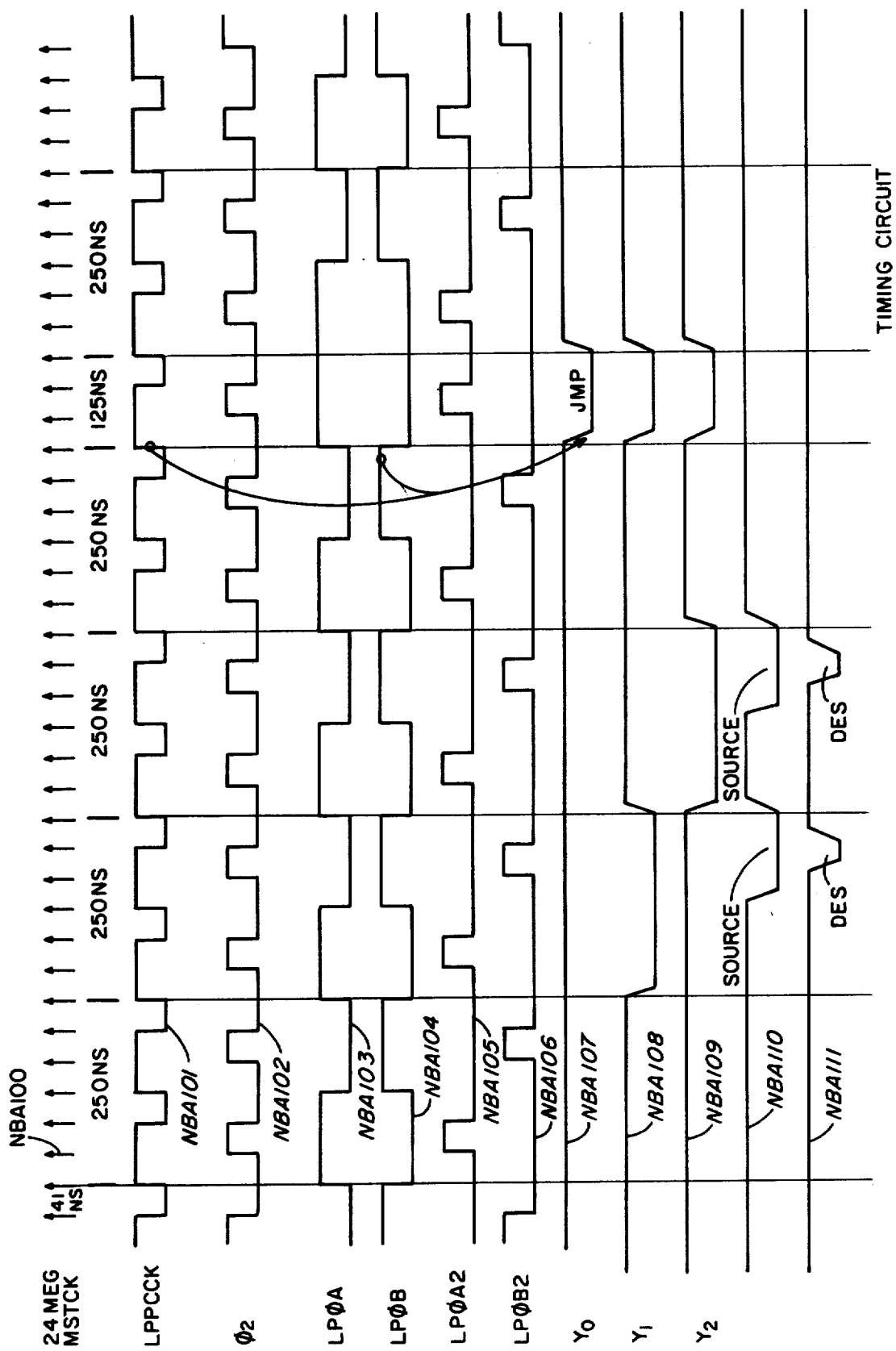
FIG. 24 is a timing diagram showing a number of the signals generated in the operation of the clock generation circuit in the microcontroller shown in FIG. 3.

Referring now to FIG. 24, there is illustrated a timing diagram of a number of the waveforms generated in the clock generation circuit 6130 shown in FIG. 5L and at the control store 700 shown in FIG. 4.

Waveform NBA 100 or 24 MEG MSTCK illustrates the positive going transition generated by the 24 MHZ crystal oscillator 6131 at pin 8. The signal has a ± 0.05% accuracy and the period of the signal is 41.7 nanoseconds. Using counter 6132, the 24 MHZ signal is divided by six and divided by three. The divide by six signal is waveform NBA101 or LPPCCK (line processor PC clock) which appears at pin 11 of the flip-flop 6133. The divide by three signal is waveform NBA102 or $\phi 2$ which appears at pin 14 of the counter 6132. As can be seen, signal $\phi 2$ goes high twice during an instruction, once in the middle of the first half of an instruction and then again exactly in the middle of the second half of an instruction, an instruction being six master clocks or 250 nanoseconds wide.

Signal LPPCCK is then divided by two using flip-flop 6133 to generate the signals shown in waveform NBA103 or LP$\phi$A which appears at pin 9 of flip-flop 6133 and waveform NBA104 or LP$\phi$B which appears at pin 8 of flip-flop 6133. It is to be noted that waveforms NBA103 and NBA104 have a cycle exactly the same as the instruction time. NBA103 is always high during the first half of an instruction while NBA104 is always high during the second half of an instruction. Any reference to any register in microprocessor 600, either as a source or a destination is always done during the second half or during LP$\phi$B of an instruction.

Using AND gates 6134 and 6135 signal $\phi 2$ is anded with signals LP$\phi$A (NBA103) and LP$\phi$B (NBA104) to generate signals NBA105 or LP$\phi$A2 and NBA106 or LP$\phi$B2. Signal LP$\phi$A2 which appears at pin 6 of gate 6134 is exactly at the center of the first half of the instruction while signal LP$\phi$B2 which appears at pin 8 of flip-flop 6135 is exactly at the center of the second half of the instruction.

Waveforms NBA107 or Y0 which is the signal appearing at pin 14 of PROM 710, NBA108 or Y1 which is the signal appearing at pin 13 of the PROM 710 and NBA109 or Y2 which is the signal appearing at pin 12 of PROM 710, illustrate the signals of three of the sixteen outputs of the PROMS in control store 700. These three bits decode the instruction. As noted before, there are seven instructions performed by microcontroller 600. All of the seven instructions are 250 nanoseconds wide with the exception of the JUMP instruction which is 125 nanoseconds. This is illustrated in waveforms NBA107, NBA108 and NBA109 where it is stated JMP. As can be seen, all three bits are low or zero, which decodes as a JUMP instruction.

Any register used as a source in microcomputer 600 is enabled or selected during the complete second half of an instruction. Thus as can be seen in FIG. 5D, source decoder 640 is enabled during the full second half of an instruction or when LP$\phi$A is low. This is illustrated in waveform NBA110. On the other hand, any register that is used as a destination will be selected or enabled only during the middle third of the second half of the instruction. This can be seen in FIG. 5E, where the destination decoder 650 is enabled only during LP$\phi$B2 (pin 6). This is illustrated in waveform NBA111.

Regarding waveforms NBA106 through NBA111, it is to be noted that the transitions are shown with exaggerated rise and fall times.

Figure 25:
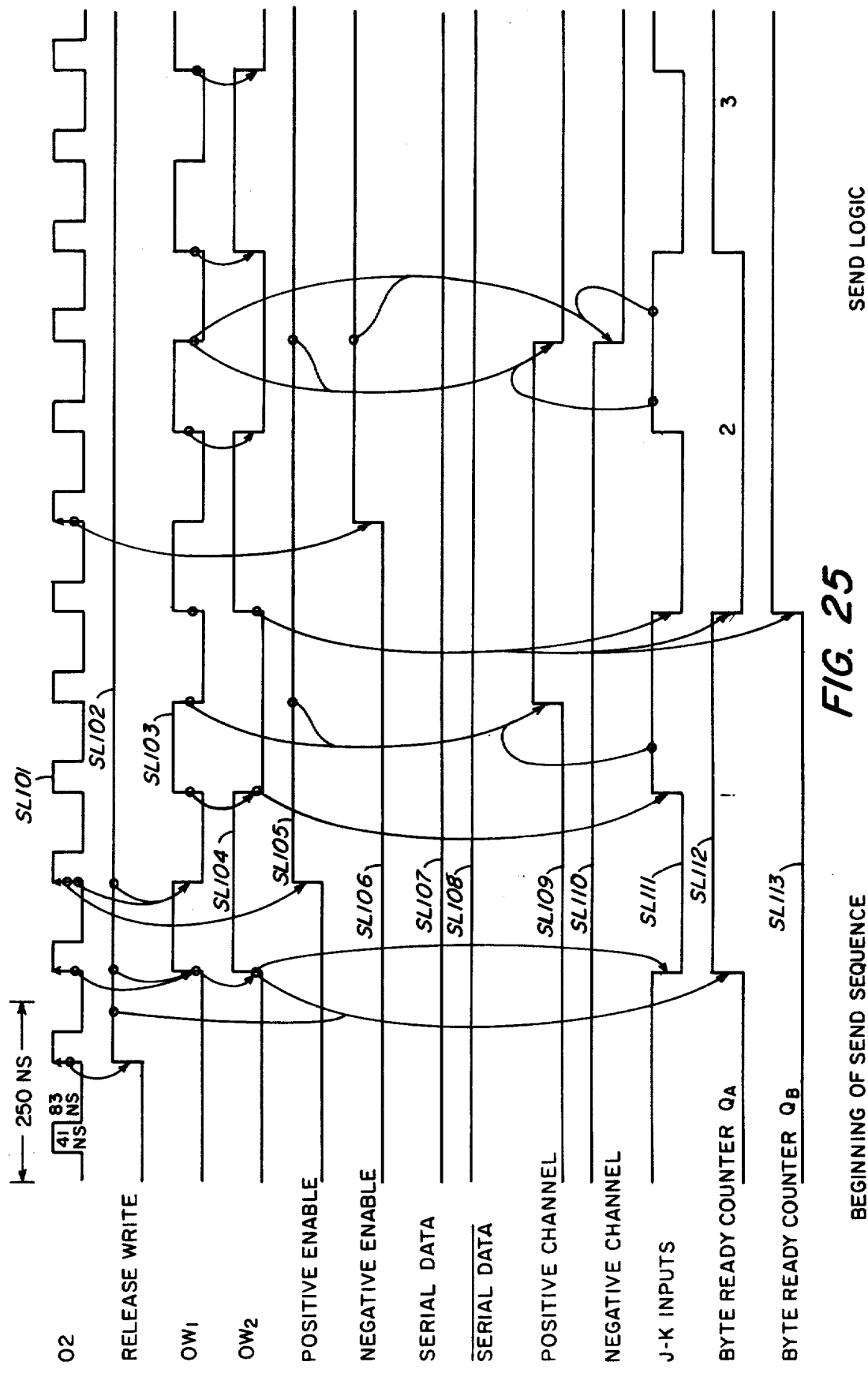
FIG. 25 is a timing diagram showing a number of the signals generated in the beginning of the send sequence in the operation of the write circuit in FIG. 2.

Referring now to FIG. 25, there is illustrated a timing diagram a number of waveforms generated at the beginning of the SEND sequence.

Waveform SL101 or $\phi 2$ is identical to waveform NBA102 in FIG. 24. The first thing that happens during the send sequence is that the write circuit is released. Waveform SL102 illustrates this signal producing this which appears at pin 5 of flip-flop 9010 in write circuit 900 (FIG. 13). This signal, when low, holds all the chips in the write circuit 900 at reset. When the signal goes high all the chips are released.

Wavelength SL103 or $\phi W_1$, is waveform NBA102 or $\phi 2$ divided by two and waveform SL104 or $\phi W_2$ is waveform SL103 or $\phi W_1$ divided by two. These two signals are used to generate the transmission signal. Waveform SL103 is the signal appearing at pin 9 of flip-flop 9041 in write circuit 900 and waveform SL104 is the signal appearing at pin 5 of flip-flop 9042 in write circuit 900. Waveform SL105 or POSITIVE ENABLE illustrates the signal appearing at pin 4 of flip-flop 930 and waveform SL106 or NEGATIVE ENABLE illustrates the signal appearing at pin 7 of flip-flop 940. When signals SL105 and SL106 are high, the positive channel and the negative channel are released. As can be seen, the positive channel is released before the negative channel. This is necessary so that both channels are in phase with each other.

Waveform SL107 or SERIAL DATA illustrates the signal appearing at the Q output, pin 13 of parallel to serial converter 920. Waveform SL108 or $\overline{\text{SERIAL DATA}}$ illustrates the signal appearing at the output of gate 10-S in gate circuit 990. Both of these waveforms are inactive during the time interval shown since all zero's are being transmitted, which is the preamble.

Waveform SL109 or POSITIVE CHANNEL illustrated the output signal of the positive channel which is sent to the driver circuit 300, in the wall box WB over line 32. Waveform SL110 illustrated the output signal of the negative channel which is sent to the drive circuit 300 of wall box WB over line 31. As can be seen signal SL109 is initially high and out of phase with signal SL110 which is low so that the driver is TRI-STATE; however later on in time they are in phase with each other while the driver is sending. Waveform SL109 is the signal appearing at pin 3 of NAND gate 970 and waveform SL110 is the signal appearing at pin 6 of NAND gate 980.

Waveform SL111 or J-K INPUTS illustrates the signal appearing at pins 2 and 3 of flip-flop 950 and pins 2 and 3 of flip-flop 960. These two signals tell flip-flop 950 and 960 whether or not to change states. If the line is high at the occurrence of $\phi W_1$ going low these two flip-flops will change state. If the signal is low the flip-flops will not change state. Waveform SL111 is always high during a clock transition and is high to generate a data transition only if the data is a one bit.

Counter 9030 counts bits as they go out and shifts in a new byte every eight bits. Waveform SL112 or BYTE READY COUNTER QA and waveform SL113 or BYTE READY COUNTER QB illustrate the signals from counter 9030 counting the bits going out. Waveform SL112 is the signal appearing at pin 14 of counter 9030 and waveform SL113 is the signal appearing at pin 14 of counter 9030.

Figure 26:
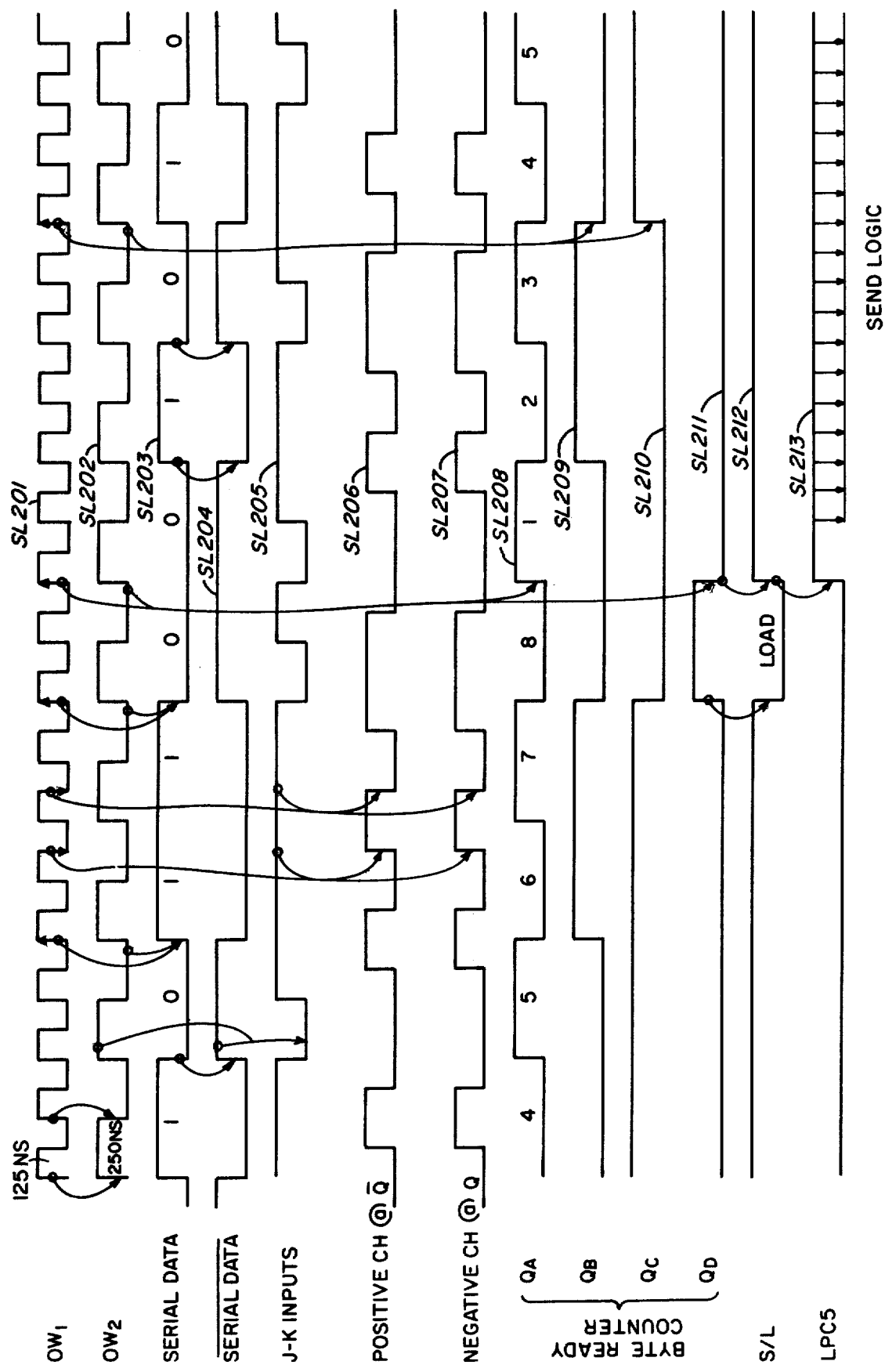
FIG. 26 is a timing diagram showing a number of the signals generated after the beginning portion send sequence in the operation of the write circuit in FIG. 2.

Referring now to FIG. 26, there is illustrated a timing diagram of a number of the waveforms generated during the middle of the SEND sequence. These waveforms are also generated within write circuit 900 shown in FIG. 13.

Waveform SL201 or $\phi W_1$ and waveform SL202 or $\phi W_2$ are the same as SL103 and SL104 in FIG. 25. Waveform SL203 or SERIAL DATA and waveform SL204 or $\overline{\text{SERIALDATA}}$ are the same as waveforms SL107 and SL108 except that they are shown as actual data rather than all zeros, a high level being represented as a one and a low level being represented as a zero on waveform SL203. As can be seen, waveform SL204 is the reciprocal of waveform SL203. Waveform SL2025 or JK INPUTS illustrates the signal appearing at pins 2 and 3 of flip-flop 950 and pins 2 and 3 of flip-flop 960 during this portion of the send sequence. As can be seen, every time there is a zero at waveform SL203 there is a corresponding low portion at waveform SL205 telling flip-flops 950 and 960 not to change state i.e. to transmit a zero.

Waveform SL206 or POSITIVE CHANNEL $\overline{Q}$ and waveform SL207 or NEGATIVE CHANNEL Q are identical to waveforms SL105 and SL106. As can be seen, there is a transition every 500 nanoseconds which is the clock transition. There is a transition between each clock transition only if the data bit is a one.

Waveform SL208 or $Q_A$ and waveform SL209 or $Q_B$ are identical to waveforms SL112 and SL113, respectively, and are the signals appearing at pins 14 and 13 respectively of counter 9030. Waveforms SL208 and SL209, SL210 and SL211 count the eight bits. When the count is eight, the output signal which is waveform SL211 or $Q_D$ generates a pulse which is inverted at pin 11 of flip-flop 9020, which is the signal shown in waveform SL212 or $Q_D$. Waveform SL212 feeds into parallel to serial converter 920 at pin 15 and shifts in the next byte of data. This signal also triggers flip-flop 9020 at pin 9 so as to set CONDITION FIVE which is also referred to as TRANSMIT BUFFER EMPTY or TBMT. Waveform SL213 or LPC5 illustrates CONDITION FIVE being set and then being reset at a later time by the microcode, as illustrated by the plurality of arrows.

Figure 27:
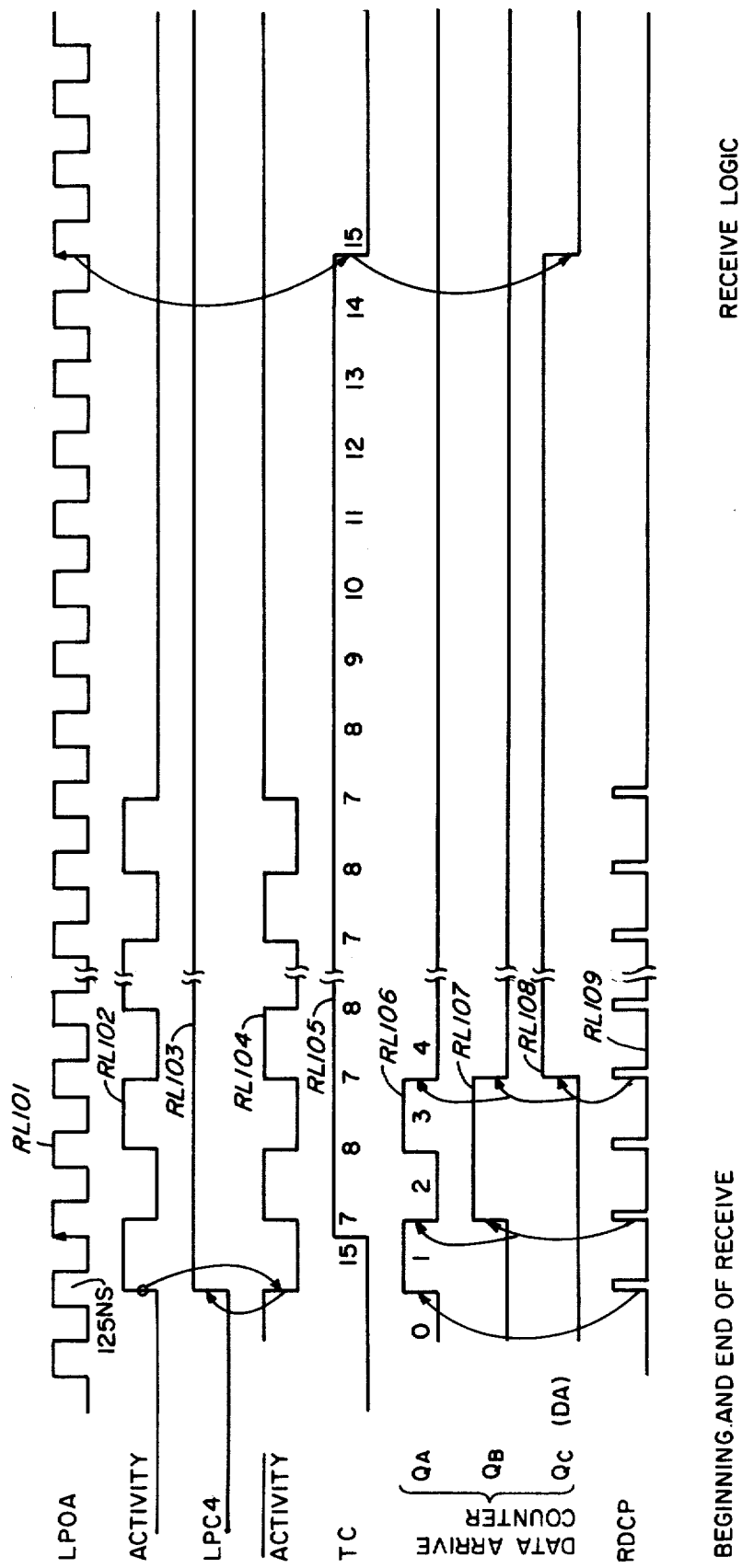
FIG. 27 is a timing diagram showing a number of the signals generated in the beginning and end of the receive sequence in the operation of the receive circuit, the receive circuit being composed of elements 1000, 1300, 1400 and 1500 in FIG. 2.

Referring now to FIG. 27, there is illustrated a timing diagram of a number of the waveforms during the beginning and end of the RECEIVE sequence.

Waveform RL101 or LP$\phi$A is identical to waveform NBA103 in FIG. 24. Waveform RL103 or LPC4 is the waveform for CONDITION 4 on the line activity indicator 1400 indicating that there is activity on line 33. The waveform is the signal appearing on pin 13 of flip-flop 1410. The activity, which is illustrated in waveform RL102 or ACTIVITY is the signal appearing at pin 6 of the optical isolator shown in FIG. 12. Waveform RL104 or $\overline{\text{ACTIVITY}}$ is simply the inverse of waveform RL102 and is the signal appearing at pin 11 of counter 1520. Waveform RL104 remains high until reset by the microcode.

Waveform RL106 or $Q_A$, waveform RL107 or $Q_B$ and waveform RL107 or $Q_C$ are the signals appearing at pins 14, 13 and 12 respectively of counter 1530 in message detector 1500 shown in FIG. 12. Counter 1530 counts the number of bits before data arriving is set which is four bits. After four bits have arrived and have been successfully received, pin 12 goes high. Waveform RL108 or $Q_C$ (DA) is the signal indicating that data is arriving.

Waveform RL109 or RECP illustrates the signal at pin 6 of flip-flop 13040 in the digital phase locked loop and data separator 1300 shown in FIG. 14. There is one clock pulse for every bit that is sent in and this signal is what is used to trigger counter circuit 1530 in message detector 1500. Counter 1520 is used to count eight bits after data is stopped before allowing data arriving to go low. This signal is illustrated in waveform RL105 or TC which is the waveform appearing at pin 12 of counter 1520 in message detector 1500.

Figure 28:
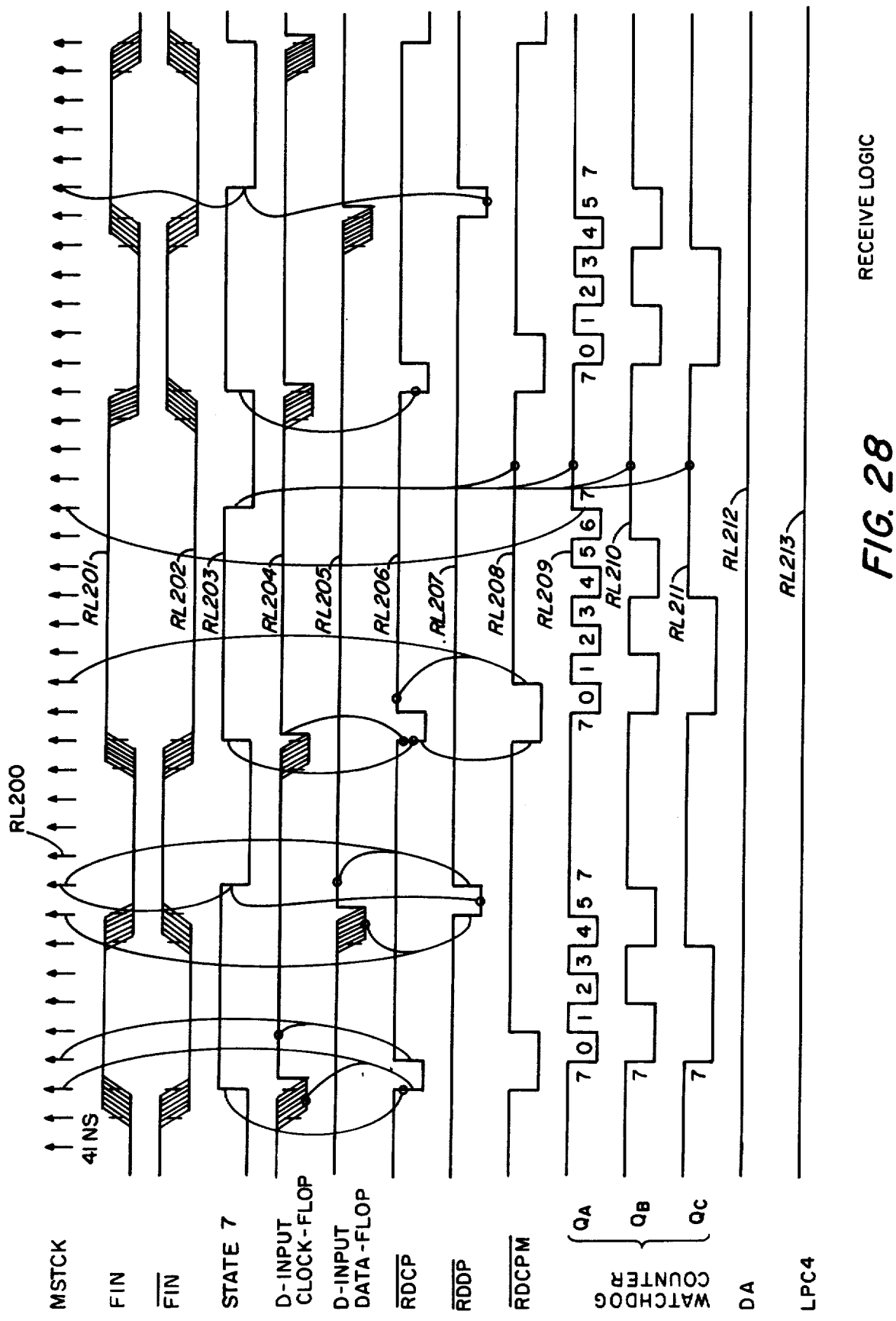
FIG. 28 is a timing diagram showing a number of the waveforms generated in the intermediate portion of the receive sequence in the operation of the receive circuit of FIG. 2.

Referring now to FIG. 28, there is illustrated a timing diagram of a number of the waveforms generated in the middle or intermediate portion of the receive sequence.

Waveform RL200 or MSTCK is the same waveform as waveform NBA100 in FIG. 24. Waveform RL201 or FIN and waveform RL202 or $\overline{\text{FIN}}$ illustrate the signals appearing at pin 3 of flip-flop 1340 and pin 3 of flip-flop 1320, respectively. These two signals represent frequency in and the reciprocal of frequency in, respectively. It should be noted that because the incoming signal is out of sync with the clock of the adapter unit, it must be made synchronous with the master clock. This is illustrated by the set of lines during a transition.

Waveform RL203 or STATE SEVEN illustrates the signal generated at pin 7 of counter 1350 or line 1310-2. This signal is the "watch-dog" signal. The signal stays high for $\frac{3}{4}$ of the length of a bit time. If the transition is found while this signal is high, then the bit that just arrived is a one. On the other hand, if no transition is found then the bit is a zero.

Waveform RL204 or D-INPUT CLOCK FLOP illustrates the signal appearing at pin 2 of the flip-flop 13040. This signal goes low anytime a clock transition occurs. Waveform RL205 or D-INPUT DATA FLOP illustrates the signal appearing at pin 12 of the flip-flop 13050. This signal goes low anytime a data transition occurs. The results of waveforms RL204 and RL205 are waveforms RL206 or $\overline{\text{RDCP}}$ and RL207 or $\overline{\text{RDDP}}$ which appear at pin 6 of flip-flop 13040 and pin 9 of flip-flop 13050, respectively. As can be seen, waveform RL207 goes low only when there is an extra transition in waveform RL201 in the middle of the master clock pulse.

Waveform RL208 or $\overline{\text{RDCPM}}$ illustrates the clock pulse modified and is actually the addition of two clock pulses, side by side. The signal appears at pin 12 of NAND gate 13010.

Waveforms RL209 or $Q_A$, RL210 or $Q_B$ and RL211 or $Q_C$ are the signals appearing at pins 11, 12 and 13 respectively of counter 1350. Counter 1350 is the "watch-dog" counter.

It should be noted that when counter 1350 gets to seven then the signal STATE SEVEN or waveform RL203 goes low.

Waveform RL212 or DA is the same as waveform RL108 in FIG. 27 and in this case is always high since it is in the middle of a receive sequence. Waveform RL213 or LPC4 is the same as waveform RL103. This signal is also always high since it is in the middle of a receive sequence.

Figure 29:
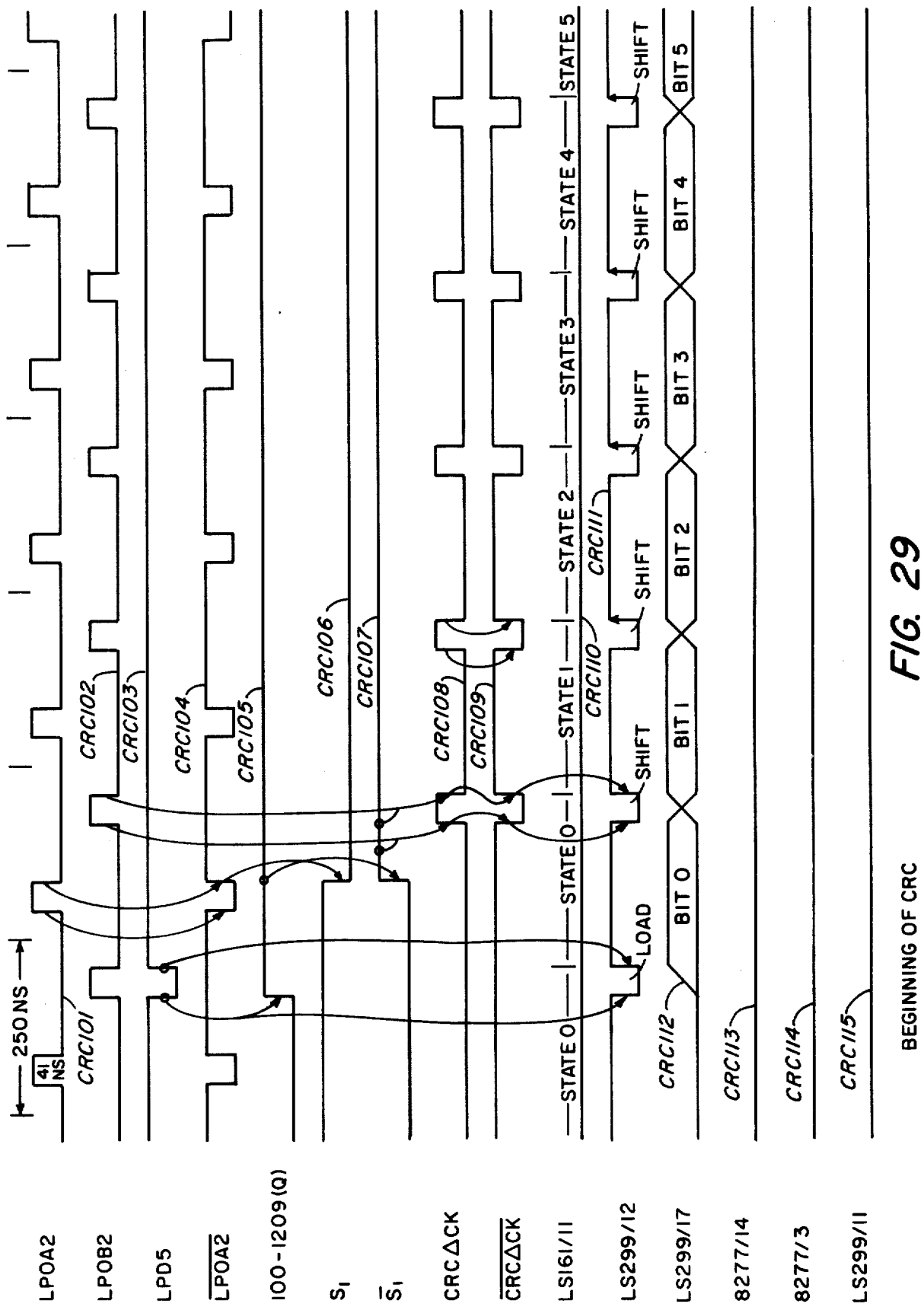
FIG. 29 is a timing diagram showing a number of the waveforms generated in the beginning of the CRC sequence in the operation of the CRC generator shown in FIG. 2.
Figure 30:
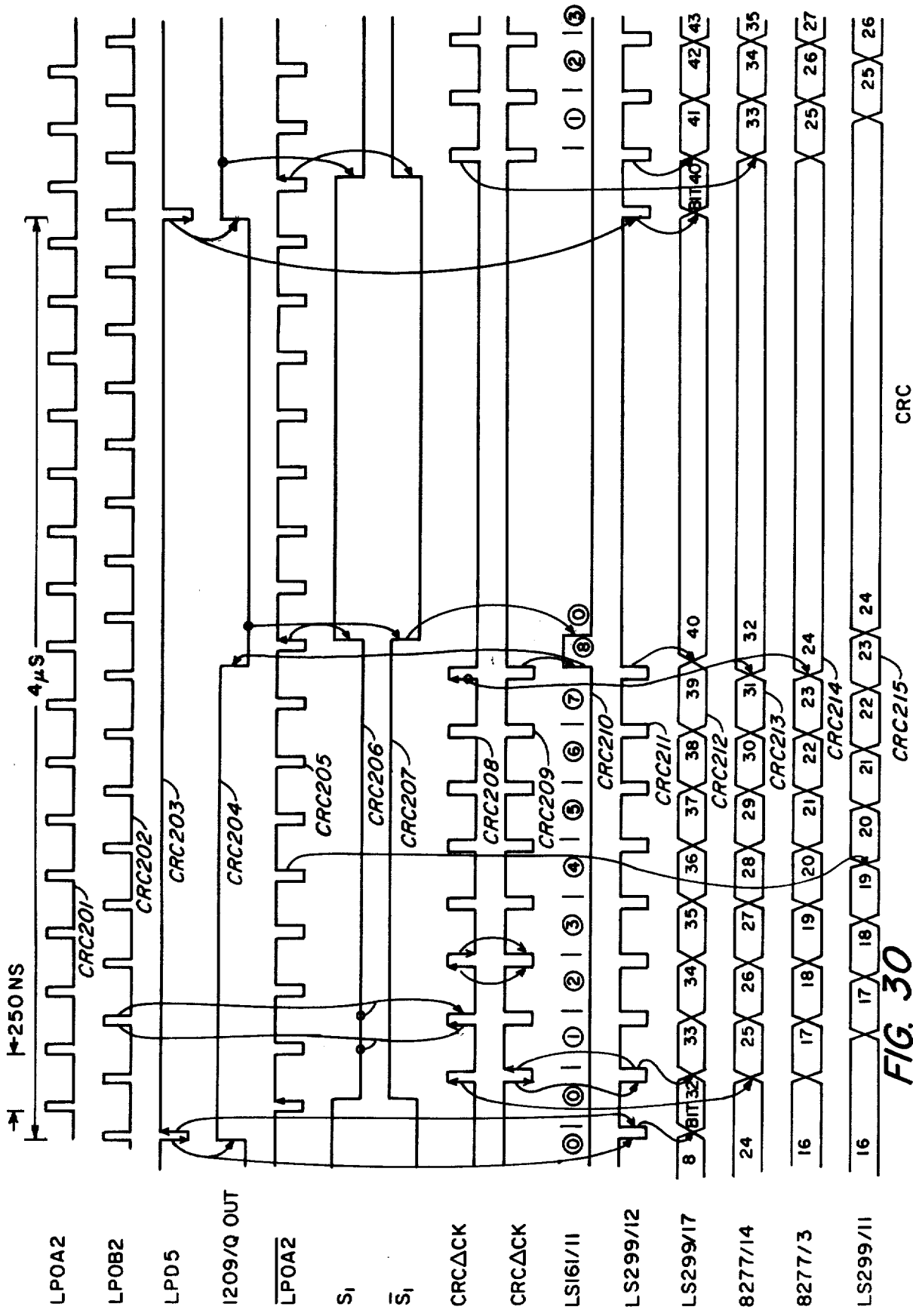
FIG. 30 is a timing diagram showing a number of the waveforms generated in the remainder portion of the CRC sequence in the operation of the CRC generator shown in FIG. 2.
Figure 31A:
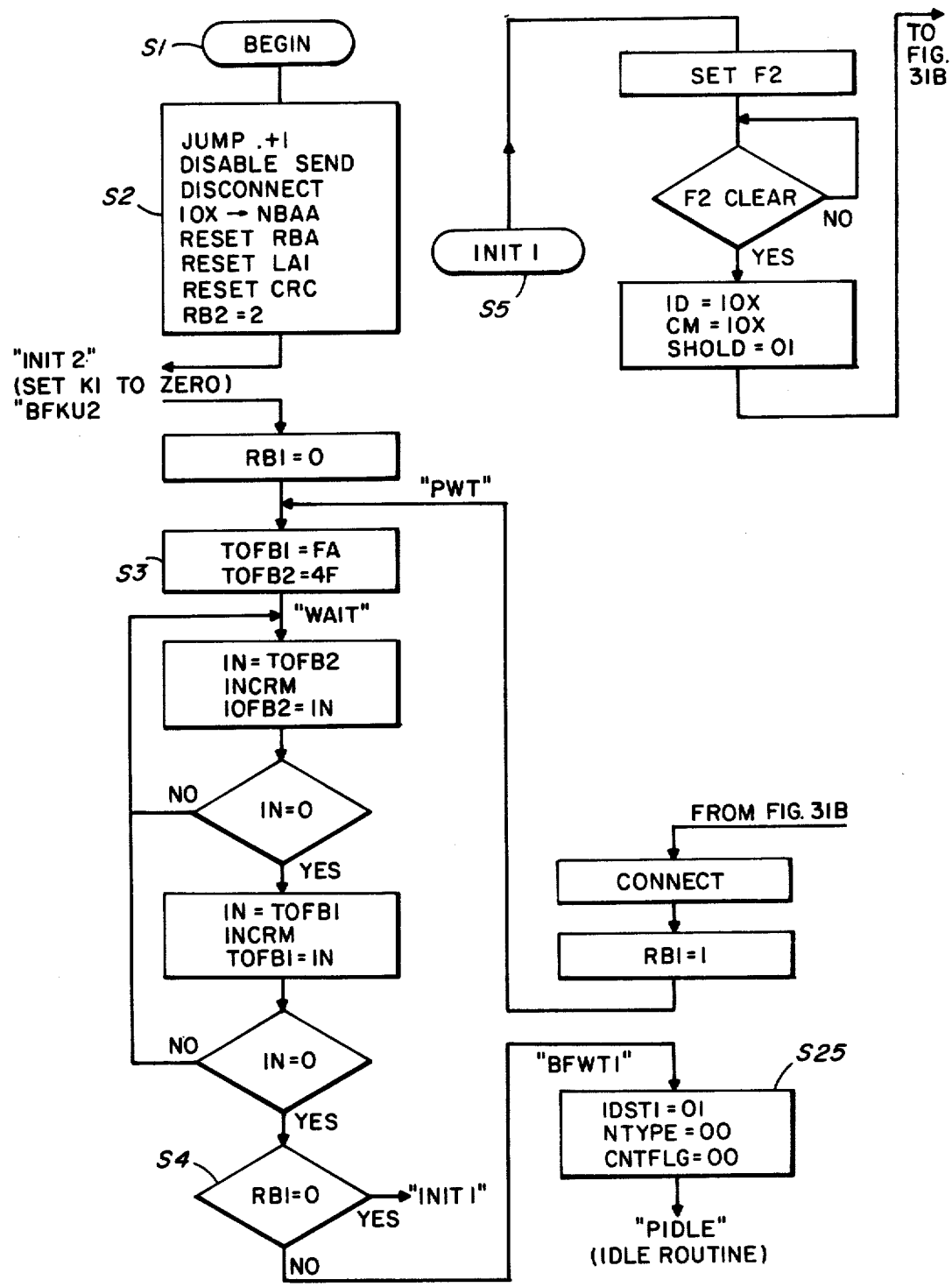
FIGS. 31A, 31B, 31C and 31D is a system flow chart for the SELF TEST subroutine.
Figure 31B:
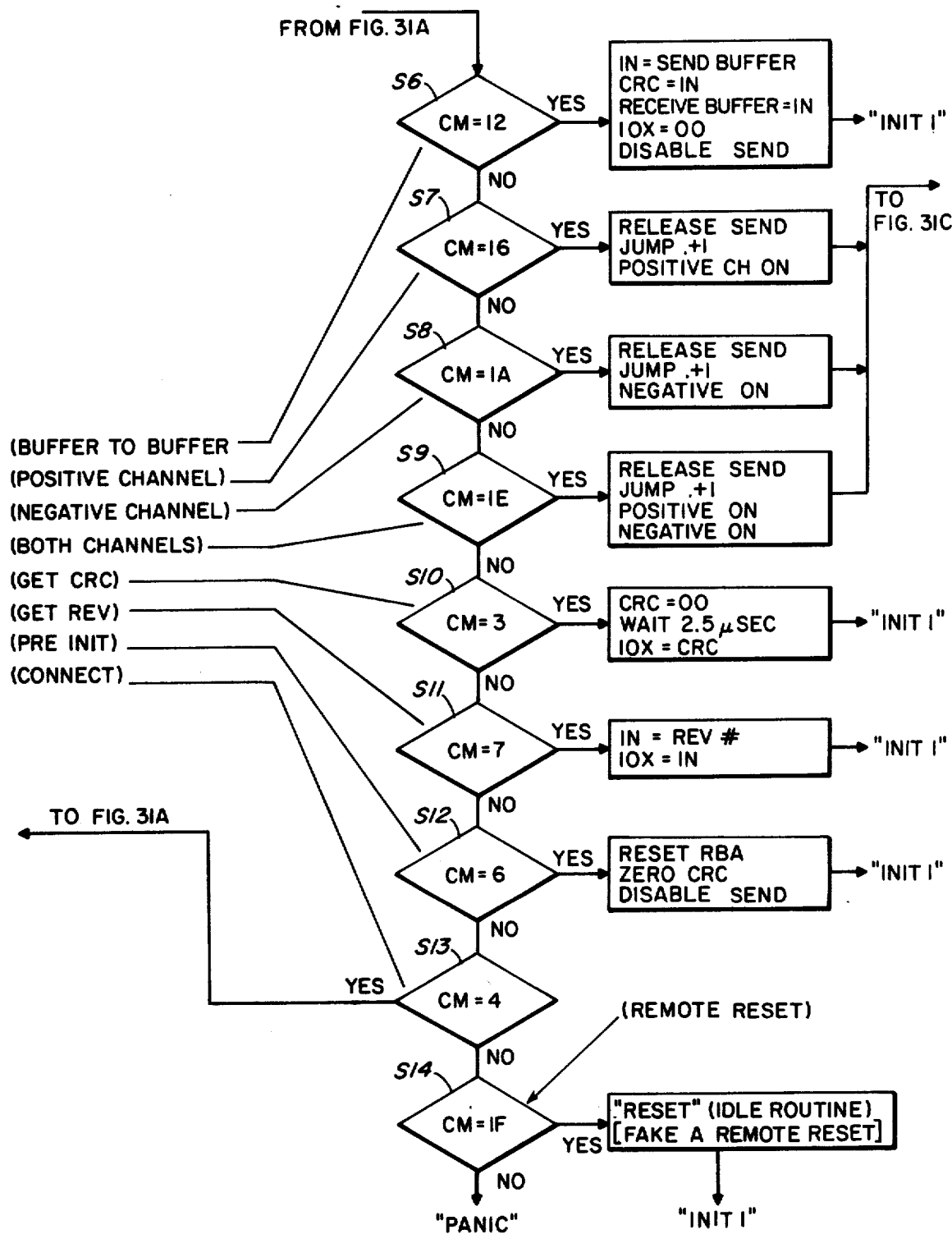
Figure 31C:
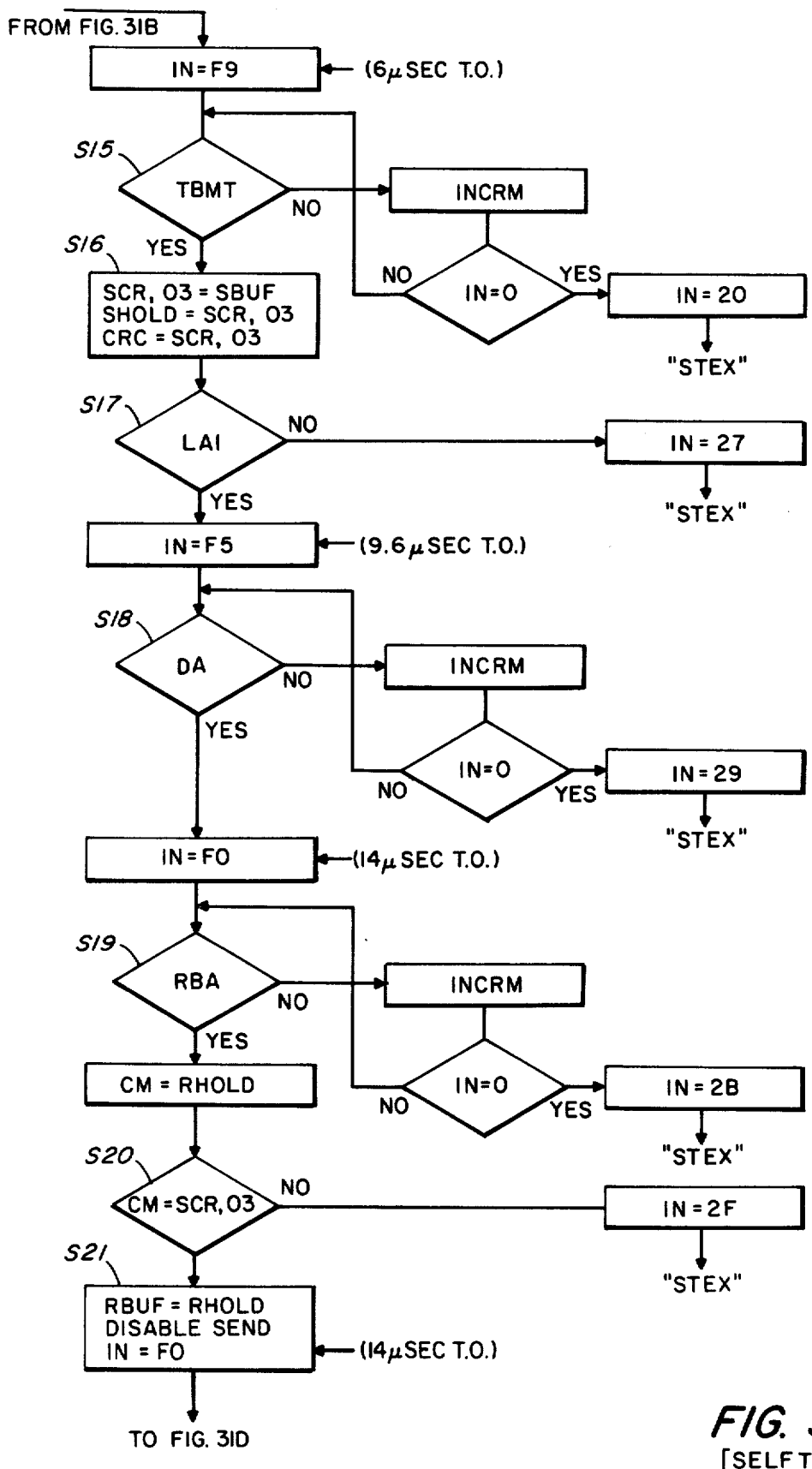
Figure 31D:
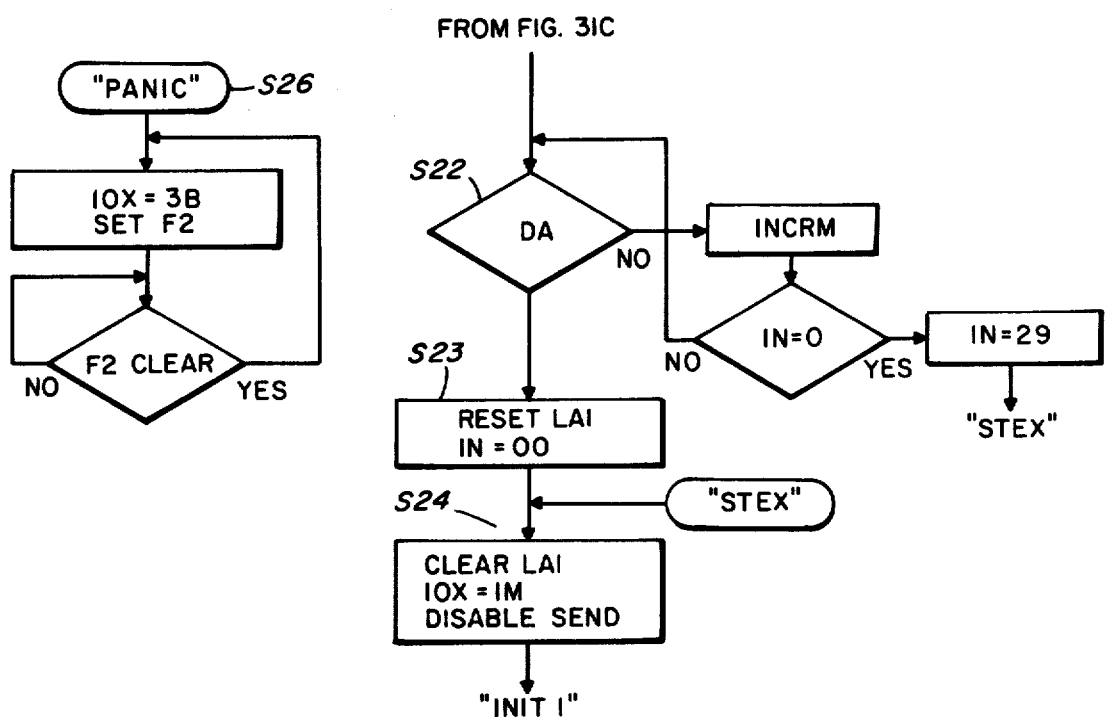

Referring now to FIGS. 29 and 30, there is illustrated a number of the waveforms generated during the CRC (cyclical redundancy checkword) sequence, FIG. 29, showing some of the waveforms generated in the beginning of the CRC sequence and FIG. 30 showing some of the waveforms generated in the remainder of the CRC sequence.

Waveform CRC101 or Lp$\phi$A2 is the same as waveform NBA105 in FIG. 24 and waveform CRC102 or LP$\phi$B2 is the same as waveform NBA106 in FIG. 24.

Waveform CRC103 LPD5 illustrates the signal appearing at pin 13 of gate 1613 in FIG. 6A. This is the destination pulse indicating that a byte is being put into CRC generator 1600 every time the pulse goes low. Waveform CRC104 or $\overline{\text{LP}\phi\text{A2}}$ is the reciprocal of waveform CRC101 and is the signal appearing at pin 11 of flip-flop 1606. Waveform CRC105 or 100-1209 (Q) illustrates the signal appearing at pin 12 of flip-flop 1606. The signal represented by waveform CRC105 is high as long as the CRC is being shifted serially out of the parallel in/serial out register 1601.

Waveform CRC207 or Si (FIG. 30), illustrates the signal appearing at pin 9 of flip-flop 1606. Waveform CRC208 or CRC$\Delta$CK illustrates the signal appearing at pin 3 of NAND gate 1610. As can be seen, waveform CRC208 is the reciprocal of waveform CRC208. Waveform CRC209 is the same as waveform CRC204 or 1209/Q OUT except that waveform CRC207 is delayed by signal waveform CRC205 or 0VS/LPQA2/.

Waveforms CRC208 or CRC$\Delta$CK and CRC209 or $\overline{\text{CRC}\Delta\text{CK}}$ are generated using waveform CRC206 as a window. Waveform CRC208 is the signal appearing at pin 3 of gate 1610 and waveform CRC209 is the signal appearing at pin 12 of gate 1613. As can be seen, there are eight pulses in waveforms CRC208 and CRC209. These pulses are fed into register 1601 to shift the byte serially eight times.

Waveform CRC210 illustrates the signal appearing at pin 11 of counter 1602 which is the counter that actually counts the eight bits and which causes the signal shown at waveform CRC204 to go low and in turn cause the signal shown at waveform CRC206 to go high.

Waveform CRC211 or LS299/12 illustrates the signal appearing at pin 11 of gate 1613. This signal is the destination pulse of waveform CRC204 which is anded with the eight clock pulses from pin 7 of gate 1611 to form nine pulses. The first pulse occurs when the signal of waveform CRC206 is high and causes the byte to be loaded in parallel. The next eight pulses occur when the signal of waveform CRC206 is low, causing the byte to be shifted serially out of register 1601 at pin 17. The output signal at pin 17 of register 1601 is shown in waveform CRC212 or LS229/17.

Waveform CRC213 or 8277/14 illustrates the signal appearing at the output of serial register 1603 at pin 3 which is the first register. Waveform CRC214 or 8277/3 illustrates the output signal appearing at pin 14 of serial register 1604 which is the second shift register. The output of register 1603 and 1604 are tied back to their inputs through the exclusive OR gates 1608 and 1609 so that the function of the circuit is to generate a CRC with a polynormal $X^{16} + X^8 + X$.

Waveform CRC215 or LS229/11 illustrates the signal appearing at pin 5 of flip-flop 1607 which is the serial data being shifted back into shift register 1601 at pin 11. It should be noted that the signal of waveform CRC215 is being shifted slightly later than the signals of waveforms CRC212, CRC213 and CRC214. It should also be noted that a new byte is being put into the CRC destination every 4 microseconds and that it takes less than 3 microseconds for the eight bits to shift serially through the circuit.

Waveforms CRC106 or Si, CRC107 or $\overline{\text{Si}}$, CRC108 or CRC$\Delta$CK and CRC109 or $\overline{\text{CRC}\Delta\text{CK}}$ are the same as waveforms CRC206, CRC207, CRC208 and CRC209, respectively. Waveforms CRC110 or LS16/11, CRC111 or LS299/12, CRC112 or LS229/17 and CRC113 or 8277/14 are the same as waveforms CRC210, CRC211, CRC212 and CRC213, respectively. Waveforms CRC114 or 8277/3, CRC115 or LS229/11, CRC201 or LP$\phi$A2 and CRC202 or LP$\phi$B2 are the same as waveforms CRC215, NBA105 and NBA106, respectively. Waveforms CRC203 or LPD5 and CRC204 or 1209/Q OUT are the same as waveforms CRC103 and CRC105, respectively.

OPERATION OF THE SYSTEM

In the operation of the system, message frames are transmitted at 2 megabits/second. All data bytes are serialized high order bit within byte first. The format of transmitted and received messages are defined below using modified BNF notation. The notation has been extended with two functions:

CRC (<X>) is the 16 bit remainder of the argument <X> divided by the polynominal X 16+X 8+1, serialized high order bit first.

LENGTH (<X>) is the two's compliment of the 16 bit length of the byte string <X>, serialized high order byte first, high order bit within byte first. Message frame format in modified BNF notation.

| | |
|---|---|
| <transmitted_message> | ::= <syncronization_prefix> |
| | <message_text> |
| | CRC( <message_text> ) |
| | <message_end_clocking_suffix> |
| <message_text> | ::= <configuration_poll>: |
| | <startup_broadcast_poll>: |

-continued

```
                                       <control_transfer_poll>:
                                       <restart_request>:
                                       <send_request>:
                                       <data>:
                                       <receive_acknowledge>:
                                       <receive_not_ready>:
                                       <receive_suspended_reject>:
                                       <receive_disabled_reject>:
                                       <acknowledge>:
                                       <reject>:
                                       <restart_reject>
                                       <restart_acknowledge>
                                       <reacknowledge_request>
                                       <type_request>
                                       <type_response>
                                       <control_request>
<configuration_poll>              :: = '31' <routing_header>
<startup_broadcast_poll>          :: = '52' <dummy_routing_header>
<control_transfer_poll>           :: = '64' <routing_header>
<restart_request>                 :: = '54' <routing_header>
<send_request>                    :: = '98' <routing_header>
<data>                            :: = 'A4' LENGTH( <text> ) <text>
<receive_acknowledge>             :: = '13' <routing_header>
<receive_not_ready>               :: = '25' <routing_header>
<receive_suspended_reject>        ::— = '89' <routing_header>
<receive_disabled_reject>         :: = '46' <routing_header>
<acknowledge>                     :: = '1A' <routing_header>
<reject>                          :: = '94' <routing_header>
<restart_reject>                  :: = '61' <routing_header>
<restart_acknowledge>             :: = 'A1' <routing_header>
<reacknowledge_request>           :: = '2A' <routing_header>
<type_request>                    :: = '11' <routing_header>
<type_response>                   :: = '21' <routing_header> <node_type>
<control_request>                 :: = '41' <routing_header>
<syncronization_prefix>           :: = '00' '00' '00' '00' '01'
<message_end_clocking_suffix>     :: = '00' '00' '00' '00'
<routing_header>                  :: = <destination_node_address>
                                       <source_node_address>
<dummy_routing_header>            :: = "00"
                                       <source node address>
<source_node_address >            :: = '00'..'7F'
<destination_node_address>        :: = '00'..'7F'
<node_type>                       :: = '00'..'FF'
<text>                            :: = <text_byte> +
<text_byte>                       :: = '00'..'FF'
```

In the operation of the system a number of different time intervals are utilized and referred to in the discussion to follow. They are the idle timeout, the ringing timeout, the start of an election time interval, the election timeout, the configuration poll timeout, the newcomer interrogate interval, the network pulse, the individual pulse and the reply timeout.

The "idle" timeout is the timeout used to detect the absence of activity on the bus. A typical value for the timeout is 30 milliseconds. The "ringing" timeout is the time interval which is used to give the transmission bus time to settle down after a transmission. A typical value for this time interval is 20 microseconds. The "start of an election" time interval is the interval between the "idle" timeout and the start of an election. A typical value for this interval is 250 microseconds. The "election" timeout is the time interval an adapter unit monitors the bus for inactivity during an election. It is equal to the product of its assigned unique number and a time period $T_p$. A typical value for $T_p$ is 200 microseconds.

The "configuration poll" timeout is the time interval an adapter unit waits for an answer to an "Are you there" message in when it is in a NEXT NODE UPDATE mode. A typical value for this time interval is 230 microseconds. The "newcomer interrogate" interval is the interval an adapter waits for a reply to an "Are there any newcomers" message. A typical value for this time interval is 8000 message frame.

The "network pulse" is a pulse which is sent at the start of an election or as a response to a newcomer interrogation. A typical value for this pulse is 125 microseconds. An "individual" pulse is a pulse which is sent out by the winner of an election. The "reply timeout" is a time interval that is used to wait for a reply from any message requiring a reply (i.e. a "request to send"). A typical value for this interval is 225 microseconds.

OPERATION OF THE SYSTEM

The basic instructions executed by adapter unit 14 referred to above and which are illustrated in FIGS. 17 through 23 are:

1. "PULSE"—Issue a pulse on one of the sixteen pulse lines emanating from microcontroller 600;

2. "MOVE"—Move a byte of data from any of the eight sources to any of the eight destinations. Should the move involve the scratch pad memory, the instruction specifies the address of the byte;

3. "BRANCH CONDITIONALLY"—If the condition (high level) is satisfied on any of the eight input condition lines, modify the least significant nibble of the program counter in accordance with the field specified in the instruction. If the condition is not met, advance to the next instruction;

4. "JUMP"—Modify the program counter unconditionally in accordance with the field shown in the instruction.

5. "STORE IMMEDIATE"—Move a byte of data from the immediate field of the instruction to any of the eight destination. Should the move involve the scratch pad memory, the instruction specifies the address of the byte;

6. "BRANCH EQUAL REGISTER"—Compare the contents of the comparator with the contents of the scratch pad location specified. If the bytes compare modify the least significant nibble of the program counter in accordance with the field specified in the instruction. If the condition is not met, advance to the next instruction; and 7. "BRANCH EQUAL IMMEDIATE"—Compare the contents of the comparator with the immediate field of the instruction. If the bytes compare, modify the least significant nibble of the program counter in accordance with the field specified in the instruction. If the condition is not met, advance to the next instruction.

Figure 16A:
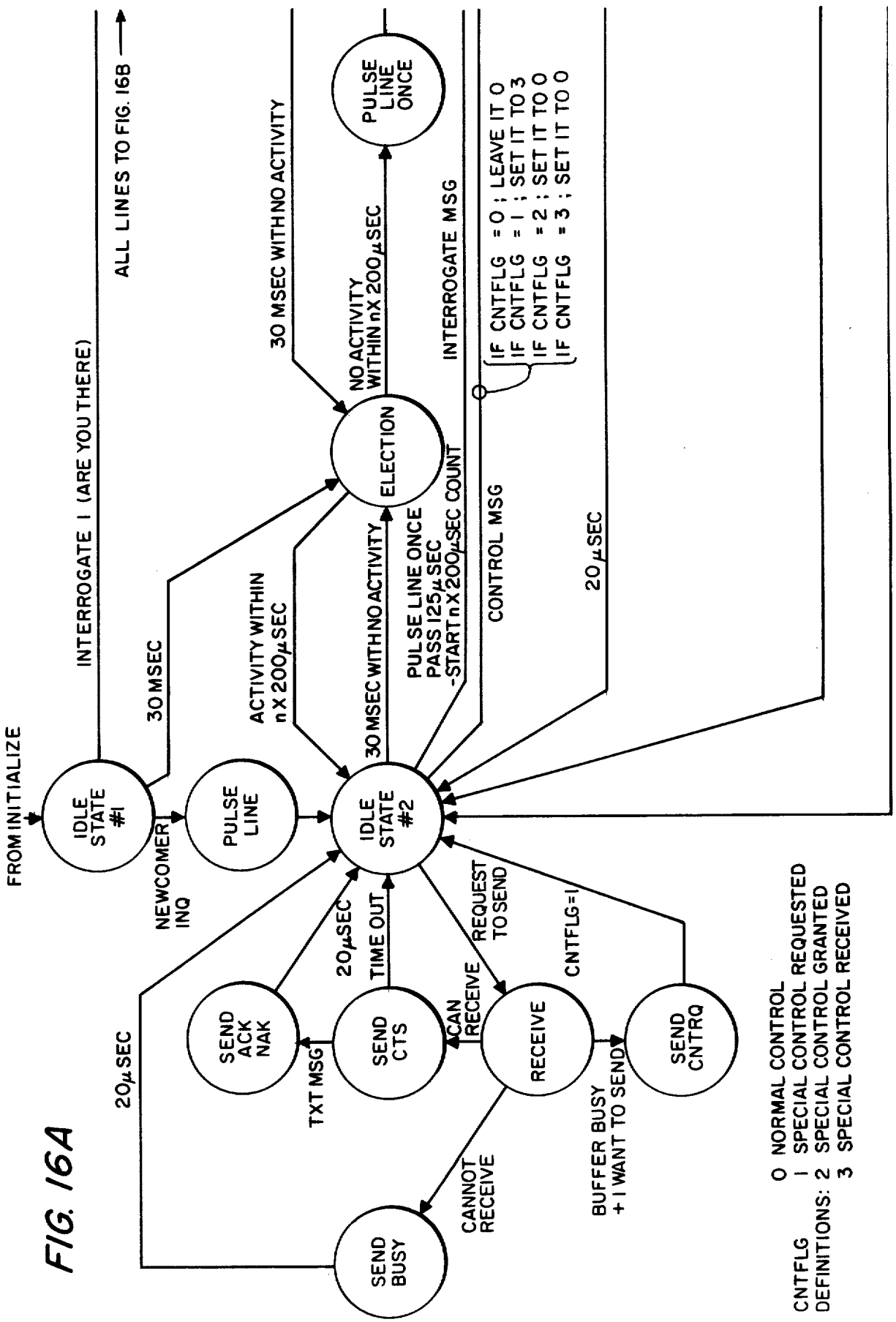
FIGS. 16A and 16B together are a state diagram showing the various sub routines performed by the adapter unit.
Figure 16B:
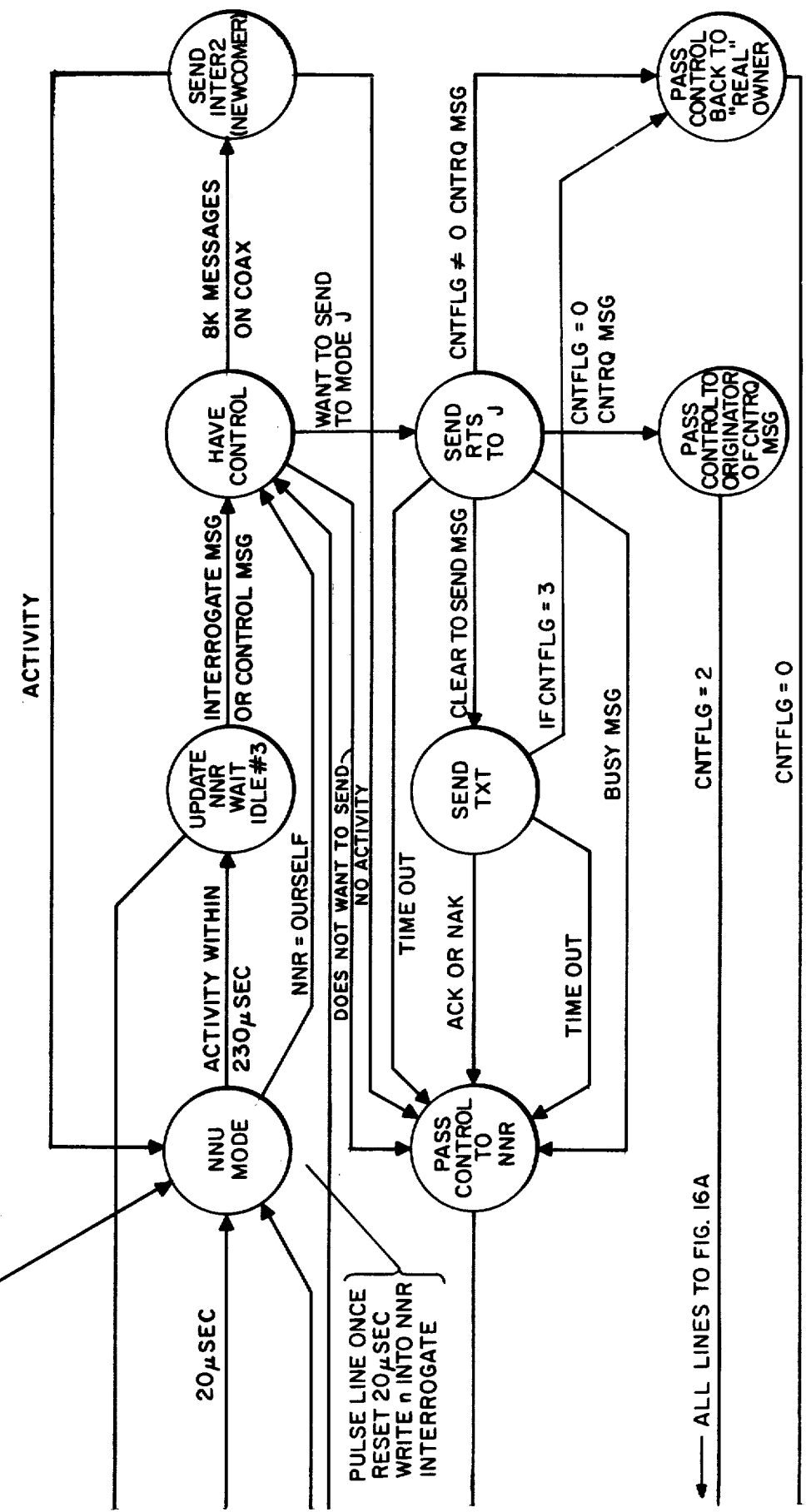
Figure 17:
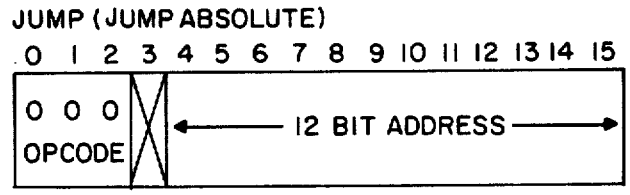
FIG. 17 is a tabular presentation of the format of the JUMP instruction.
Figure 18:
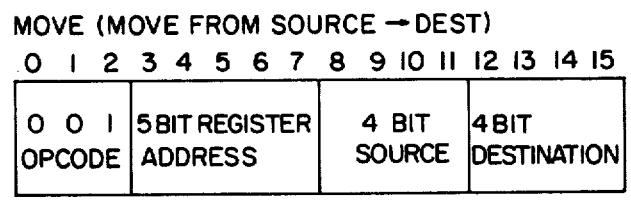
FIG. 18 is a tubular presentation of the format of the MOVE instruction.
Figure 19:
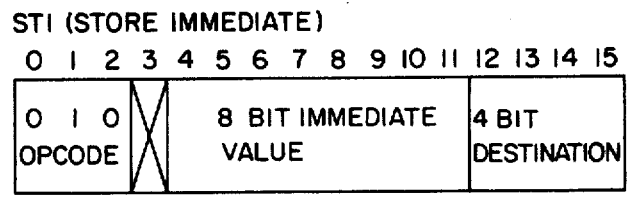
FIG. 19 is a tabular presentation of the format of the STORE IMMEDIATE instruction.
Figure 20:
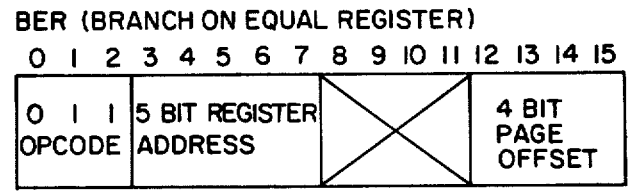
FIG. 20 is a tabular presentation of the format of the BRANCH ON EQUAL REGISTER instruction.
Figure 21:
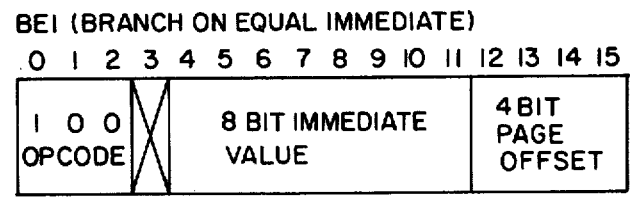
FIG. 21 is a tubular presentation of the format of the BRANCH ON EQUAL IMMEDIATE instruction.
Figure 22:
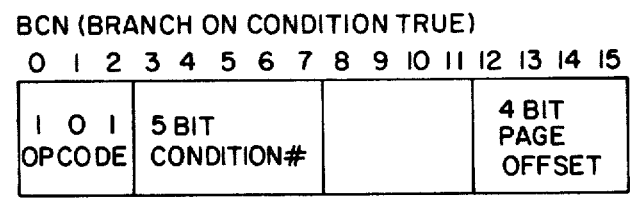
FIG. 22 is a tabular presentation of the format of the BRANCH ON CONDITION TRUE instruction.
Figure 23:
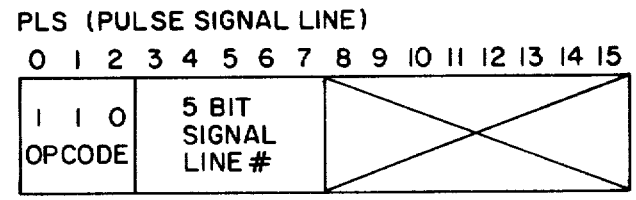
FIG. 23 is a tabular presentation of the format of the PULSE instruction.

These instructions are arranged in subroutines so as to perform the function indicated by the state diagram shown in FIG. 16, wherein times listed are for illustrative purposes only and in the manner as described below.

INITIALIZE: Following power up, the adapter unit disables its send circuits and makes sure that it is disconnected from bus 15. It then carries on a series of self-diagnostics to insure the integrity of the hardware. Then, if all tests are successful, it proceeds to IDLE state #1.

IDLE: When the adapter unit enters IDLE STATE #1 it sets a time out counter. If there is no activity on the line during the time out period it pulses the line once and enters the ELECTION state.

If any activity is detected before the end of the time out period, it resets the time out count and holds it at zero. If the activity is a message, it jumps to the READ routine. If line activity halts again, it starts the time out count again.

If the message is an INTERROGATE 2, "ANY NEWCOMERS?", and the adapter unit has not been introduced to the network, it will respond by pulsing the line once. This informs the adapter unit that originated the interrogation that a CONFIGURATION cycle (Next Node Update Cycle) should be performed.

Specifically, the adapter unit will respond to an INTERROGATE 2 in two cases. First, if the adapter unit is in IDLE STATE 1, because it has just been initialized and needs to be introduced to the network. Second, it will respond if it has already responded to an INTERROGATE 2, and has not been given control. In this case, something has probably happened to prevent the network from accepting it. For instance, the adapter unit that originated the last INTERROGATE 2 might have been powered down before it could initiate a CONFIGURATION cycle. In either case the adapter unit should respond by pulsing the line once and waiting.

If any message other than INTERROGATE 2 is addressed to another adapter unit, the adapter unit returns to IDLE.

If the message is "YOU MAY ACQUIRE CONTROL". The adapter unit will take control, unless it is in IDLE STATE 1. Such a message should not occur, because the existence of an adapter unit in IDLE STATE 1 means that it is unknown to the rest of the network.

If the message is an INTERROGATE 1, there is a CONFIGURATION (NNU) cycle in progress. The adapter unit will join the cycle unless it is in IDLE STATE 3, in which case it will terminate the CONFIGURATION cycle.

It the message is a REQUEST TO SEND (RTS), the adapter unit will jump to the RECEIVE routine.

If the message is a REMOTE RESTART, the adapter unit will check the restart jumper. If it is not set for Remote Restart it will send a CAN'T RESTART message. Otherwise it will restart after replying with a "YES, I'LL RESTART".

ELECTION: If the idling passes the time out period without detecting activity on the bus, the adapter unit goes into the ELECTION mode. This process insures that one and only one adapter unit will acquire control of the inactive network.

First the microcontroller pulses the line once and waits a time interval To. Then it monitors the bus for a time period TB proportional to its own address multiplied by $\Delta$, where $\Delta$ is at least twice the time of flight across the network bus. If it detects any activity before that time period is up, it has lost the election. It will then go to IDLE STATE 2.

Since all adapter units in the network will have entered the ELECTION mode within one-half $\Delta$ of each other, the adapter unit with the lowest address will reach the end of its count first. When it does reach the end of its count, it has won the election. It then pulses the line to remove all the other adapter units from the ELECTION mode. Then it initiates a CONFIGURATION or Next Node Update (NNU) cycle.

NEXT NODE UPDATE: An adapter unit enters the NNU mode after receiving an INTERROGATE 1 or winning an election.

It begins by pulsing the line once. Then it sends an INTERROGTE 1 message (ARE YOU THERE) to the adapter unit with the next higher address. Then the adapter unit monitors activity on the network bus for a $\Delta$ time period. If there is no activity, it interrogates the next adapter unit. If if reaches the highest possible address without seeing any activity, it starts at zero and continues. If it reaches its own address, it goes to HAVE CONTROL and passes control to itself. After passing control to itself eight thousand times it will send out an INTERROGATE 2 message. If there is a response it will enter the NNU mode again. Otherwise, it will continue passing control to itself.

If the adapter unit detects activity, it writes the address of the responding adapter unit in its Next Node Register. This will be the adapter unit that the adapter unit will normally pass control to after it has used the bus. It then goes to IDLE STATE 3.

The adapter unit that receives the INTERROGATE 1 will now be in the CONFIGURATION mode. It pulses the line once, notifying the interrogating adapter unit that it exists. After a short period, it starts interrogating its own successors. The CONFIGURATION mode passes around the network in this fashion until the last adapter unit in the cycle interrogates the first. Thus, when an adapter unit in IDLE STATE 3 receives an INTERROGATE 1, it ends the CONFIGURATION cycle and it may now acquire control.

HAVE CONTROL: This state always starts by the adapter unit asking its computer whether or not it wants to send to a remote station. If the answer is negative, the adapter unit jumps to the end of HAVE CONTROL. If the driving computer answers positively, the adapter unit jumps to the SEND ROUTINE.

SEND ROUTINE: In carrying out the SEND ROUTINE a request to send is sent to the adapter to which the message is to be sent. If the response is a "CLEAR TO SEND" the message is then sent. After receiving an acknowledgement signal (ACK) from the receiving adapter unit, control is passed to the next adapter unit as listed in the Next Node Register and the adapter unit returns to IDLE STATE 2. If the reply is a negative acknowledge (NAK), the message is sent again the next time the adapter unit has control. If the response is BUFFER DISABLED or "BUFFER SUSPENDED" control is also passed. On the other hand, if the reply is "BUFFER BUSY BUT I NEED CONTROL TO SEND", that is, a request for special control (CNTRQ), the control flag is set to 2 indicating that the special request for control is granted and control is passed directly to the requesting adapter unit. If the request for special control occurs at a time when the adapter unit has control as a result of obtaining control pursuant to a "special control" request, the request is not granted. After sending a message pursuant to obtaining "special" control, control is passed back to the adapter unit from which it received control and the adapter unit returns to IDLE STATE 2. If no answer is received by an adapter unit after it has sent a message to another adapter unit a request for acknowledgement (REACK) signal is sent out over the bus.

END OF HAVING CONTROL: Before relinquishing control to the next adapter unit the adapter unit in control checks its K count. The K count is a number incremented each time a valid message appears on the network bus. If the adapter unit finds its K count completed it outputs an "IS THERE A NEW NUMBER" message on the bus. Monitoring activity for the following Δ period, the adapter unit will determine whether there is a newcomer. If there is a newcomer, (activity is sensed at the bus within the period) then the adapter unit jumps to the CONFIGURATION subroutine. If there is no activity within the Δ period or if the K count is not completed, the adapter unit sends a "YOU MAY HAVE CONTROL" message on the bus directed to the adapter unit with the number stored in the Next Adapter Unit Register and jumps to IDLE 2 state.

WRITE: This subroutine is used when the adapter unit sends messages on the network bus. This subroutine formats the message properly and appends the check word to it. The routine starts by resetting the CRC generator. Then it sends a preamble of several zero bits followed by a single one as a sync bit and the message ID. Each byte sent after the sync bit also goes to the CRC generator. If the message is non-text, the next two bytes sent will be the Destination and the Originator. If the message is text, the two tytes sent after the ID are the byte count, the most and least significant bytes of the two's complement of the number of bytes in the text. Then as each byte of text is sent, this number is incremented by one. When the byte count is zero, the text has been sent. After the body of the message has been sent, the adapter unit will send the two CRC bytes it calculated. The message closes with a few bits of postamble. After sending the message, the Write routine returns control to whatever routine called it.

READ: This subroutine is used whenever a message appears on the network bus. It retrieves the information imbedded in the message and also validates the message by comparing the appended check word to the one computed by the resident check word generator. The first byte it takes in is the message ID. It gives it to the CRC then decides whether the message will be text or non-text. The adapter Unit expects text only after it has received an RTS and sent a CTS. If it is the wrong type of message, the adapter unit will generate an error code and return to the routine that called it. If at any time before the postamble the transmission stops, the Read routine generates an error code and returns to the routine that called it.

If the message is non-text, and the adapter unit expected non-text, it stores and CRC's the ID, the originator and the destination bytes. Then it checks the next two bytes received against the CRC word that it has generated. If the checkwords do not match, the adapter unit generates the error code for a bad CRC match, and returns to the routine that called it. Otherwise it returns with no errors.

If the message ID was for text, and the adapter unit was expecting text, it stores and CRC's the next two bytes it receives, the byte count. When it receives and CRC's the next bytes, the text of the message, it increments the byte count. When the byte count is zero, the adapter unit has received the complete text. It then checks the next two bytes it receives against the CRC bytes it has calculated. If the CRC does not match an error is reported and the adapter unit returns to the routine that called it. Otherwise it returns with no errors.

RECEIVE: The entry to this subroutine is from the IDLE state when a "REQUEST TO SEND" message directed to the adapter is sensed on the network bus. The adapter unit relays that fact to its computer and waits for directions. If the computer answers negatively, the adapter unit outputs a message "I CANNOT RECEIVE" which is directed to the sender and goes back to IDLE 2. If the computer's answer is positive, the message going out will be a "CLEAR TO SEND" In this case, a text message appears on the bus. If that message is received successfully (judges by the check words appended to the message), an "ACKNOWLEDGE" message is sent otherwise a "NEGATIVE ACKNOWLEDGE" message is sent. The subroutine ends by a jump to where it came from.

SYSTEM FLOW CHARTS

The basic operations of the adapter unit are performed by a number of subroutines which are best illustrated by means of the flow charts shown in FIGS. 31 through 36. The subroutines are: (1) SELF TEST, (2) IDLE, (3)SEND, (4)WRITE, (5)RECEIVE, and (6)READ. In the flow charts, the adapter unit is referred to sometimes as the line processor or the NBA2. Also, in the flow charts and accompanying discussion, the following label definitions and error codes are employed:

LABEL DEFINITIONS

BEGIN: ENTRY POINT WHEN LP IS RELEASED
BFWR3: BACK FROM WRITE 3—WAIT FOR RESPONSE

CNTRQ: CONTROL REQUEST—REPLY TO MY "CTS" MESSAGE
CTSCK: CLEAR TO SEND CHECK—IF CTS, THEN SEND TEXT
ELECT: ELECTION—START AN ELECTION
EOS: END OF SEND—STORE LSBYTE OF SEND
TYPECK: TYPE CHECK—AM I EXPECTING A "TYPE" MESSAGE?
WON: I WON THE ELECTION
WRITE: TRANSMIT ANY AND ALL MESSAGES ONTO COAX.
< >: A SCRATCHPAD MNEMONIC

| ERROR CODES | | | |
|---|---|---|---|
| TRANSMIT AND RECEIVE | | SELF-TEST | |
| COMPLETED SEND WITH RETRY | 2 | NO LAI | 27 |
| NAK | 3 | NO DA | 29 |
| INVALID RESPONSE | 5 | NO RBA | 2B |
| NO RESPONSE | 7 | NO TBMT | 2D |
| NO ACKNOWLEDGE | 9 | DATA COMPARE (NBA-2) | 2F |
| REMOTE RESET REJECTED | B | DATA COMPARE (NBA-1_ | 31 |
| RECEIVE DISABLED | D | CRC ERROR | 33 |
| REMOTE RESET NOT ENABLED | F | NBA 2 TIMEOUT | 35 |
| RECEIVE SUSPENDED | 11 | PANIC | 3B |
| BUFFER BUSY | 13 | | |
| TIMEOUT | 19 | | |
| CRC ERROR | 1B | | |
| INVALID HEADER | 1D | | |
| UNDERRUN" | 1F | | |
| REMOTE RESET RECEIVED | 21 | | |

STATUS IN INCREMENTOR 25
EOS1: END OF SEND 1—REPORT SEND STATUS TO IO/H
FIRD: FINISH READ—REPORT STATUS TO IO/H
INIT1: INITIALIZE 1—WAIT FOR COMMAND FROM IO/H
INIT2: INITIALIZE 2—RESET K COUNT AND K 1
KUPD: K UPDATE—K COUNT=K count+1
KUPD1: K UPDATE 1—RB2=φφ
LOST: I LOST THE ELECTION (AM NOT LOWEST #)
MDTXT: MID TEXT—READ IN NEXT BYTE OF TEXT
PANIC RETURNS 3B to IO/H
PASCN: PASS CONTROL—PASS CONTROL TO NNR
PASCV: PASS CONTROL VERIFY—IF NO ACTIVITY TRY AGAIN
PHC1: PRE HAVE CONTROL 1—I JUST RECEIVED CONTROL
PHC2: PRE HAVE CONTROL 2—I ALREADY HAVE CONTROL
PIDLE: PRE IDLE—WAITING FOR ANY MESSAGE
PLSLN: PULSE LINE—WAIT 12 uSEC THEN SEND 125 uS PULSE
PRDφ: PRE READφ–CB1=NON TEXT RB1=φφ
PRECRC: PRE CRC—READ TWO CRC BYTES
PRERTN: PRE RETURN—PASS CONTROL TO ORG. OF "CNTRQ"
PWT: PRE WAIT—BEGINNING OF A 1.2M SEC. DELAY
REACK: RESEND LAST ACK/NAK
READ: RECEIVE ANY AND ALL MESSAGES FROM COAX.
RECRC: READ CRC—GET A CRC BYTE FROM CRC LOGIC
SEND: SEND A TEXT MESSAGE
SRS: START RECEIVE SEQUENCE—NOTIFY IO/H
STEX: SELF TEST EXIT—RETURNS STATUS TO IO/N

SELF-TEST SUBROUTINE

The first subroutine, which is illustrated in FIG. 31, parts A-D, is SELF TEST. The purpose of the SELF TEST subroutine is to make sure that all the hardware in the adapter unit is operational before the adapter unit is connected to the transmission bus and participates in a reconfiguration cycle or in passing control. The SELF TEST subroutine starts at BEGIN, step S1, where the adapter unit is held until it is released by the I-O Handler in the computer at which time, at block S2, the adapter unit initializes some of its registers and some of its hardware flags. At block S2 the adapter unit also gets its own address from the I-O Handler and stores it at <NBAA> NBA address. Relay 400 in the adapter unit is then opened by the DISCONNECT instruction. Then, by going through INITIALIZE 2, <K1> is set to 0. Then proceeding from block S3 to block S4, no action is taken for 1.2 milliseconds to allow relay 400 time to open so that no signals will be sent out over the transmission bus during SELF TEST. Next, at "INIT 1", which is block S5, the adapter unit waits for a command from the I-O Handler. In this case it is the first command which, as shown at block S7, is POSITIVE CHANNEL TRANSFER. This means that a byte will be transferred to the wall box WB with only the positive channel on.

Referring to block S15, a check is made to insure that the transfer buffer is empty, which is a hardware flag saying that the microcontroller 600 in the adapter unit is ready to send the byte. Referring to block S16, the byte received from the send buffer is placed into the send hold register where it is automatically shifted out into the wall box WB. Also, the byte is placed into the CRC generator 1600 so that the CRC can be calculated at a later time. Next, referring to block S17, the microcontroller 600 waits for the line activity indicator 1400 to be set which tells the microcontroller 600 that the receiving section of the wall box has detected that a signal has just gone out. Block S18 is a data arriving hardware flag which tells the microprocessor 600 that at least 4 bits of zeros have arrived. If any of these fail the test, the microprocessor 600 goes to SELF TEST EXIT <STEX and reports the error to the I-O Handler. At block S19 the microprocessor 600 waits for a BYTE AVAILABLE which means that the four preambles along with the SYNC bit have arrived and that the microprocessor 600 actually has the first byte (which in this case is the only byte).

Then, referring to block S20, the microprocessor 600 checks to see if the byte received is the same as the byte that was sent out. If it is not, the error is reported. If it is, referring to block S21, the byte is passed back to the I-O Handler so that the I-O Handler can make a comparison to determine if the byte sent out is the same byte that is returned. Then, referring to block S22, the microprocessor 600 waits to make sure that the data arriving has stopped. The, referring to block S23, the line activity indicator 1400 is reset and a zero, which represents no error, is stored in the incrementor 6110. Then, at block S24, the status of this particular transfer is reported to the I-O Handler. Then the line activity flag is cleared and the status is passed to the I-O Handler.

The "send" logic is then disabled and the microprocessor 600 waits for the next command. What it happening at this time is that the I-O Handler has loaded the one K send buffer with data and will give the microcontroller 600 the positive channel command 256 times, a block S7 and the microprocessor 600 will go 250 times with just a POSITIVE CHANNEL. After that, if everything is functioning properly, the microprocessor 600 transmits 256 bits with the NEGATIVE CHANNEL only, as shown at block S8, and goes through the same sequence of events. After this has been completed, the microprocessor 600 sends the rest of the 512 bytes, referring to block S9, with both the POSITIVE and NEGATIVE channels on and the same sequence of events is repeated again to see if everything is still working properly.

At this time, referring to block S10, the microcontroller receives the CRC command from the I-O Handler. The hardware gets the first CRC byte, and passes it back to the I-O Handler. The I-O Handler then gives the microcontroller 600 this command a second time to get the second CRC bite. Then referring to block S11, a REVISION number command is sent to the microcontroller 600 from the I-O Handler. The microntroller 600 passes the REVISION number back to the I-O Handler. The REVISION number, which is part of the immediate value of the micro-code is in this case the number 2. Then, referring to block S13, the I-O Handler gives the microprocessor 600 a command which is the CONNECT command since the I-O Handler assumes that all the hardware is good and has passed SELFTEST. The CONNECT command closes the relay 400 and the microcontroller then returns to the WAIT routine, referring to blocks S3 and S4, and waits 1.2 miliseconds for the relay 400 to close. Then, referring to block S25, some of the other registers are initialized. Then, the microcontroller proceeds to PREIDLE, which is part of the IDLE routine, and waits to be included an active node on the transmission bus.

If the command given to the microcontroller 600 by the I-O Handler is not any of the commands in blocks S6 through S16 then the microcontroller goes to block S26, which is PANIC. This tells the I-O Handler that there is a malfunction and the I-O Handler will then make a decision of what action to take.

Block S26 is also used in other places in the code whenever anything happens that is not expected.

Block numbers S6, S12 and S14 are not used in the normal operation of the adapter unit, but rather as a diagnostic tool. Block S12 is a PREINITIALIZE step which is used to zero the CRC generator 1600. Referring to block S6, the I-O Handler can pass the microprocessor a byte and the microprocessor will pass it right back to the I-O handler and also put that byte into the CRC generator 1600. In this way, referring to block S10, the diagnostics can check the CRC by later asking for the generated CRC. Another diagnostic that may be performed is at block S14, which is a FAKE REMOTE RESET. This command simply asks the adapter unit to respond as if it had just received the REMOTE RESET command and its response to the command can be checked by the I-O Handler.

IDLE SUBROUTINE

Figure 32B:
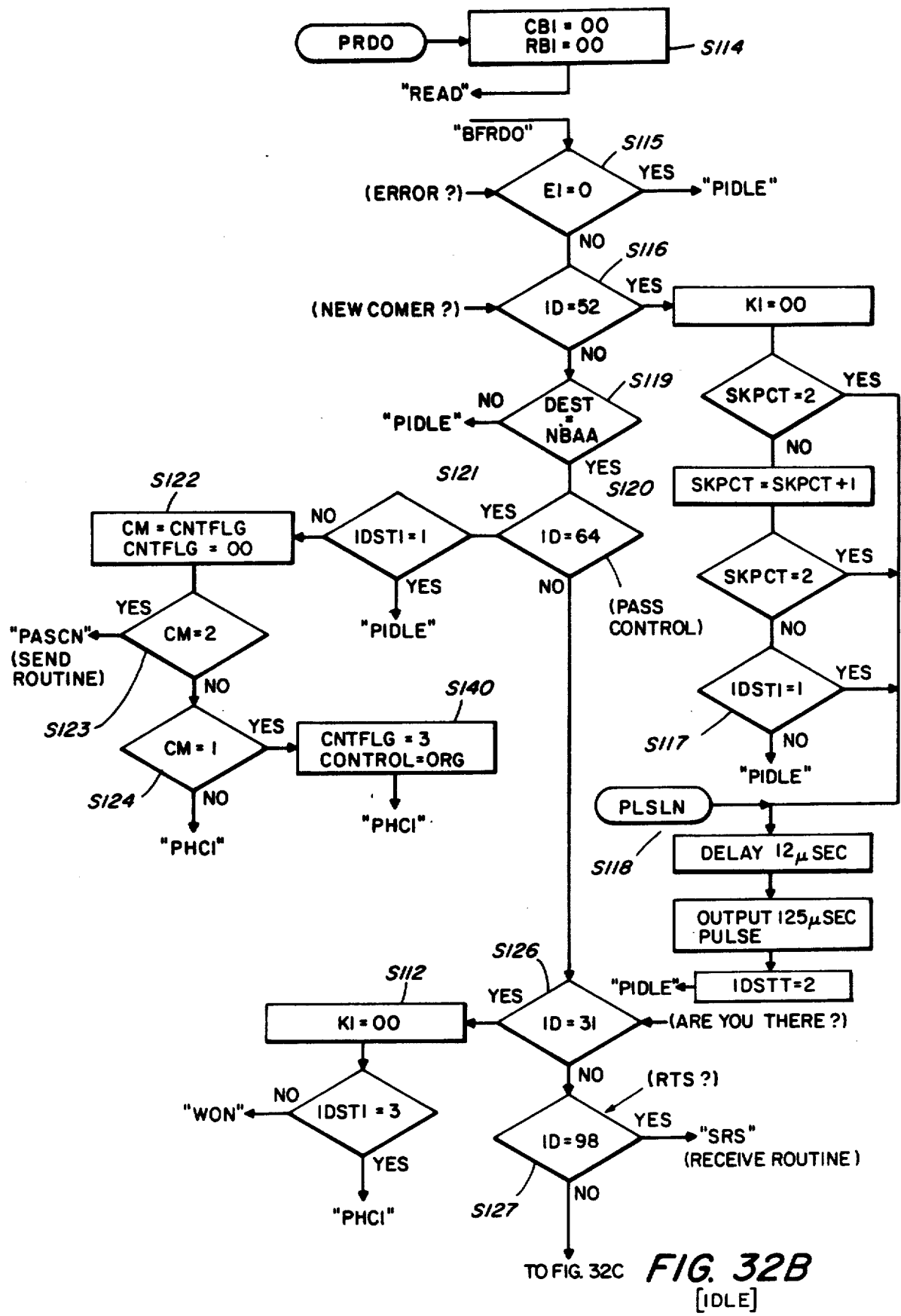
Figure 33A:
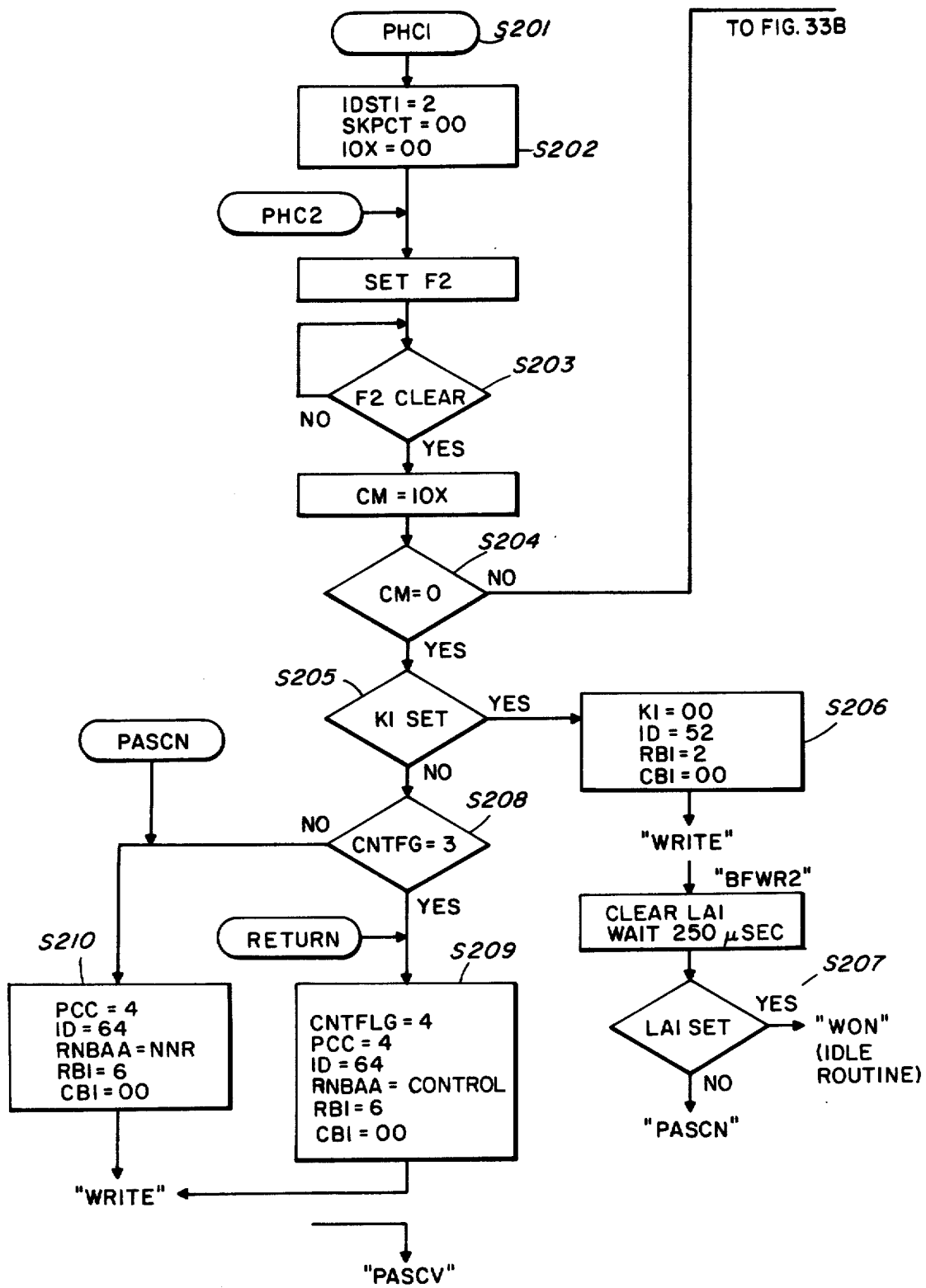
Figure 33B:
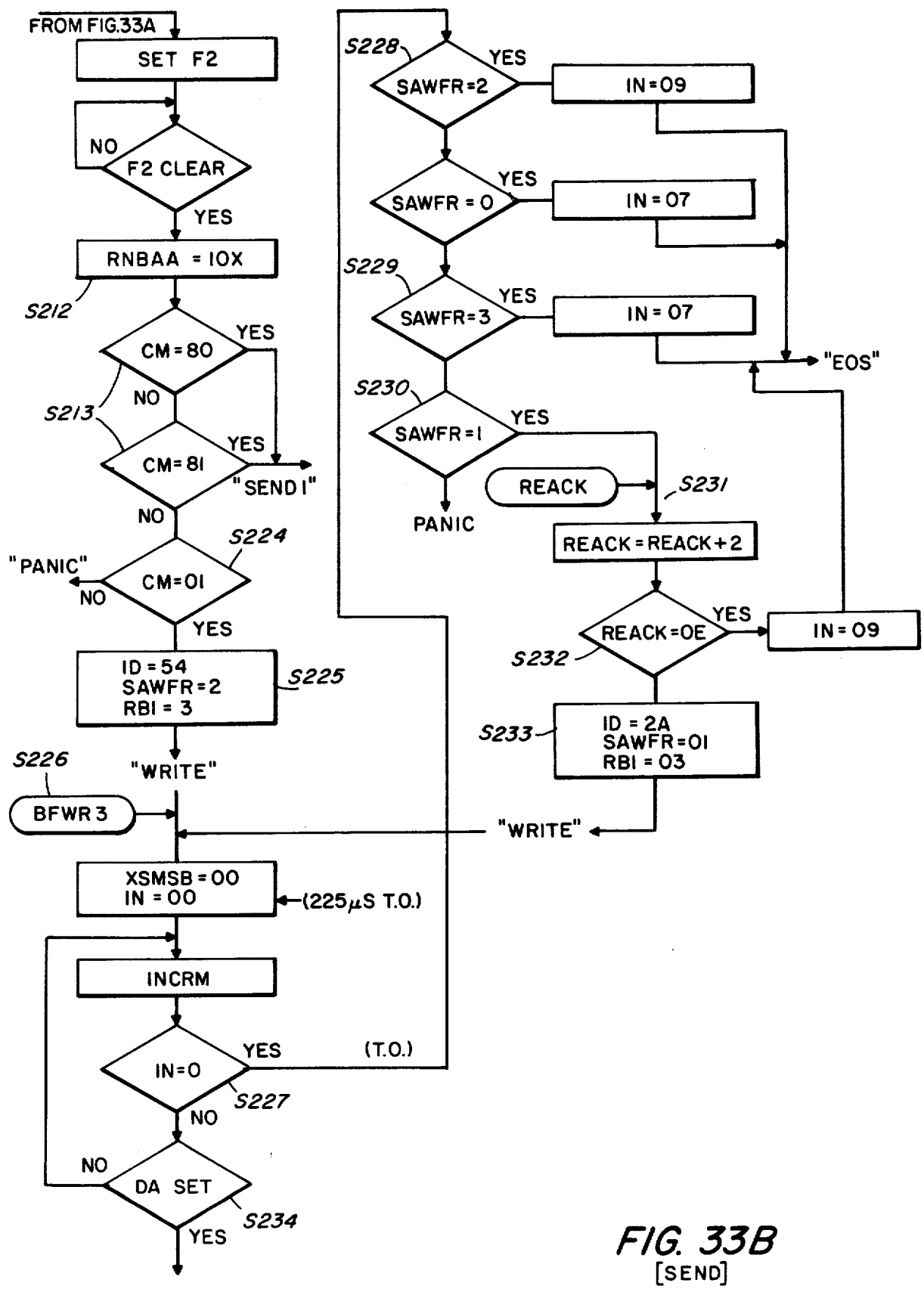
Figure 33C:
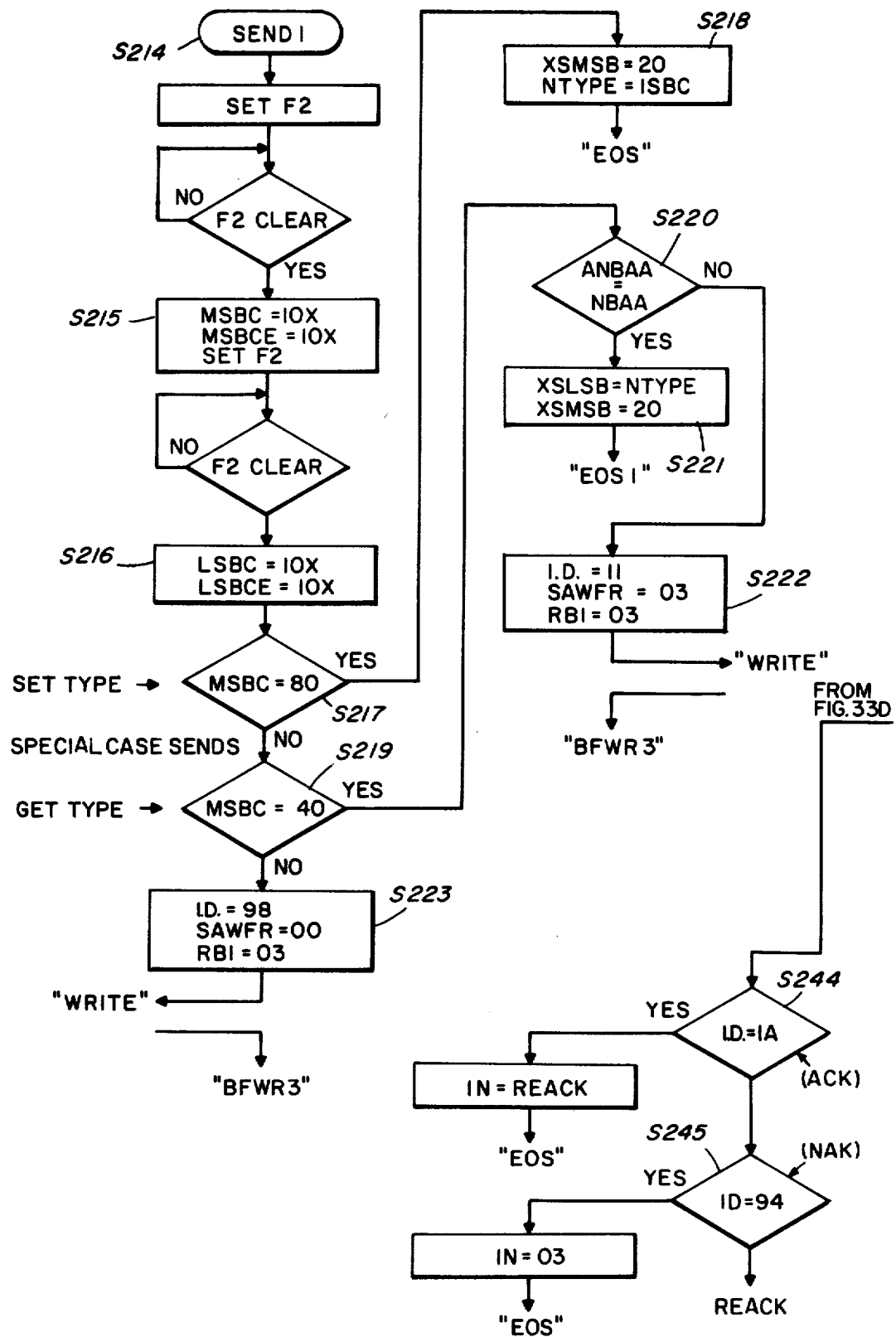
Figure 33E:
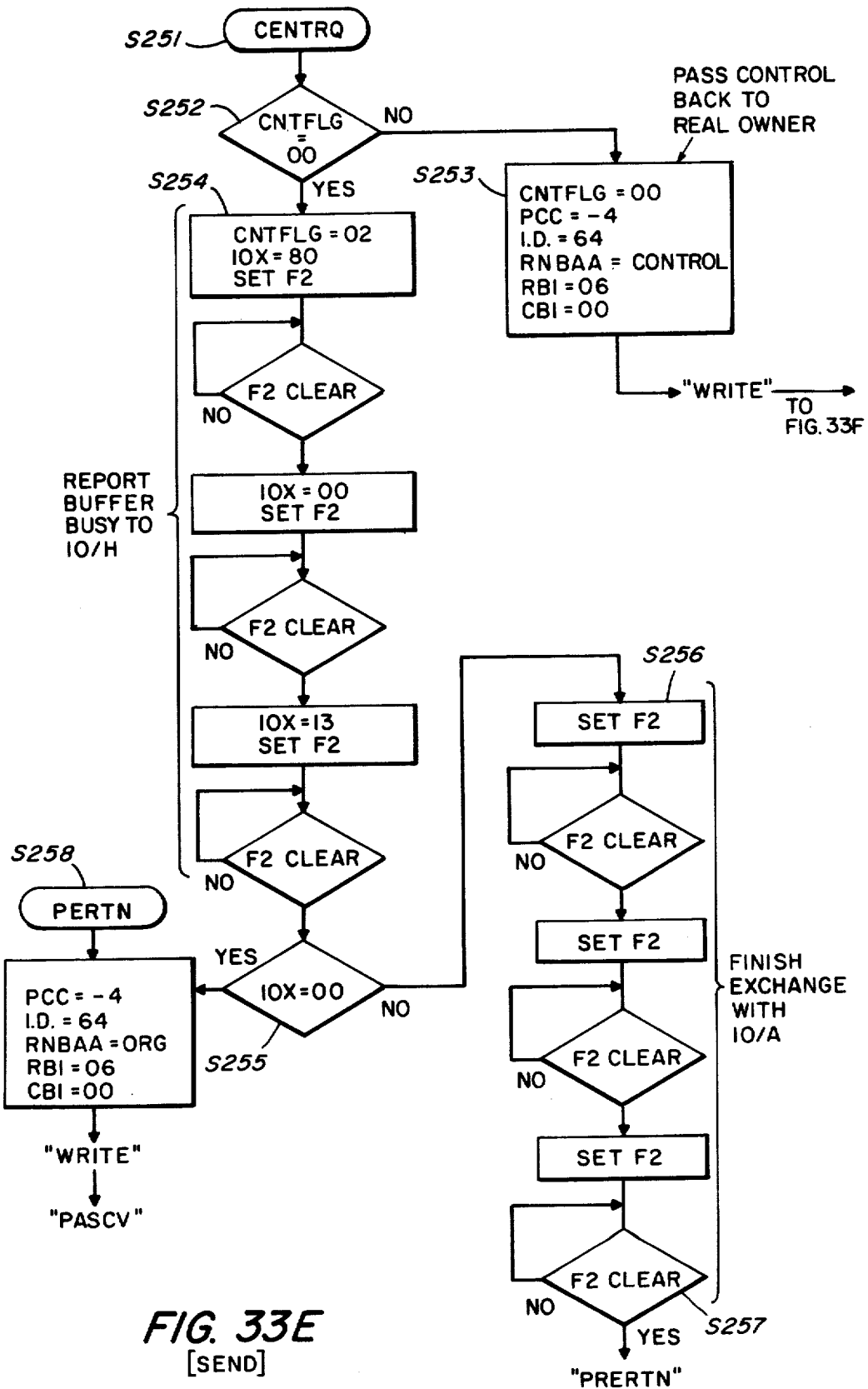
Figure 33F:
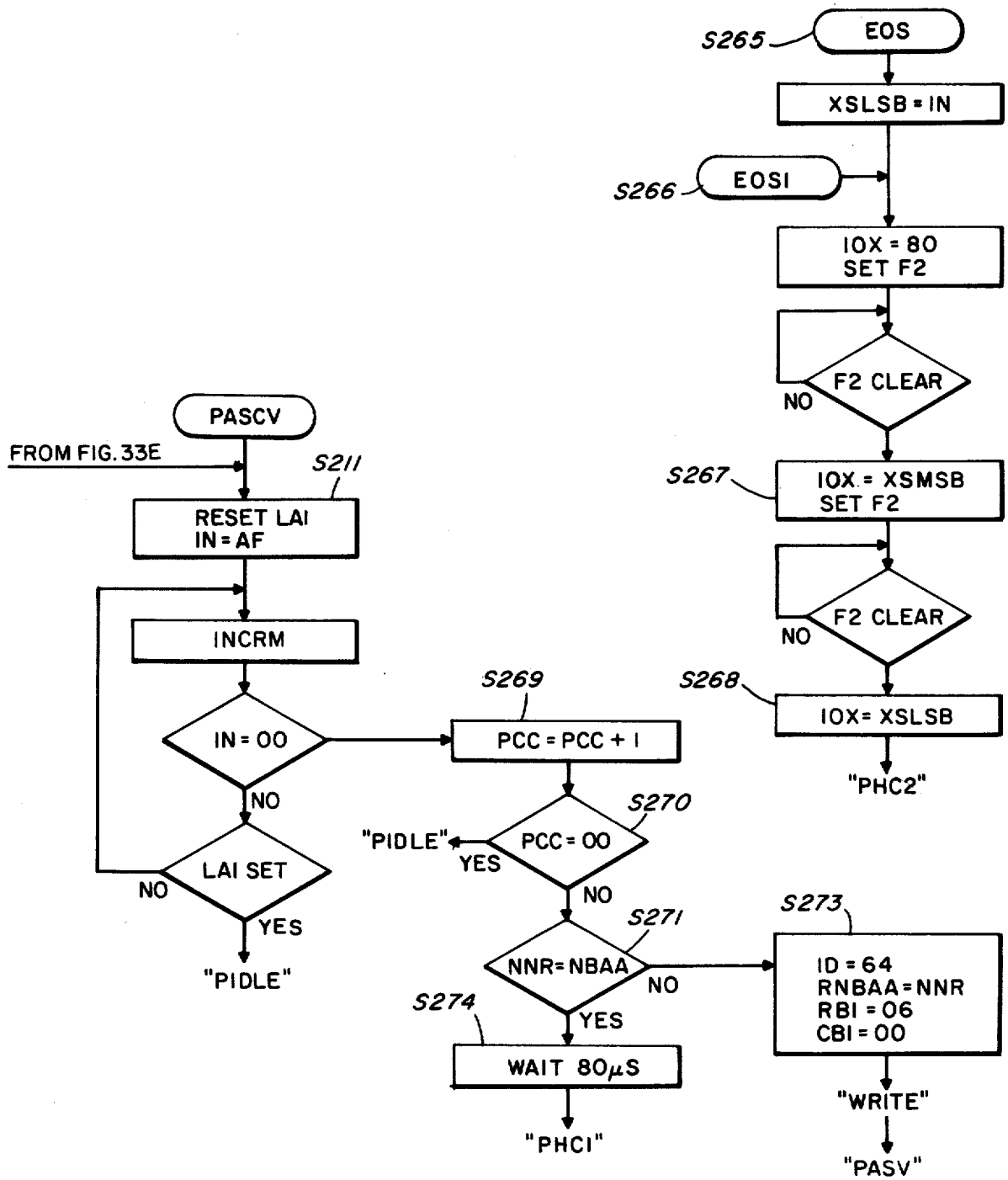

Referring now to FIG. 32 parts A through C, there is illustrated the flow-chart for the IDLE subroutine.

The IDLE subroutine is the heart of the adapter unit microcode and is responsible for: (1) initiating or participating in the reconfiguration mode, (2) listening to all messages that come in off the transmission bus and deciding whether or not the messages are for its associated computer and throwing them away if they are not, (3) responding to any REMOTE RESET message that it receives sending back an NAK or an ACK to the remote reset request and then initiating the actual reset, and (4) listening to any messages intended for it and deciding whether it should move to the SEND routine or the RECEIVE routine to handle or respond to the particular message.

When the adapter unit is in the IDLE subroutine it can actually be in anyone of three possible states. They are IDLE STATE 1, IDLE STATE 2, and IDLE STATE 3. IDLE STATE 1 is the state that the microcontroller is in after SELF TEST and it has not yet been involved in a RECONFIGURATION and has not yet received control. IDLE STATE 2 is the state the adapter unit is in after it has been involved in a reconfiguration and it is an active node in the network. IDLE STATE 3 is the state the adapter unit is in when it is in the process of the reconfiguration mode.

Referring to step S101, this is the entry point to the IDLE subroutine after coming from SELF TEST. First, some of the registers are initialized. Then, the line activity indicator 1400 is cleared. Then, referring to blocks S102 and S103, there is a 30 millisecond time out during which the adapter unit listens for any activity on the transmission bus. If there is no activity for 30 milliseconds the adapter unit proceeds to the ELECTION mode. At block S104, a 125 microsecond pulse is outputted to let other nodes on the network know that there is an election in process. As can be appreciated, it is possible that more than one node will be outputting this pulse. At point S105 all nodes that are envolved in the ELECTION start timing out at 200 microseconds times delta. If during the delta, the line activity indicator 1400 gets set then the adapter unit goes to block S105, LOST. This means that another adapter unit has lost the election and this adapter unit will return to IDLE STATE 2 and then from IDLE STATE 2 PREIDLE. On the other hand, if the adapter unit has waited the number of deltas that is the same as its NBA address and no other adapter unit has responded (i.e. set its line activity indicator) then this adapter unit has won the election as shown at box S106, WON. As can be appreciated, it has won the election because there is no other adapter unit with a lower NBA number involved in the election.

On winning the election the adapter unit starts the NEXT NODE UPDATE or RECONFIGURATION mode. First, a 12 microsecond pulse is sent out over the bus to let all the nodes involved in the election know that there is a winner. This 12 microsecond pulse will cause all other nodes to go to LOST and then to PREIDLE.

Referring now to box S107, the adapter unit sets its <NNR> or next node register to its own address plus one and then referring to box S108 prepares an "ARE YOU THERE" message which is directed to an address that is one number larger than own address message. Referring to box S109, the adapter goes to the WRITE subroutine and outputs this message on the bus. After writing the message, referring to box S110, the adapter unit listens for a response. If there is a response, then the adapter unit "knows" the next highest addressed adapter unit on the bus and the address of that adapter unit is in its register <NNR>. It then sets its IDLE state indicator to 3 because a RECONFIGURATION mode is in process and then goes to PREIDLE. Referring to block S11, if no response is received from the "ARE YOU THERE" message, a check is made to determine if the destination of that message is itself. If it was, the adapter unit goes to the HAVE CONTROL, of the SEND subroutine and simply passes control to itself because it is the only node on the network. If there is no response to the "ARE YOU THERE" message, then the adapter unit increments its next node register and send the message out again "ARE YOU THERE" to that next node. If at any time, referring to block S112, after incrementing the NNR register, the number equals 128, which is an illegal address, the microcontroller simply sets the register to zero and continues. The NEXT NODE UPDATE mode is finished when, after setting the IDLE state indicator to 3 and going to PREIDLE, a message is received from another node saying "ARE YOU THERE". As shown by S140, the adapter unit interprets this response to mean that the configuration is over and assumes control of the transmission bus.

Referring back to steps S102–S103, if the data does arrive, referring to box S113, the adapter unit goes to PRDO at step S114. At this time the message is read and referring to box S115 it asks if it read a successful message or not. If the answer is no, the adapter unit goes to PREIDLE and the message is disregarded. If a good message was read, at step S116, the question is asked "IS THE MESSAGE A NEWCOMER INTERROGATION". If it is, <K1> is set to 0 and, referring to box S117, the question is asked "ARE WE IN IDLE STATE 1". If it is in IDLE STATE 1, the message is directed to the adapter unit because it is a "newcomer".

Referring to box S118, the line is pulsed to respond to the newcomer interrogate. Then, the IDLE STATE indicator is set to 2 because the adapter unit is about to become part of the control loop. Then, the adapter unit jumps to PREIDLE. Referring back to box S117, if the IDLE STATE indicator is not number 1, the message is disregarded and the adapter unit goes to PREIDLE.

Referring to box S119, the question is then asked "IS THE MESSAGE JUST RECEIVED DIRECTED TO THIS ADAPTER UNIT". If not, the message is disregarded and it goes to PREIDLE. Referring to box S120, the question is then asked if the message to "PASS CONTROL". If it is, referring to box S121, the adapter unit asks the question, "AM I IN IDLE STATE 1"? If it is in IDLE STATE 1 it should not be receiving a "PASS CONTROL" message. Therefore, the message is disregarded and the adapter unit goes to PREIDLE. If the adapter unit is not in IDLE STATE 1, it then checks the control flag, referring to boxes S122 and S123 to see whether or not it has granted control to another node in which case that node is now returning control to S and it is this adapter unit's responsibility to pass control on to the next node register, as in box S123.

Referring to box S124, if the control flag is equal to one it means that the adapter unit has requested special control and it is now receiving that special control. So, referring to box S125, the adapter unit sets its control flag to 3 which means that it has received special control and then goes to HAVE CONTROL 1, referring to box S124, if <CNTFLG> was not 2 or 1 then the adapter unit is receiving "normal" control. If the message was not a "pass control", then, referring to box S126, the question is asked is the message an "ARE YOU THERE". If it is, referring to box S140 again, <K1> is set to 0 and the question is asked "IS THE IDLE STATE INDICATOR EQUAL TO 3". If the IDLE STATE indicator is 3 it means that the NEXT NODE UPDATE mode is in progress and it must be finished by going to HAVE CONTROL 1. If the IDLE STATE indicator is not at 3, it means that this adapter unit is just a normal node participating in the NEXT NODE UPDATE mode and it will go to WON. This means that it will now undertake the next node higher than it.

If the message is not an "ARE YOU THERE", referring to box S120 and then to box S127, the question is asked is the message a "REQUEST TO SEND". If it is, the adapter unit jumps to the RECEIVE subroutine at a step called SRS or START RECEIVE SEQUENCE to start receiving this message.

If the message was not a REQUEST TO SEND, then, referring to step S128, the question is asked "WAS THE MESSAGE A REMOTE RESET". If it was, referring to step S129, the question is asked, "IS THE SWITCH SET TO ALLOW REMOTE RESETS". If it is not, referring to step S130, a "NO, I CANNOT RESET" message is prepared and, referring to step S131, the message is sent to the transmission bus. The adapter unit then returns to PREIDLE. Referring to box S129 if the switch is set so that the adapter unit can receive a remote reset, referring to box S132 an "ACKNOWLEDGE" message is prepared. Referring to box S131, the message is sent over the transmission bus. After that, referring to box S133 the I-O Handler is notified that the adapter unit has received a "remote reset" from another adapter unit. At box S134, the address of adapter unit that requested the remote reset is given to the I-O Handler. Referring to box 135, the line that generates the remote reset is pulsed causing the computer to be reset.

If the message was not a "Remote Reset" then, referring to box S126, the question is asked, "Was the message a REACK". This particular message is received after text has been received, after the adapter unit has responded with an ACK or a NAK and the sender of that text has not received either an ACK or a NAK. A request to resend the ACK/NAK is made with the message REACK. Referring to box S137, if the address of the adapter unit which sent the REACK message is the same address as the last node the adapter unit received from, then the adapter unit will send the last ACK or NAK and then go to PREIDLE. Otherwise it will ignore the REACK and go to IDLE. Referring to box S138, the question is asked, "WAS THE MESSAGE A GET TYPE". If it was, according to box S139, the adapter unit will prepare the message "THIS IS MY TYPE" and then write the message. In this special case, in the WRITE subroutine, the WRITE subroutine will substitute the orginator of this message, with its own type.

SEND SUBROUTINE

Referring now to FIG. 33 parts A through F, there is illustrated the flow chart for the SEND subroutine.

The adapter unit goes to the SEND subroutine every time it has control. If it does not need to send anything it passes control, and goes back to PREIDLE. If it needs to transfer anything at all over the bus it does so during this subroutine and then waits for a response and reports any status of the transfer to the I-O Handler. There is a scratch pad location called SAWFR or SEND AND WAIT FOR RECEIVE. When a REQUEST TO SEND is sent the flag is set to 0. When the text is sent, this flag is set to 1. When a "REMOTE RESET" message is sent this flag is set to 2 and when a "GIVE TYPE" message is sent this flag is set to 3. If a "CONTROL REQUEST" message is received as a result of a "REQUEST TO SEND", it is the SEND subroutine's responsibility to report "BUFFER BUSY" to the I-O Handler and then pass "special control" over to that node that requested control. The SEND subroutine also has a portion called PASCV or PASS CONTROL VARIFY which listens to the line after it passes control to make sure that the receiver of control did actually receive control. If not, it will send the message again. This is done up to 4 times.

Step S201 or "PRE-HAVE CONTROL" is where the adapter unit goes either after it has just finished the NEXT NODE UPDATE mode or after it is given control by another node. At this time, it sets its IDLE STATE indicator to 2, since it is part of the control loop. Also as shown at step S202 the I-O Handler is notified that its adapter unit has control. Then as referred to at box S203 the adapter unit waits for a response from the I-O Handler.

Next, referring to S204, the question is asked "DO WE NEED TO SEND". As shown at box S205, if there is not a need to send, it will ask the question "IS K1 SET" or "HAS 8000 MESSAGES PASSED BY". Referring to box S206, if K1 is set, it will reset K2 and prepare the message "ARE THERE ANY NEWCOMERS". Then the message is sent out. As referred to at box S207, if there is any activity on the line (i.e. the bus), it means that there are some newcomers and therefore goes to WON in the IDLE subroutine. This will effectively start the NEXT NODE UPDATE cycle. This time there is no election. Referring to box S207, if there was no activity on the line it will go to "pass control" since there are not any newcomers. Referring to box S208 the question is then asked, "IS THE CONTROL FLAG EQUAL TO 3" or "HAVE WE RECEIVED SPECIAL CONTROL". If, as referred to by 209, the adapter unit has received "special" control, then control must be passed back to the real owner of control and control is so passed. If it has not received "special" control, control is passed back to the next node register, as referred to in box S210. In either case, after passing control the adapter unit goes to "PASS CONTROL VERIFY".

Referring back to box S204, if the I-O Handler wants the adapter unit to send a message, the adapter unit will then get the remote NBA address from the I-O Handler as referred to by box S212. Referring to box S213, if the command given to the adapter unit by the I-O Handler is either an 80 or 81, it means that the I-O Handler wants to send a text message and the adapter unit goes to SEND 1, as shown at box S214. In this case referring to box S215, the I-O Handler will pass the most significant byte count to the adapter unit and then referring to box S216, the least significant byte count of the text to be sent.

Referring to box S217, the question is then asked "IS THE MOST SIGNIFICANT BYTE 80", which is a normally "illegal" byte. If the byte count is 80, the message is really a "SET TYPE" command, and, as shown at box S218 the adapter unit will set <XSMSB>, the most significant byte of the status to 2 and take the least significant byte of the by count and store it at <N type>. The the adapter unit will go to END OF SEND and report the status back to I-O Handler.

Referring to box S219, the question is then asked "IS THE MOST SIGNIFICANT BYTE EQUAL TO 40". If it is, then it is really a "GET TYPE" message. Then, referring to box S220 the question is asked. "IS THE DESTINATION OF THIS GET TYPE OURSELF". If it is, referring to box S221, the type of the computer (i.e. "user" or "server") is placed in the least significant byte of the status, and the adapter unit goes to the end of the SEND subroutine to report the status to the I-O Handler. Referring to box S222, if the destination of the "GET TYPE" is not itself, a message is prepared, "GIVE ME YOUR TYPE" amd the message is sent out on the bus. The adapter unit then goes to BFWR3 to wait for the response to the message. <SAWFR> is set to 3 so that the microcontroller will know what to expect when a message is received.

Referring to box S223, a "REQUEST TO SEND" message is prepared and sent. <SAWFR> is set to 0 because it is expecting a response fro- a request to send. Then the adapter unit moves to BFWR3 to wait for a response.

Referring back to step S213, if the command given to the adapter unit from the I-O Handler is not 80 or 81 the question is asked, as shown in box S224, "IS THE COMMAND A 1" or "SEND A REMOTE RESET" if it is a REMOTE RESET message it is prepared as shown at box S225. <SAWFR> is set to 2 since the adapter unit is waiting for a response to a "REMOTE RESET" message. Referring to box S224, if the command was none of the above the adapter unit will go to PANIC.

Referring to box S226, which is BFWR3, the adapter unit sits and waits for up to 225 Microseconds for a response from one of its own messages. As referred to by box S227, if there is no response within 225 microseconds, the adapter unit will set the appropriate flag depending or the status of <SAWFR> as shown at boxes S228 through S230. If <SAWFR> was a 1 or a text message it is necessary to determine if the response was an ACK or a NAK. Therefore, the adapter unit must send out a REACK as referred to in box S231. A REACK is only 8 times, so, referring to box S232, the question is asked "HAVE WE REACHED 8 TIMES YET". If not, referring to box S233, the message "REACK" is sent out and the adapter unit waits for a response at BFWR3. Referring to box S234, if the adapter unit did receive a message it goes to box S235, <CB1> to 0 which means that it is expecting a non-text message, and then reads the message. Referring to box S236, the most significant and least significant status flags are initialized and then at step S237 the question is asked, "DID WE RECEIVE THE MESSAGE SUCCESSFULLY". If not, referring to box S238, the question is asked "IS THE SEND AND WAIT FOR RECEIVE FLAG A 1". If it is not, the adapter unit will report the status to the I-O Handler. Otherwise, the adapter unit will go to REACK. Referring to step S239, the question is asked "WAS THE MESSAGE DIRECTED TO THIS ADAPTER UNIT?" If it was not, the adapter unit will take the same action as if it had received a bad message at step S237.

At step S240 the question is asked, "WAS THE ORIGINATOR OF THIS MESSAGE THE SAME AS THE DESTINATION OF THE LAST MESSAGE THAT WAS SENT OUT?". If it is not, this is not a problem if the "send and wait for receive" flag <SAWFR> is equal to 3 as in step S241. If <SAWFR> is not equal to 3, the adapter unit takes the same action as if there was an error in step S237. Referring to step S242, if the message was "THIS IS MY TYPE", the adapter unit reports the type to the I-O Handler by placing the type (which is really stored in the <ORG>) in the least significant byte of the status, placing a 20 in the most significant byte of the status and then going END OF SEND 1. Otherwise, the adapter unit reports to 5 or invalid message to the I-O Handler and then goes to END OF SEND.

Referring to step S243, if the adapter unit has read a good message and the message is directed to this adapter unit then the question is asked, "IS THE SENDER WAITING TO RECEIVE A 1?" (<SAWFR>) i.e. has a text been sent out expecting a reply. If the answer is yes, referring to box S244, the question is asked "IS THE REPLY AN ACK?". If the reply is an ACK, the contents of the scratch pad location REACK are put into the incrementor which is at 0 unless there are any "retrys" (2 is added for each retry) and this is reported to I-O Handler. Otherwise, referring to box S245, the question is asked "WAS THE REPLY A NAK?". If the reply was a NAK, the adapter unit will report a NAK to the I-O Handler. If the response was neither an ACT nor a NAK, the adapter unit will go again to REACK, which is step S231, to obtain the proper response for the text.

Referring to step S246, if the "SEND AND WAIT FOR RECEIVE" flag is a 0, (i.e. a "REQUEST TO SEND" was sent), the ADAPTER UNIT will go to CLEAR TO SEND CHECK or CTSCK, as referred to by box S247.

Referring to box S248 through box S249 the appropriate errors are reported to the I-O Handler if either a "BUFFER BUSY", "RECEIVED", "SUSPENDED" or "RECEIVE DISABLED" is received.

Referring to step S250, if the result of a request to send is a control request, the adapter unit goes box S251, which is called CNTRQ or "CONTROL REQUEST". An adapter unit can only pass "special control" if its control flag is set to 0. Therefore, at step S252, the question is asked if its control flag is set to 0. If the control flag is not set to 0, referring to box S253, it means that the adapter unit has "special control" itself and is not allowed to pass control to any adapter unit other than the adapter unit from which it received "special" control. At this time a message is prepared to pass control to the "real" owner of control (i.e. the adapter unit from which it received "special control"). Then the adapter unit goes to "PASS CONTROL VERIFY" and eventually to IDLE. On the other hand, if at step S252, the control flag is equal to 0, the adapter unit is allowed to send "special control" and, as shown at box S254, the control flag is set to 2 which means that the adapter unit is or is about to grant another adapter unit control. The status "BUFFER BUSY" is then reported to the I-O Handler.

After reporting the status to the I-O Handler, referring to step S255, the I-O Handler informs the adapter unit if it wants to send again. If, referring to steps S256-S257 the I-O Handler does need to send again, the adapter unit will take the data from the I-O Handler just for the sake of finishing the exchange, but will throw the data away and not send the message out. At that stage, or when at step S255, where the I-O Handler does not need to send again, the adapter unit goes to step S258 or PRERETURN. At step S258 a "PASS CONTROL" message, is prepared to pass control to the originator of the last message, that is, the adapter unit which sent the control request. The message is then sent. After "PASS CONTROL" is verified, the adapter unit returns to IDLE.

Referring back to step S250, if a message received as a result of the REQUEST TO SEND is not a "CONTROL REQUEST", the question is asked, at step S259, if the response is a "CLEAR TO SEND". If the message is not a "CLEAR TO SEND" then the adapter unit reports "5" or "INVALID RESPONSE" to the I-O Handler. Otherwise, referring to step S260, the adapter unit prepares the text message and send it out over the bus. The adapter unit then goes to BFWR3 to wait for a response.

Referring now back to step S246, if a message directed to the adapter unit is received and is good and the SEND AND WAIT FOR RECEIVE is not a 0, the adapter unit aske the question if the SEND AND WAIT FOR RECEIVE is equal to +2, as seen as block S261. Referring to step S252, the adapter unit askes whether the response is an ACK. If the response is an ACK, the adapter unit reports the status NO ERROR to the I-O Handler. Referring to steps S263, the adapter unit askes the question whether the response was a 61, or a "NO, I CANNOT ORDER RESTART". If the response is either one, a B or a REMOTE RESET REJECTED is reported to the I-O Handler. The adapter unit then goes to END OF SEND. If the response is neither an ACK, nor a NAK, then a 5 or an INVALID RESPONSE is reported to the I-O Handler.

Referring to step S264, if the SEND AND WAIT TO RECEIVE is a 3, then the adapter unit goes to TYPE CHECK at step S241 and to step S242 to see if the ID should be a "This is my type". If it is not the adapter unit it will report a 5 to the I-O Handler. If the message is a 3, then the adapter unit reports the type to the I-O Handler by putting the type in the least significant BYTE of the send status and a 20 in a most significant byte. If a SEND AND WAIT FOR RECEIVE is not a 0, 1, 2 or 3, then the adapter unit goes to PANIC.

Referring to step S265 or END OF SEND, the contents of the incrementor are stored in the least significant byte of the status. Then, referring to step S266, the I-O Handler is told that the "send" is complete. At step S267, the adapter unit gives the I-O Handler the most significant byte of the status and at step S268 the adapter unit passes the least significant byte of the status to the I-O Handler. Then, the program goes to "PRE-HAVE CONTROL 2" where the I-O Handler is again asked if it wants to pass control or send again.

Referring now to step S211, or PASS CONTROL VERIFY, the adapter unit waits 80 microseconds for activity on the bus after passing control. Referring to step S269, if there is no activity on the bus, the adapter unit will increment PCC or PASS CONTROL COUNT and at step S270 the microcontroller will ask whether it has tried passing control eight times. If it has, then the adapter unit will go PREIDLE. At this time, the bus will have an election and a new configuration.

Referring now to step S271, if the adapter unit that is being passed control is itself, then the adapter unit will, referring to step S274, pause for eighty microseconds, go to PASS CONTROL 1 and resume control again.

Referring to step S273, the adapter unit prepares the message that will pass control to the NNR then returns to PASS CONTROL VERIFY.

WRITE SUBROUTINE

Figure 34A:
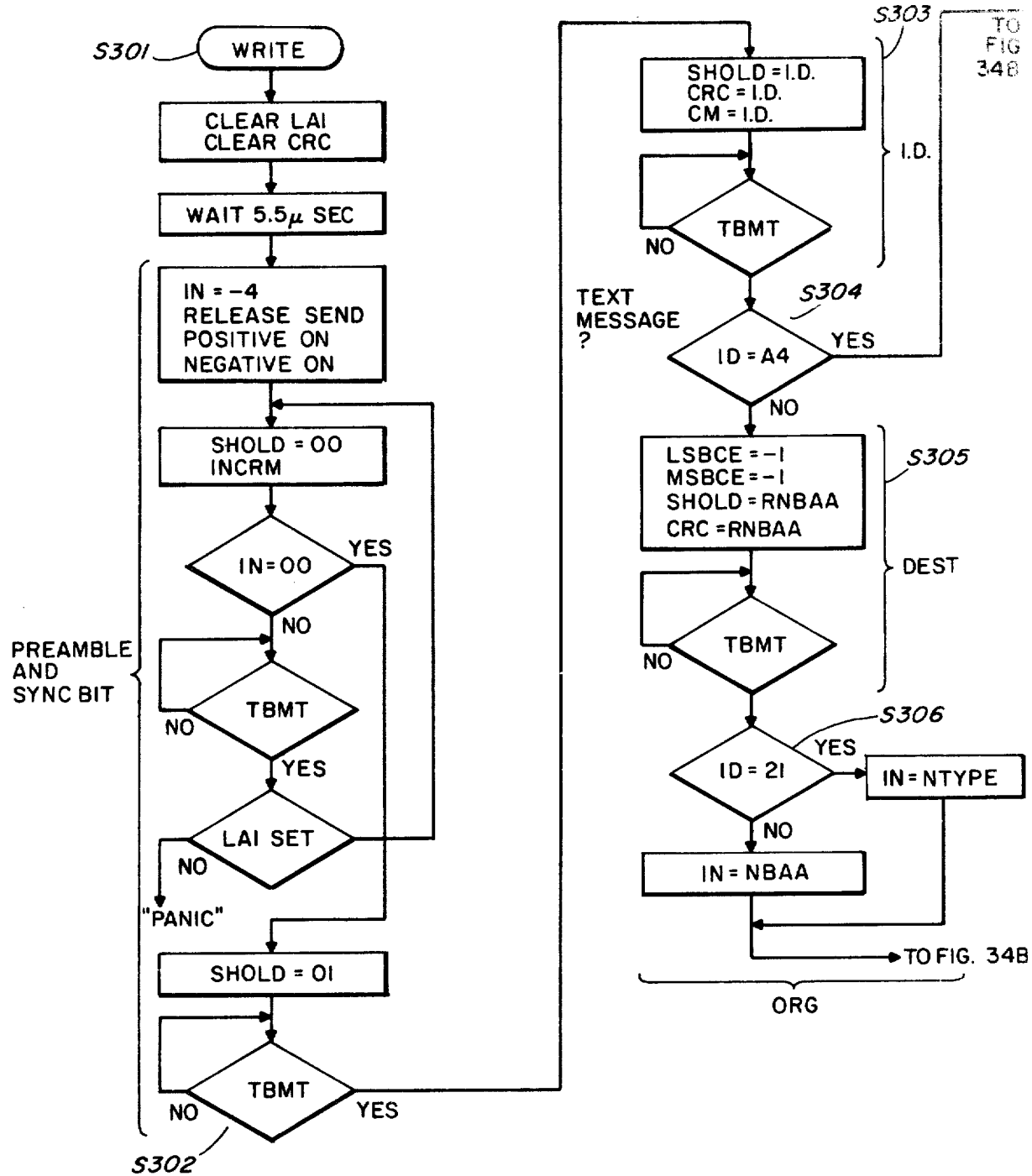

Referring to FIG. 34, parts A and B, there is illustrated the flow chart for the WRITE subroutine.

The WRITE subroutine is the routine that actually outputs the message onto the bus. The message includes four preamble bytes of zeros and one byte with a sync bit. The message also includes the ID, the destination, the orginator and the length if it is a text message. Then the adapter unit outputs two CRC bytes and 4 postamble bytes of Zeros. The microprocessor gets the ID from the scratch location <ID> and the destination from the scratch location <RNBAA> or REMOTE NBA ADDRESS. The microprocessor gets the orginator from its scratch location <NBAA> and the length from <MSBC> and <LSBC>. If the adapter unit is sending out a "THIS IS MY TYPE" message it is the responsibility of the WRITE subroutine to change the orginator and put in its own type. The WRITE routine is excited depdnding upon the value of <RB1> or RETURN BYTE 1.

Referring to steps S301-S302, the WRITE subroutine sends out the four preamble bytes of zeros and the one byte with the sync bit. Referring to S303, the ID is shifted out onto the bus. Referring to step S304, the question is asked "IS THIS MESSAGE A TEXT MESSAGE?". If it is not a text message then it is a control message and, referring to step S305, the destination is sent out. The destination is obtained from scratch location <RNBAA> or Remote NBA Address.

Referring to step S306, the orginator is sent out and gets that value in the NBAA or NBA ADDRESS. However, if the question is asked if this is an "IS THIS MY TYPE MESSAGE", then the adapter unit will substitute the orginator for <N type>. This byte is sent out at step S307. Both byte counts are incremented at step S307 and the program flows through steps S308 and S309 and into step S310. At step S310, the CRC bytes are sent out. Referring back to step S304, if the message ID was text the adapter unit goes to step S311. Thus, first the most significant byte count which is a "2's" compliment of the byte count is sent out and then referring to step S312 the least significant byte count is sent out. Referring to step S313, the question is asked, "IS THIS A ZERO LENGTH MESSAGE?" If it is a zero length message, the adapter unit goes immediately to step S310, where it will send out the CRC. Otherwise, referring back to step S307, the adapter unit will send out the first byte of text and then referring to step S308, and S309, the adapter unit will loop back and continue sending out more bytes until the byte count is exhausted. At that time, the adapter unit will be at step S310 and will then start sending out the CRC byte.

At step S314 the question is asked, "IS THIS THE FIRST CRC BYTE OR THE SECOND CRC BYTE?". If it is the first byte, the microcontroller will go back to send the second byte. Referring now to step S315, the microcontroller starts to send out the postamble bytes. The microcontroller sends out 4 bytes and then, referring to step S316, waits 20 microseconds for the ringing effect to die down. Referring to step S317, the WRITE subroutine exits. The microcontroller will jump to a location depending upon the return byte <RB1>. If it is none of the above, the adapter unit will go to PANIC at step S318.

RECEIVE SUBROUTINE

Figure 35A:
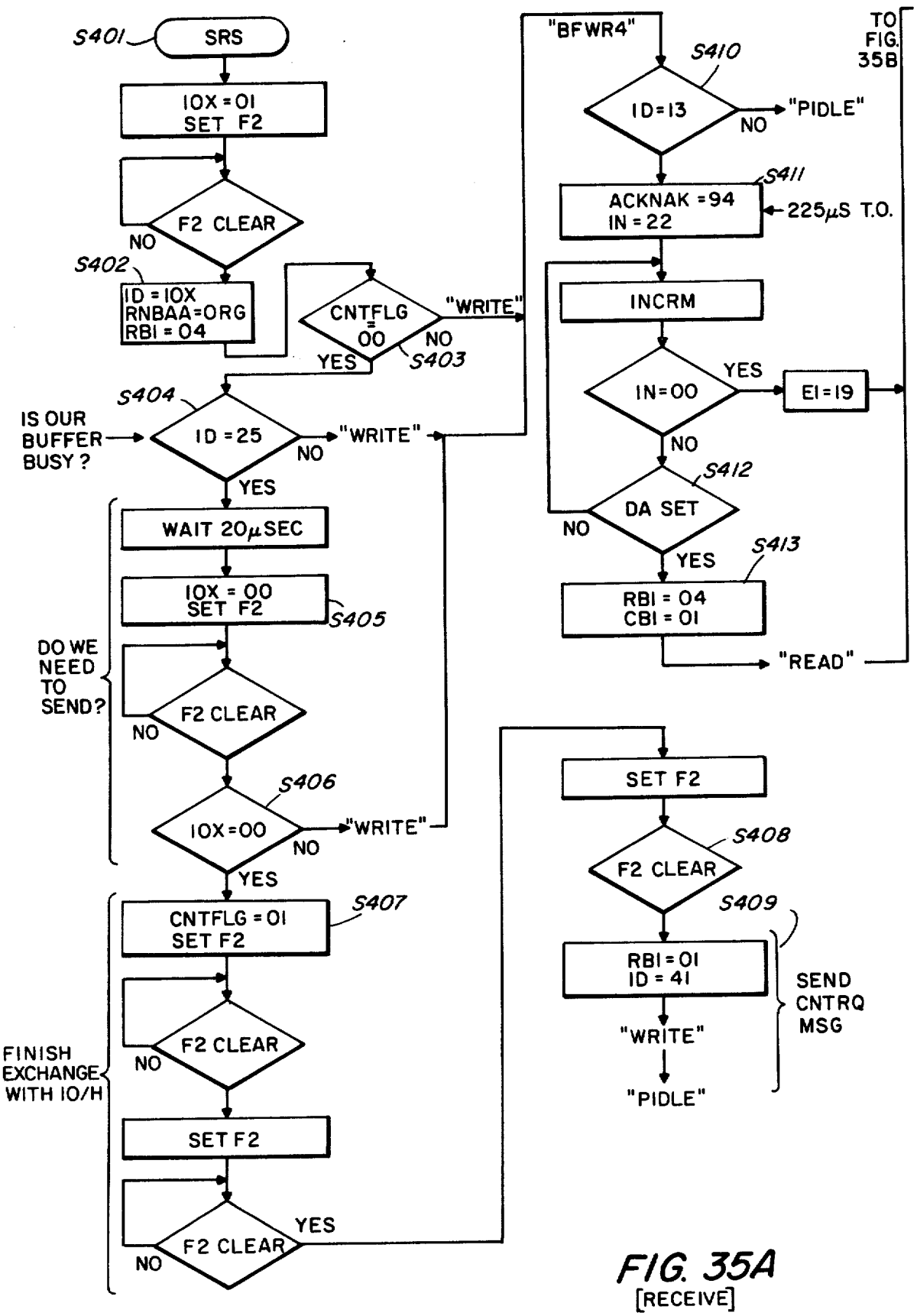
FIGS. 35A and 35B is a system flow chart for the RECEIVE subroutine.
Figure 35B:
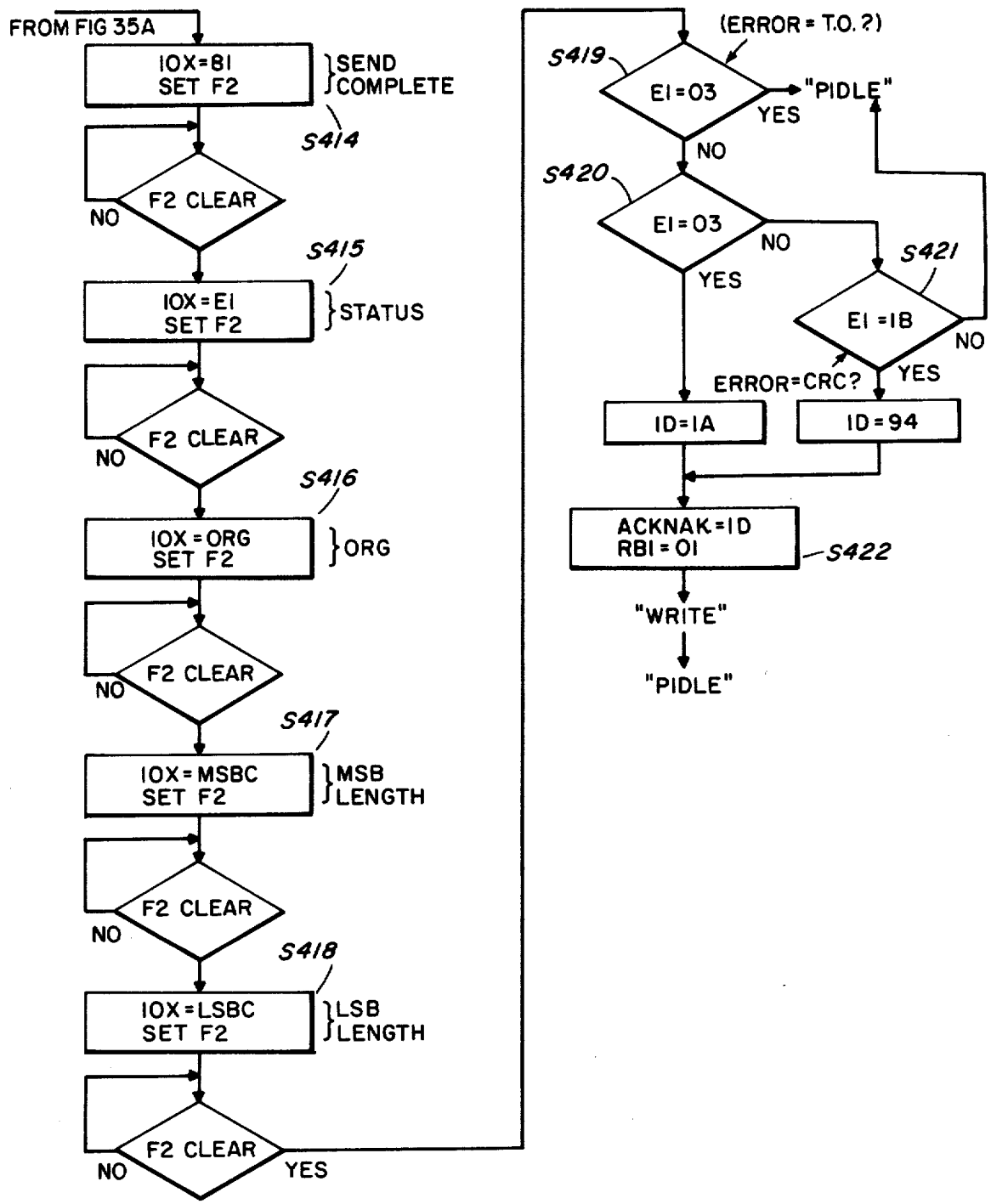

Referring now to FIG. 35, parts A and B, there is illustrated the flow chart for the RECEIVE subroutine.

The RECEIVE subroutine is entered when a REQUEST TO SEND is received. The adapter unit notifies the I-O Handler and the I-O Handler gives the adapter unit a response which is either BUFFER BUSY, BUFFER DISABLE, BUFFER SUSPENDED or CLEAR TO SEND. If the response is CLEAR TO SEND, the adapter unit waits 225 microseconds for a response which would be the text, porceeds to the READ subroutine, reads the text and then notifies the I-O Handler of the status of the transfer. However, if the response the I-O Handler wants to send back is BUFFER BUSY, the adapter unit first checks with the I-O Handler to see if the I-O Handler needs to send. If the I-O Handler does need to send, then the adapter unit will send a control message instead of BUFFER BUSY.

Referring to step S401, the adapter unit notifies the I-O Handler that it has received a REQUEST TO SEND. Referring to step S402 the I-O Handler returns the status of its receiver buffer to the adapted unit. Referring to step S403, the adapter unit determines if its control flag is equal to 0. If the control flag is not equal to 0, the adapter unit cannot participate in the SPECIAL PASS CONTROL and will just write the message immediately. On the other hand, if the control flag is equal to 0, referring to step S404, the adapter unit askes the question whether the response is a BUFFER BUSY. If it is not a BUFFER BUSY, it will write the response, whether it is a CLEAR TO SEND, BUFFER DISABLE, or BUFFER SUSPENDED. However, if the response is BUFFER BUSY, referring to step S405, the adapter unit will then notify the I-O Handler that it HAS CONTROL. This is not actually the case; however, the adapter unit performs this step to determine whether it needs to send. Referring to step S406, the question is asked, "DO WE NEED TO SEND?". If the I-O Handler does not need to send, the adapter unit will again write the BUFFER BUSY message. If the adapter unit does need to send, referring to step S407, the adapter unit will set its control flag to 1, since it is requesting SPECIAL CONTROL.

Referring to steps S407-S408, after the adapter unit has finished the above exchange with the I-O Handler, the I-O Handler gives the adapter unit the destination of the adapter unit it wishes to send a message. The adapter unit discards this information because the adapter unit is not, in fact, going to send this message. Referring to step S409, the adapter unit prepares the message SPECIAL CONTROL REQUEST, writes the message and then proceeds to PREIDLE. After a message is sent out that is either a BUFFER BUSY, BUFFER DISABLE or a CLEAR TO SEND the adapter unit then askes the question, at step S410 if the message sent out was a CLEAR TO SEND. If the message was not, a CLEAR TO SEND, the adapter unit proceeds to PREIDLE since it is the end of this particular exchange. If the message was a CLEAR TO SEND, the adapter unit goes to steps S411–S412 where it waits a 225 microseconds for the response to the CLEAR TO SEND, which will be the text.

Referring to step S413, when the data begins to arrive the adapter unit will read the text and then, referring to step S414, the adapter unit will report that the send is complete to the I-O Handler. Referring to step S415, the adapter unit sends the status of the transmit to the I-O Handler. In step S416, the adapter unit gives the I-O Handler the orginator of the message, in step S417 the adapter unit gives the I-O Handler the most significant byte count of the text and in step S418 the adapter unit gives the I-O Handler the least significant byte count of the text.

Referring to step S419, if the error indicator shows that there is a time out, then the adapter unit will simply go to PREIDLE and will not respond. Referring to step S420, if there is no error, then the adapter unit will set the ID or 1A or ACK, proceed to step S422 to send out the ACK, and then proceed the PREIDLE. Referring to step S421, the adapter unit will send a NAK only if the error is a CRC error; otherwise, the adapter unit will go PREIDLE, and will not send back a response. In either case it will set <ACK NAK> to which ever ACK OR NAK that was sent out. Referring back to step S411, it should be noted that <ACK NAK> by default is set to 94, which is a NAK. In this case, if nothing is sent back at step S422 and the sender of the message sends a REACK, a NAK will be sent back as the response.

READ SUBROUTINE

Figure 36A:
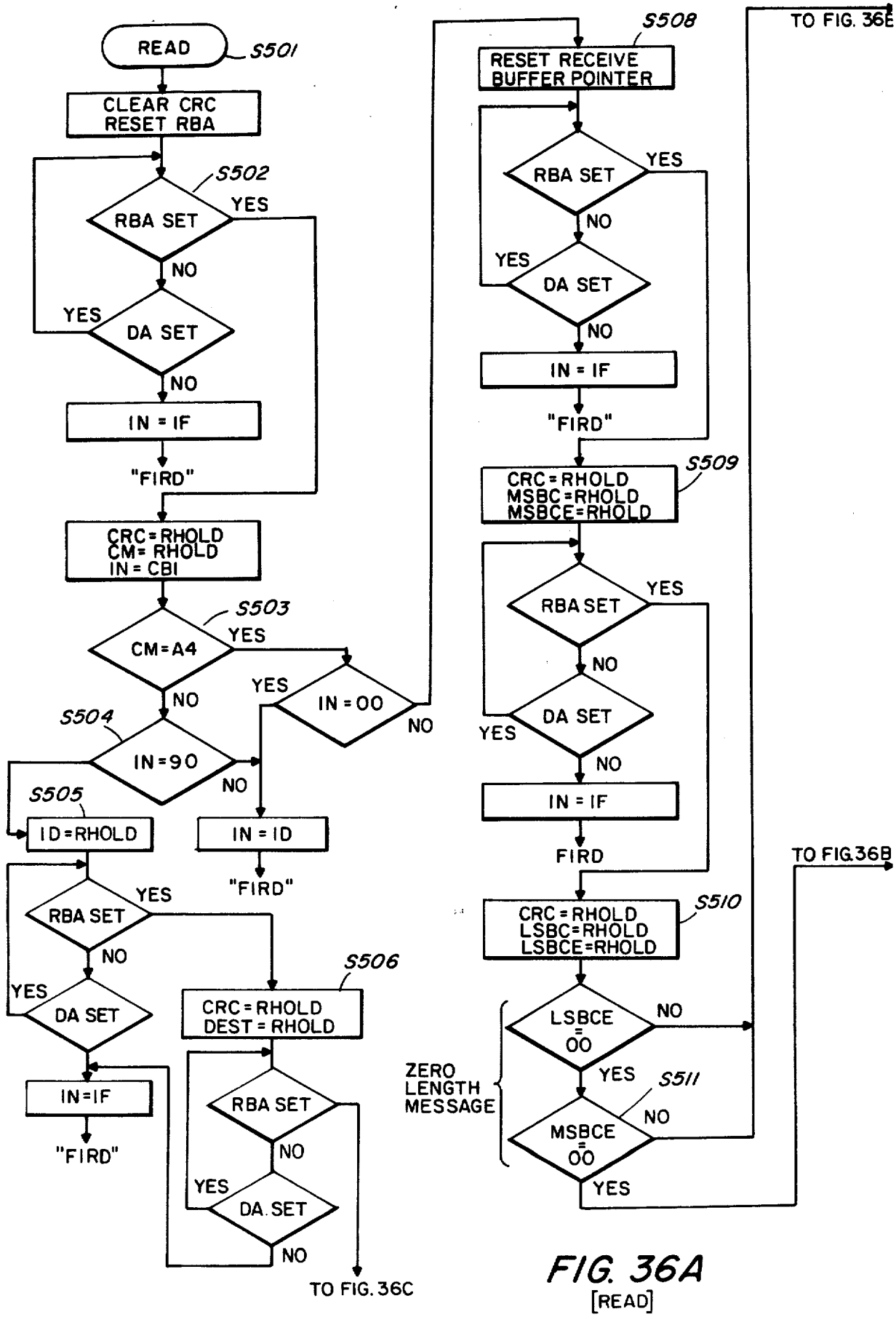
FIGS. 36A, 36B and 36C is a system flow chart for the READ subroutine.
Figure 36B:
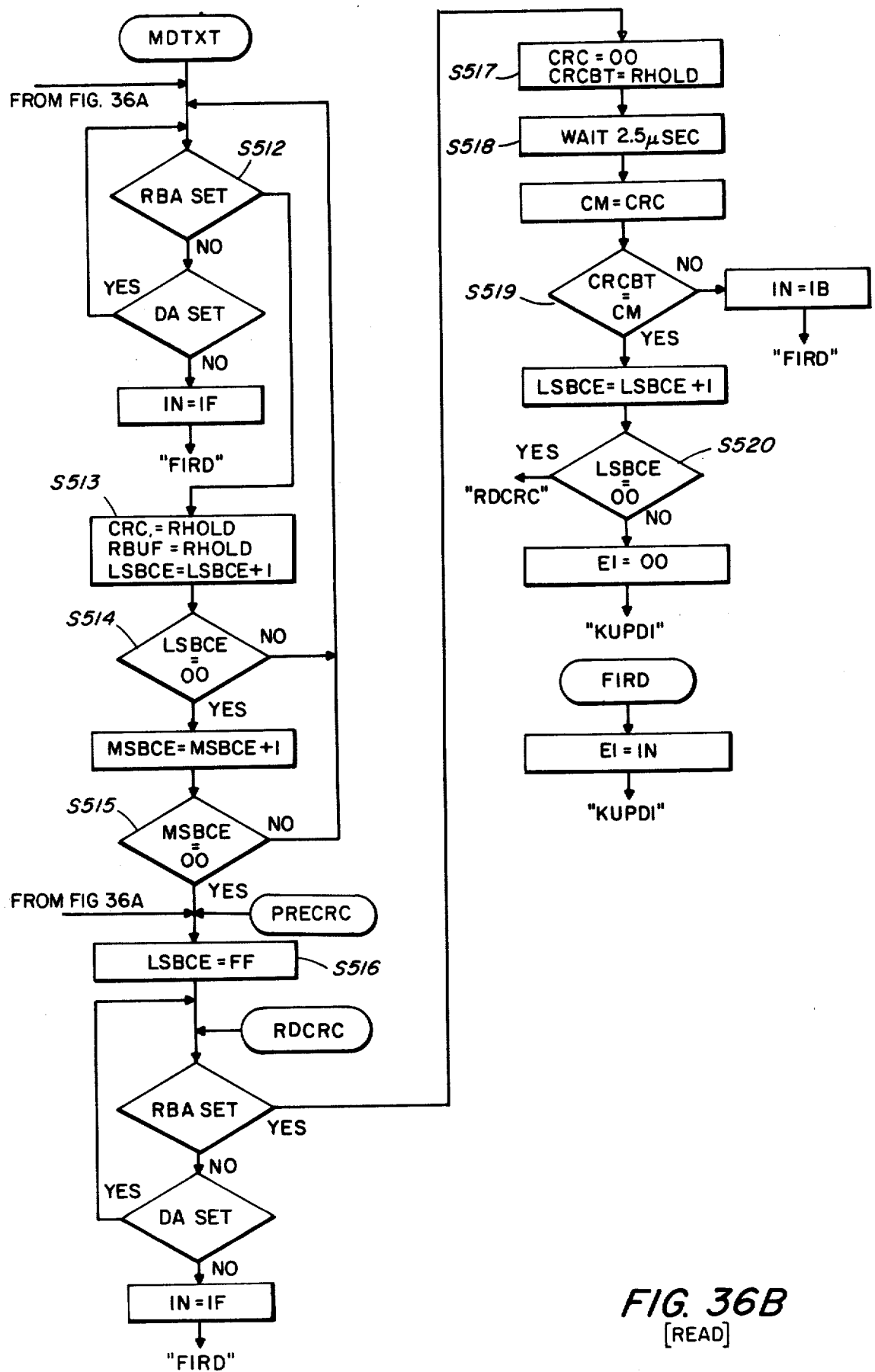
Figure 36C:
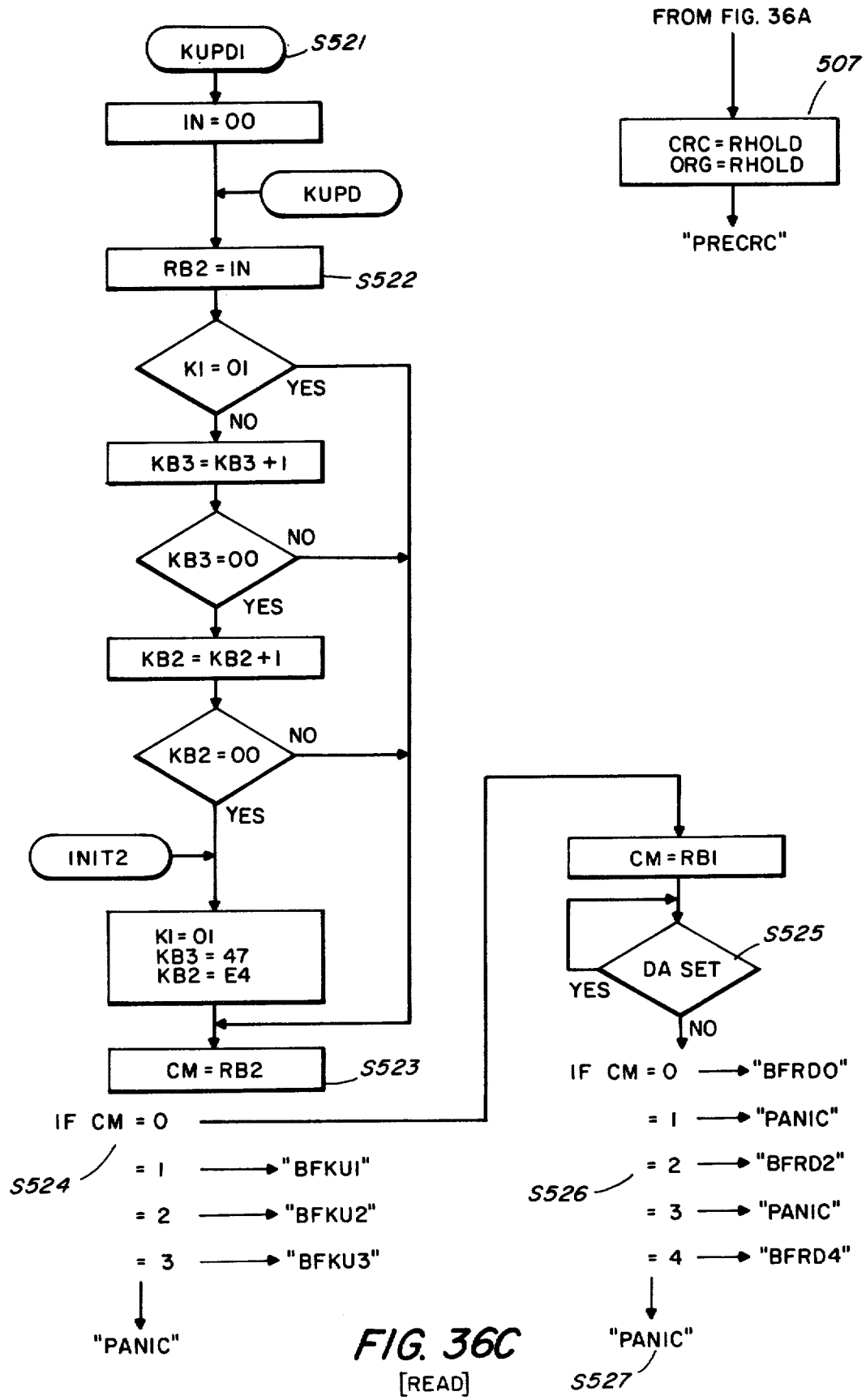

Referring now to FIG. 36 parts A through C, there is illustrated the flow chart for the READ subroutine.

The READ subroutine is responsible for listening to the bus, returning the ID and storing the ID at the scratch pad location <ID>, storing the destination at <DEST>, receiving the originator and storing the originator at the scratch pad location called <ORG>, receiving the most significant byte count and storing it at <MSBC> and receiving the least significant byte count and storing it a <LSBC>. The READ routine is also used for calculating the CRC, comparing the CRC with the CRC arriving and reporting an ERROR or NO ERROR. The READ routine is also responsible for up-dating the K count (i.e. the 8000 message count). The adapter unit achieves this by incrementing the K count by 1. If there is an over flow the adapter unit sets its flag K1 to a 1.

The entry point of the READ subroutine is step S501. Referring to step S502, the adapter unit waits for the first byte to arrive. If the byte arrives after the time out, then the adapter unit will set ERROR 1F and report the status to the I-O Handler at the finish of READ. Referring to step S503, the question is asked if the ID (first byte) is a text. If the first byte is not a text, it then must be a CONTROL message. Referring to 504, the question is asked "ARE WE EXPECTING A CONTROL MESSAGE?". If the answer is no, then the error 1D is reported to the I-O Handler. Referring to step S505, if the adapter unit is expecting a control message, it stores the ID into the scratch location called <ID> and it waits for the next byte to come.

Referring to step S506, the adapter unit stores the next byte which is the destination into <DEST> and then again waits for the next byte to arrive. Referring to step S507, the adapter unit waits for the third byte to arrive, which is the "orginator", and stores the byte at the scratch location, called "orginator" <ORG". Then the adapter unit goes to PRECRC, where the two CRC bytes are read. Referring back to step S503, if the ID was an A4, or text, then the question is asked "WERE WE EXPECTING TEXT?". If the adapter unit was not expecting text, it will report a ID to the I-O Handler and proceed to FINISH READ. If the adapter unit was expecting text, referring to step S508, it will reset the receive buffer pointer, and then wait for the next byte to arrive. Referring to step S509, the next byte that arrives is the most significant byte count. This byte is stored at <MSBC> and <MSBCE> the adapter unit then waits for the next byte to arrive. Referring to step S510, this is the least significant byte count which the microprocessor stores at scratch location <LSBC> and <LSBCE>.

Referring to step S511, the adapter unit checks to see if it was a 0 length message. If it was a 0 length message, the adapter unit will go immediately to PRECRE and start reading the two CRC bytes. Otherwise, the adapter unit will proceed to mid-text, referred to by step S512. At step S512, the adapter unit waits for the first text byte to arrive. When that byte arrives, the adapter unit places it into the receive buffer. Referring back to step S513, the least significant byte count exhaustable is also incremented and then at step S514, a check is made to see if it has overflowed. If it has overflowed, the same operation is performed with the most significant byte count exhausable at step S515. If it is not exhaustable, the adapter unit returns to step S512 and reads the next byte. The adapter unit stays in this loop until the byte count is exhausted. At this time, the adapter unit is at PRECRC, and is about to read the two CRC bytes.

Referring now to step S516, the least significant byte count exhaustable is set to FF to let the adapter unit know that it is about to read the first CRC byte. Referring to step S517, the first CRC byte is stored at scratch location <CRCBT> and at step S518, the adapter unit waits 2.5 microseconds to allow the hardware time to eject the CRC byte. When that byte is ready it is stored in the comparator. At step S519, the adapter unit checks to see if the byte from hardware CRC is the same byte as the CRC transmitted. If the byte is not the same, the adapter unit reports 1B to the I-O Handler by proceeding to FINISH READ. If the bytes are equal, <LSBCE> is incremented and the question is asked if this is the first or second byte. If it is the first byte the adapter unit will return to READ CRC to get the second byte. The second time through, it will fall through and report an error of 0, if that is the case. The adapter unit then proceeds to KUPD1.

Referring to step S521, at K update 1 the adapter unit will place a 0 in its incrementor so that at step S522 the 0 will be stored in <RB2>. At steps S5-2 through S523, the K count is updated by 1 and if the count is equal to 0 the adapter unit will set K1 to 0 and reset the K count. Referring to S524, or K UPDATE EXIT, if there is a 0 as a return type byte, the adapter unit will return to step S525 and wait for data to stop arriving. AT that time the adapter unit will receive <RB1> and then take the appropriate exit. If the byte is none of the above, referring to step S527, the adapter unit will proceed to PANIC.

Various modifications may be made without departing from the spirit and scope of the invention. Thus, the present embodiment is to be considered in all respects as illustrative and not restrictive, the scope of the invention being indicated by the appended claims rather than by the foregoing description, and all changes which come within the meaning and range of equivalency of the claims are therefore intended to be embraced therein.

```
        THE NBA2 HAS A DESCRETE MICROPROCESSOR.  EACH WORD IS SIXTEEN BITS

WIDE WITH THE LEFTMOST THREE BITS AN EFFECTIVE OP-CODE.  THE FIELD USAGE FOR

THE SEVERAL MICRO-INSTRUCTION TYPES IS-

OP-CODE    COMMAND TYPE      DESCRIPTION
--------   ------------      -----------

000       JUMP            ; JUMP <ADDRESS>
  001       MOVE            ; MOVE <SOURCE> <DESTINATION> [<SCR #>]
  010       STI             ; STORE IMMEDIATE <IMMEDIATE> <REGISTER>
  011       BER             ; BRANCH EQUAL REGISTER <REGISTER> <*ADDRESS*>
  100       BEI             ; BRANCH EQUAL IMMEDIATE <IMMEDIATE> <*ADDRESS*>
  101       BCN             ; BRANCH ON CONDITION <CONDITION> <*ADDRESS*>
  110       PLS             ; PULSE <SIGNAL #>
  111       NOP             ; NO OPERATION WITH LABEL FIELD (FOR IDENTIFYING)

*  SOME OF THE MNEMONICS THAT FOLLOW ARE REFERENCED FROM THE

FLOWCHART AND THE MICROCODE LISTING.

;  PULSE DEFINITIONS

MNEMONIC    PULSE #                DESCRIPTION
--------    -------                -----------

PLS 0              ; RESET NBA
 INCRM      PLS 1              ; INCREMENT THE COUNTER
            PLS 2              ; --NOT USED--
 SETF2      PLS 3              ; CLEAR INTERCOM FLAG 2
 CLACT      PLS 4              ; CLEAR ACTIVITY DETECTOR
 PCHON      PLS 5              ; ENABLE POSITIVE SIDE OF LINE DRIVER
 NCHON      PLS 6              ; ENABLE NEGATIVE SIDE OF LINE DRIVER
 DISSO      PLS 7              ; DISABLE BOTH HALVES OF LINE DRIVER
 ZSBUF      PLS 8              ; ZERO TRANSMIT RAM ADDRESS
 ZRBUF      PLS 9              ; ZERO RECEIVE RAM ADDRESS
 RELSD      PLS 0A             ; CLEAR WRITE STATE
 ZCRC       PLS 0B             ; RESET CRC LOGIC
 CONNECT    PLS 0C             ; CLOSE RELAY CONNECTING TO NBA BUS
 DISC       PLS 0D             ; OPEN RELAY CONNECTING TO NBA BUS
            PLS 0E             ; --NOT USED--
            PLS 0F             ; HOLD POSITIVE CHANNEL ON

;  DEFINE THE <REGISTER>'S

;        SOURCE REGISTERS    (READ)

MNEMONIC    SOURCE #               DESCRIPTION
--------    --------               -----------

SCR          0                ; SCRATCHPAD REGISTERS
  IN           1                ; INCREMENTER
```

```
    SBUF        2             ; SEND RAM BUFFER OUTPUT
                3             ; --NOT USED--
    RHOLD       4             ; RECEIVE HOLDING REGISTER (RECEIVED BYTE)
    CRC         5             ; CRC OUT
    IOX         6             ; IO HANDLER INTERCOMMUNICATION MAILBOX
                7             ; --NOT USED--

;       DESTINATION REGISTERS      (WRITE)

MNEMONIC   DESTINATION #      DESCRIPTION
--------   --------------     -----------
    SCR         0             ; SCRATCHPAD REGISTERS (INPUT)
    IN          1             ; INCREMENTER (INPUT)
    RBUF        2             ; RECEIVE RAM BUFFER INPUT
    CM          3             ; COMPARISON REGISTER (WRITE ONLY)
    SHOLD       4             ; SEND HOLDING REGISTER (BYTE TO BE SENT)
    CRC         5             ; CRC INPUT (STORING HERE CLEARS RBA)
    IOX         6             ; INTERPROCESSOR COMMUNICATION REGISTER
                7             ; --NOT USED--

; DEFINE THE CONDITIONS

MNEMONIC   CONDITION #        DESCRIPTION
--------   -----------        -----------
    NCLR        0             ; POWER NOT CLEAR
    EQ7         1             ; CARRY OUT OF INCREMENTER
                2             ; --NOT USED--
    F2          3             ; IO HANDLER INTERCOM FLAG 2
    LAI         4             ; LINE ACTIVITY DETECTOR
    TBMT        5             ; TRANSMIT HOLDING BUFFER EMPTY
    RBA         6             ; RECEIVE BYTE AVAILABLE
    DA          7             ; DATA ARRIVING
```

--- HRA2 SCRATCHPAD DEFINITIONS ---

THE LINE PROCESSOR HAS 32 LOCATIONS OF RAM WHICH IS CALLED SCRATCHPAD. EACH LOCATION IS EIGHT BITS WIDE. THESE RAM CHIPS CAN BE SEEN IN FIG. 5I, CHIPS #691,692,693,AND 694. BELOW IS THE DEFINITION OF EACH LOCATION, THE MNEMONIC NAME GIVEN THE LOCATION, AND A BRIEF DESCRIPTION OF IT USE.

THESE MNEMONICS ARE REFERENCED BOTH IN THE FLOWCHART, AND IN THE MICROCODE LISTING.

```
LOCATION        MNEMONIC        DESCRIPTION
--------        --------        -----------
   00           CLBAA           CLUSTER NOA ADDRESS
   01           CNTFLG          CONTROL FLAG
   02           REACK           RESEND ACK COUNT
   03           CRCBT           HOLDS FIRST CRC BYTE
   04           ACKNCK          LATEST ACK/NAK RESPONCE
   05           KB2             K COUNT (MIDLE BYTE)
   06           KB3             K COUNT (LSB)
   07           TOFB1           TIME OUT FLAG (MSB)
   08           TOFB2           TIME OUT FLAG (LSB)
   09           ORG             ORIGINATOR-RECEIVE ONLY
   0A           DEST            DESTINATION-RECEIVE ONLY
   0B           I.O.            RECEIVE & SEND
   0C           MSBC            BYTE COUNT NOT TO BE EXHAUSTED (MSB)
```

| | | | |
|---|---|---|---|
| 0D | MSBCE | | BYTE COUNT TO BE EXHAUSTED (MSB) |
| 0E | LSBC | | BYTE COUNT NOT TO BE EXHAUSTED (LSB) |
| 0F | LSBCE | | BYTE COUNT TO BE EXHAUSTED (LSB) |
| 10 | CONTROL | | REAL OWNER OF CONTROL |
| 11 | NTYPE | | OUR NODE TYPE |
| 12 | PCC | | PASS CONTROL COUNT |
| 13 | XSMSB | | TRANSMIT (SEND) STATUS (MSB) |
| 14 | XSLSB | | TRANSMIT (SEND) STATUS (LSB) |
| 15 | RNBAA | | REMOTE NBA ADDRESS (DESTINATION, SEND ONLY) |
| 16 | SKPCT | | SKIP COUNT |
| 17 | SAWFR | | SEND AND WAIT FOR RESPONCE |
| 18 | IDSTI | | IDLE STATE INDICATER |
| 19 | NNR | | NEXT NODE (TO BE PASSED CONTROL) REGISTER |
| 1A | NBAA | | OWN NODE NUMBER |
| 1B | RB2 | | RETURN BYTE 2 |
| 1C | K1 | | K'TH COUNT INDICATER |
| 1D | EI OR HISTN | | ERROR INDICATER OR HIGHEST NODE # |
| 1E | CB1 | | CONTROL BYTE 1 |
| 1F | RB1 | | RETURN BYTE 1 |

-- FOLLOWING IS THE NBA2 MICROCODE LISTING --

```
01
02
03                              /************NBA2-MICROCODE************
04        002020                                ROM=0
05                                              START
06
07
08
09
10        0002              REVNO=02            ;REV # 2
11        0080              MAXNO=80            ;MAX NUMBER OF TERMINALS=128
12        007F              MAXNC=7F            ;MAX NUMBER ONES COMPLEMENT= :
13
```

```
10002 NBA2C
01                              /*****SELF-TEST*****
02
03  00000!  3021              JUMP    STRT
04  20001!  C70A STRT:        DISSD                   ;DISABLE SEND
05  00002!  CD0A              DISC                    ;DISCONNECT FROM BUS
06  00003!  3A6A              MOVE    IOX,SCR,1A      ;GET OUR NBA NUMBER -<NBAA>
07  00004!  4005              STI     00,CRC          ;CLEAR RBA FLAG
08  00005!  C40A              CLACT                   ;CLEAR ACTIVITY INDICATOR
09  00006!  C80A              ZCRC                    ;INITILIZE CRC LOGIC
10  00007!  4021              STI     02,IN           ;PREPARE 02 AS A RETURN BYTE
11  00008!  3B1A              MOVE    IN,SCR,1B       ;WRITE IT IN <RB2>
12  00009!  4001              STI     00,IN           ;PREPARE FOR K1 TO BE ZERO
13  0000A!  02EA              JUMP    INIT2           ;GO INITIALIZE K COUNT
14
15  0000B!  4001 BFKU2:       STI     00,IN           ;PREPARE 00 AS RETURN BYTE
16  0000C!  3F1A PWT:         MOVE    IN,SCR,1F       ;STORE IT IN <RB1>
17  0000D!  4FA1              STI     0FA,IN          ;PREPARE MSBYTE OF WAIT LOOP
18  0000E!  271A              MOVE    IN,SCR,07       ;WRITE IT IN PLACE
19  0000F!  44F1              STI     4F,IN           ;PREPARE LSBYTE OF WAIT LOOP
20  00010!  281A              MOVE    IN,SCR,08       ;WRITE IT IN PLACE
21  00011!  2801 WAIT:        MOVE    SCR,IN,08       ;GET LSBYTE
22  00012!  C10A              INCRM                   ;INCREMENT
23  00013!  281A              MOVE    IN,SCR,08       ;WRITE IT BACK
24  00014!  A10A              BCN     EQZ,.+2         ;OVERFLOW?
25  00015!  3011              JUMP    WAIT            ;NO,BACK TO WAIT
26  00016!  2701              MOVE    SCR,IN,07       ;YES,GET MSBYTE OF WAIT ROUTIN
27  00017!  C10A              INCRM                   ;INCREMENT
28  00018!  271A              MOVE    IN,SCR,07       ;WRITE IT BACK
29  00019!  A10A              BCN     EQZ,.+2         ;OVERFLOW?
30  0001A!  3011              JUMP    WAIT            ;NO,BACK TO WAIT
```

```
31 00018'  3F33         MOVE    SCR,CM,1F    ;YES,GET <RB1>
32 00010'  8R0F         BEI     00,,+2       ;IF 0 ,GO TO INIT1
33 0001D'  0042         JUMP    BFWT1        ;IF NON-ZERO GO TO BFWT1
34 0001E'  2029         JUMP    INIT1
35
36 0001F'  4025 GCRC:   STI     0C,CRC       ;KICK OUT A CRC BYTE
37 00020'  4FC1         STI     0FC,IN       ;PREPARE 2.5MICROSEC.T.O.
38 00021'  C12A         INCRM                ;INCREMENT
39 00022'  A134         BCN     EQZ,,+2      ;NO BACK UP TWO NOTCHES
40 00023'  0021         JUMP    .-2
41 00024'  2056         MOVE    CRC,IOX      ;YES, GIVE CRC TO IO/H
42 00025'  0029         JUMP    INIT1
43
44 00026'  81FA MOCMD:  BEI     1F,,+2       ;IS IT RESET?
45 00027'  0056         JUMP    PANIC        ;NO, GO PANIC
46 00028'  0116         JUMP    RESET        ;YES, FAKE A REMOTE RESET
47
48 00029'  C322 INIT1:  SETF2                ;NOTIFY IOH
49 0002A'  A30A         BCN     F2,,
50 0002B'  2051         MOVE    IOX,IN
51 0002C'  2018         MOVE    IN,SCR,AB    ;GET <ID>
52 0002D'  2013         MOVE    IN,CM
53 0002E'  4014         STI     01,SHOLD     ;SEND OUT SYNC BIT
54 0002F'  812B         BEI     12,,+9       ;DIRECT BUFFER TO BUFFER?
55 00030'  8159         BEI     15,,+9       ;POSITIVE ONLY?
56 00031'  81AA         BEI     1A,,+9       ;NEGATIVE ONLY?
57 00032'  81EA         BEI     1E,,+9       ;BOTH CHANNELS?
58 00033'  803C         BEI     3,,+9        ;GET CRC?
59 00034'  807D         BEI     7,,+9        ;REV. #?
60 00035'  806F         BEI     6,,+9        ;PRE-INITIALIZE?

0003 NBAQC
01 00036'  804F         BEI     4,CONN       ;CONNECT?
02 00037'  C02A         JUMP    MOCMD        ;GO CHECK SOME MORE
03 00038'  0052         JUMP    LOCAL        ;DIRECT BUFFER TO BUFFER XFER
04 00039'  004E         JUMP    PCH          ;TRANSFER VIA POSITIVE CHANNEL
05 0003A'  004A         JUMP    NCH          ;TRANSFER VIA NEGATIVE CHANNEL
06 0003B'  3045         JUMP    BCHS         ;TRANSFER VIA BOTH CHANNELS
07 0003C'  001F         JUMP    GCRC         ;GO GET CRC
08 0003D'  008F         JUMP    REV          ;GIVE REVISION #
09 0003E'  005A         JUMP    PINIT        ;GO PRE-INITIALIZE
10 0003F'  CC3A CONN:   CONNECT              ;CLOSE THE BUS RELAY
11 00040'  4011         STI     01,IN        ;PREPARE RETURN BYTE
12 00041'  000C         JUMP    PWT
13
14 00042'  4011 BFWT1:  STI     01,IN        ;PREPARE IDLE STATE #1
15 00043'  381A         MOVE    IN,SCR,18    ;STORE IT IN <IDSTI>
16 00044'  0352         JUMP    F011
17
18 00045'  CA0A BCHS:   RELSD                ;RELEASE SEND CIRCUITRY
19 00046'  0047         JUMP    .+1          ;SEND TIMING ADJUSTMENT
20 00047'  C62A         PCHON                ;RELEASE POSITIVE CHANNEL
21 00048'  C62A         NCHON                ;RELEASE NEGATIVE CHANNEL
22 00049'  0062         JUMP    CTBMT        ;
23
24 0004A'  CA2A NCH:    RELSD                ;RELEASE SEND CIRCUITRY
25 0004B'  004C         JUMP    .+1          ;SEND TIMING ADJUSTMENT
26 0004C'  C62A         NCHON                ;RELEASE NEGATIVE CHANNEL
27 0004D'  0052         JUMP    CTBMT        ;
28
29 0004E'  CA2A PCH:    RELSD                ;RELEASE SEND CIRCUITRY
30 0004F'  0050         JUMP    .+1          ;SEND TIMING ADJUSTMENT
31 00050'  C52A         PCHON                ;RELEASE POSITIVE CHANNEL
32 00051'  0062         JUMP    CTBMT        ;
33
34 00052'  2021 LOCAL:  MOVE    SBUF,IN      ;GET BYTE FROM SEND BUFFER
35 00053'  2015         MOVE    IN,CRC       ;WRITE IT IN CRC
36 00054'  2012         MOVE    IN,RBUF      ;WRITE IT IN RECEIVE BUFFER
37 00055'  0086         JUMP    STEX-1       ;
38
39 00056'  43B6 PANIC:  STI     3B,IOX       ;NOTIFY IOH
40 00057'  C32A         SETF2
```

```
41  000501  A30R            BCN     F2,.
42  000591  0056            JUMP    PANIC
43
44  00005A' 4F05   PINIT:   STI     00,CRC          ;RESET RBA
45  00005B' CB0A            ZCRC                    ;ZERO CRC
46  00005C' C72A            DISSO                   ;DISABLE SEND
47  00005D' 002A            JUMP    INIT1
48
49  00005E' 005F            JUMP    .+1
50  00005F' 0060            JUMP    .+1
51  000060' 0061            JUMP    .+1
52  000061' 0062            JUMP    .+1
53
54  000062' 4F01   CTBMT:   STI     0F9,IN          ;PREPARE 0.125MICROSEC T.O.
55  000063' C10A            INCRM                   ;INCREMENT
56  000064' A106            BCN     EQZ,.+2
57  000065' 0067            JUMP    .+2
58  000066' 006E            JUMP    ERR4
59  000067' A523            BCN     TBMT,.-4        ;
60  000068' 2320            MOVE    SBUF,SCR,03     ;GET THE BYTE AND STORE IT

0004 NUA2C
01  000069' 2334            MOVE    SCR,SHOLD,03    ;PUT IT IN SEND HOLD REG.
02  00006A' 2335            MOVE    SCR,CRC,03      ;CRC IT
03  00006B' 0091            JUMP    LACH
04
05  00006C' 4271   ERR1:    STI     27,IN           ;ERROR # INDICATOR
06  00006D' 0087            JUMP    STEX
07
08  00006E' 4201   ERR4:    STI     20,IN           ;ERROR # INDICATOR
09  00006F' 0087            JUMP    STEX
10
11  000070' A704   DACH1:   BCN     DA,.+4          ;DA SET? 9.6 MICROSEC T.O.
12  000071' C10A            INCRM                   ;NO.INCREMENT
13  000072' A10A            BCN     EQZ,ERR2        ;TIMEOUT EXHAUSTED?
14  000073' 007A            JUMP    .-3             ;NO INCREMENT AGAIN
15  000074' 4F01            STI     0F8,IN          ;14 MICROSEC T.O.
16  000075' A620            BCN     RBA,.+8         ;IS RBA UP?
17  000076' C10A            INCRM                   ;INCREMENT
18  000077' A10A            BCN     EQZ,ERR3        ;TIMEOUT INTEVAL EXHAUSTED
19  000078' 0075            JUMP    .-3             ;NO. INCREMENT AGAIN
20  000079' 4281   ERR3:    STI     28,IN           ;ERROR # INDICATOR
21  00007A' 0087            JUMP    STEX            ;GO TO SELF TEST EXIT
22  00007B' 4291   ERR2:    STI     29,IN           ;ERROR # INDICATOR
23  00007C' 0087            JUMP    STEX            ;GO TO SELF TEST EXIT
24  00007D' 2843            MOVE    RHOLD,CM        ;PREPARE TO COMPARE BYTES
25  00007E' E80A            NOP     0               ;ADJUSTMENT
26  00007F' 6302            BER     03,.+3          ;COMPARE?
27  000080' 42F1   ERR5:    STI     2F,IN           ;ERROR # INDICATOR
28  000081' 0087            JUMP    STEX
29  000082' 2A42            MOVE    RHOLD,RBUF      ;STORE BYTE IN RECEIVE BUFFER
30  000083' C72A            DISSO                   ;DISABLE SEND
31  000084' 4F01            STI     0F0,IN          ;PREPARE FOR DA TIMEOUT
32  000085' A72B            BCN     DA,DACH2        ;DATA IS STILL ARRIVING?
33  000086' 4001            STI     00,IN
34  000087' 2016   STEX:    MOVE    IN,IOX          ;GIVE ERROR CODE TO IOM
35  000088' C40A            CLACT                   ;NO. CLEAR ACTIVITY INDICATOR
36  000089' C70A            DISSO                   ;DISABLE SEND
37  00008A' 002A            JUMP    INIT1
38  00008B' C10A   DACH2:   INCRM
39  00008C' A12F            BCN     EQZ,.+2         ;DA TIMEOUT?
40  00008D' 0085            JUMP    .-8             ;NO.
41  00008E' 007B            JUMP    ERR2            ;YES. GO REPORT ERROR
42
43  00008F' A426   REV:     STI     REVNO,IOX       ;GIVE REVISION # TO IOM
44  000090' 002A            JUMP    INIT1
45
46  000091' A423   LACH:    BCN     LAI,.+2
47  000092' 0050            JUMP    ERR1
48  000093' 4F51            STI     0F5,IN          ; -11
49  000094' 0070            JUMP    DACH1
50
```

```
18805 NBA2C                         ;*IDLE ROUTINE*
01
02
03  00098'  47F1  PIDLE:  STI    MAXNC,IN      ;GET THE HIGHEST NODE #
04  00098'  3D1A          MOVE   IN,SCR,1D     ;STORE IT IN 1D "HISTN"
05  00097'  47A1  TOFS:   STI    7A,IN         ;PREPARE TIME OUT FLAG. 234
06  00098'  271A          MOVE   IN,SCR,07     ;STORE IT IN <TOF01>   X 128
07  00099'  C40A          CLACT                ;CLEAR LAI         -----
08  0009A'  2701  IDLE:   MOVE   SCR,IN,07     ;GET <TOF01>     30 MILLI SEC
09  0009B'  C10A          INCRM                ;INCREMENT
10  0009C'  271A          MOVE   IN,SCR,07     ;WRITE IT BACK
11  0009D'  A10F          BCN    EQZ,.+2       ;OVERFLOW?
12  0009E'  00A3          JUMP   DACHK         ;NO;GO CHECK DA INDICATOR
13  0009F'  3001          MOVE   SCR,IN,1D     ;GET <HISTN>
14  000A0'  C10A          INCRM                ;INCREMENT
15  000A1'  3D1A          MOVE   IN,SCR,1D     ;WRITE IT BACK
16  000A2'  A10A          BCN    EQZ,ELECT     ;OVERFLOW?
17  000A3'  A726  DACHK:  BCN    DA,.+3        ;DATA ARRIVING?
18  000A4'  A407          BCN    LAI,.+3       ;NO,ACTIVITY INDICATOR UP?
19  000A5'  009A          JUMP   IDLE          ;NO,BACK TO IDLE
20  000A6'  00F1          JUMP   PR08          ;YES;GO TO PRE-READ-0
21  000A7'  0095          JUMP   PIDLE         ;YES;BACK TO PRE-IDLE
22  000A8'  C50A  ELECT:  PCHON                ;ACTIVATE POSITIVE CHANNEL
23  000A9'  CF0A          PLS    0F            ;SET POSITIVE CHANNEL FLOP
24  000AA'  4381          STI    38,IN         ;PULSE WIDTH (125 MICRO-SEC)
25  000AB'  C10A          INCRM                ;INCREMENT
26  000AC'  A10E          BCN    EQZ,.+2       ;OVERFLOW?
27  000AD'  00AB          JUMP   .-2           ;BACK UP TWO NOTCHES
28  000AE'  C70A          DISBD                ;END THE PULSE
29  000AF'  4381          STI    38,IN         ;DELAY (125 MICRO-SEC)
30  000B0'  C10A          INCRM                ;INCREMENT
31  000B1'  A10D          BCN    EQZ,.+2       ;OVERFLOW?
32  000B2'  00BA          JUMP   .-2           ;NO,BACK UP TWO NOTCHES
33  000B3'  3D1A          MOVE   IN,SCR,19     ;RESET <NNU>
34  000B4'  C40A          CLACT                ;CLEAR ACTIVITY INDICATOR
35  000B5'  40E1  STELC:  STI    0E,IN         ;DELTA CONSTANT(200 MICRO-SEC)
36  000B6'  C10A  DELTA:  INCRM                ;INCREMENT
37  000B7'  A10A          BCN    EQZ,.+3       ;OVERFLOW?
38  000B8'  A40B          BCN    LAI,LOST      ;LAI IS UP? IF YES I LOST
39  000B9'  00B6          JUMP   .-3           ;NO, BACK UP THREE NOTCHES
40  000BA'  00BE          JUMP   NOACT         ;
41  000BB'  4021  LOST:   STI    02,IN         ;PREPARE IDSTI=02
42  000BC'  3B1A          MOVE   IN,SCR,1B     ;STORE IT IN <IDSTI>
43  000BD'  0095          JUMP   PIDLE         ;GO TO PRE IDLE
44
45  000BE'  3903  NOACT:  MOVE   SCR,CM,19     ;PREPARE CURRENT DELTA #
46  000BF'  7A3A          BER    1A,WON        ;IS IT EQUAL TO NBAA
47  000C0'  3901          MOVE   SCR,IN,19     ;GET CURRENT DELTA #
48  000C1'  C10A          INCRM
49  000C2'  3D1A          MOVE   IN,SCR,19     ;WRITE IT BACK
50  000C3'  00B5          JUMP   STELC         ;JUMP TO START ELECTION
51
52  000C4'  C50A  WON:    PCHON                ;RELEASE POSITIVE CHANNEL
53  000C5'  CF2A          PLS    2F            ;SET POSITIVE CHANNEL FLOP
54  000C6'  4ED1          STI    0ED,IN        ;PULSE (12 MICRO-SEC)
55  000C7'  C10A          INCRM
56  000C8'  A10A          BCN    EQZ,.+2       ;OVERFLOW?
57  000C9'  00C7          JUMP   .-2
58  000CA'  C70A          DISBD                ;DISABLE WRITE
59  000CB'  3AD1          MOVE   SCR,IN,1A     ;MOVE <NBAA> TO INCREMENTER
60  000CC'  3D1A          MOVE   IN,SCR,19     ;WRITE IT IN <NNR>

8806 NBA2C
01  000CD'  3901  NNU:    MOVE   SCR,IN,19     ;GET <NNR>
02  000CE'  C10A          INCRM
03  000CF'  2013          MOVE   IN,CM         ;MOVE IT TO THE COMPARITOR
04  000D0'  88CA          BEI    MAXNO,ADJN    ;COMPARE TO HIGHEST NODE #
05  000D1'  3D1A  STNNR:  MOVE   IN,SCR,19     ;STORE IT IN <NNR>
06  000D2'  4311          STI    31,IN         ;PREPARE MESSAGE ID
07  000D3'  2B1A          MOVE   IN,SCR,08     ;STORE IT IN THE ID
08  000D4'  3901  PWR0:   MOVE   SCR,IN,19     ;GET <NNR> CONTENTS
09  000D5'  351A          MOVE   IN,SCR,15     ;DEPOSIT IT INTO <RNBAA>
```

```
10 000D6'  4001          STI     00,IN            ;RB1=0
11 000D7'  3F1A  PWRNT:  MOVE    IN,SCR,1F        ;STORE IT IN <RB1>
12 000D8'  4001          STI     00,IN            ;PREPARE NTXT INDICATOR
13 000D9'  3E1A          MOVE    IN,SCR,1E        ;STORE IT IN <CB1>
14 000DA'  C1D4          JUMP    WRITE            ;GO TO WRITE ROUTINE
15 000DB'  4001  ADJN:   STI     00,IN            ;RESET INCREMENTER
16 000DC'  C0D1          JUMP    STNNR            ;BACK TO STORE NNR
17
18 000DD'  C4CA  BFWR0:  CLACT                    ;CLEAR ACTIVITY INDICATOR
19 000DE'  4321          STI     32,IN            ;230 MICRO-SEC T.O.
20 000DF'  C10A          INCRM
21 000E0'  A10A          BCN     EQZ,TRAP         ;OVERFLOW?
22 000E1'  A4D4          BCN     LAI,.+3          ;ACTIVITY ON LINE?
23 000E2'  E00A          NOP     00
24 000E3'  30DF          JUMP    .-4              ;BACK UP FOUR LINES
25 000E4'  4031          STI     03,IN            ;PREPARE IOSTI=3
26 000E5'  20BC          JUMP    LOST+1           ;
27 000E6'  3533  TRAP:   MOVE    SCR,CM,15        ;DESTINATION OF LAST MESSAGE
28 000E7'  7A3A          BER     1A,.+2           ;WAS IT OURSELF?
29 000E8'  C0CD          JUMP    NNU              ;NO, GO SEND ANOTHER
30 000E9'  C137          JUMP    PHC1             ;YES,NOBODY OUT THERE.
31
32 000EA'  4A11  RRACK:  STI     0A1,IN           ;
33 000EB'  281A          MOVE    IN,SCR,08        ;"YES,I WILL AUTO RESET" <ID>
34 000EC'  29C3          MOVE    SCR,IN,09        ;GET <ORG>
35 000ED'  351A          MOVE    IN,SCR,15        ;MAKE ORG. THE DEST. -<RNBAA>
36 000EE'  4051          STI     05,IN            ;PREPARE RBI
37 000EF'  3F1A          MOVE    IN,SCR,1F        ;<RB1>=5
38 000F0'  C1D4          JUMP    WRITE            ;
39
40 000F1'  4001  PRD0:   STI     00,IN            ;PREPARE NTXT INDICATION
41 000F2'  3E1A          MOVE    IN,SCR,1E        ;WRITE IT IN <CB1>
42 000F3'  3F1A          MOVE    IN,SCR,1F        ;WRITE 00 IN <RB1>
43 000F4'  C27F          JUMP    READ             ;GO HEAD
44
45 000F5'  3DC3  BFRD2:  MOVE    SCR,IN,1D        ;PREPARE <EI> TO BE CHECKED
46 000F6'  A10A          BCN     EQZ,.+2          ;IF NO ERROR JUMP .+2
47 000F7'  C095          JUMP    PIDLE            ;GO TO PRE IDLE
48 000F8'  28C3          MOVE    SCR,CM,08        ;MOVE <ID> TO BE COMPARED
49 000F9'  852F          BEI     52,INTR2         ;IS IT NEWCOMMER INTEROGATION?
50 000FA'  3AC3          MOVE    SCR,CM,1A        ;PREPARE <NBAA> TO BE CHECKED
51 000FB'  8A2D          BER     0A,.+2           ;MESSAGE DIRECTED TO US?
52 000FC'  C095          JUMP    PIDLE            ;IT IS NOT. GO IDLE
53 000FD'  C11F          JUMP    HCCHK            ;GO TO HAVE CONTROL CHECK
54 000FE'  4031  INTR2:  STI     03,IN            ;PREPARE RETURN BYTE
55 000FF'  C0CA          JUMP    STRT+7           ;GO INITILIZE K COUNT
56
57 00100'  3603  BFKU3:  MOVE    SCR,IN,16        ;GET <SKPCT>
58 00101'  36C3          MOVE    SCR,CM,16        ;STORE IT ALSO IN COMPARITOR
59 00102'  C22A          BEI     2,PLSLN          ;=027
60 00103'  C10A          INCRM

#007 NBA2C
01 00104'  361A          MOVE    IN,SCR,16        ;WRITE IT BACK
02 00105'  2013          MOVE    IN,CM            ;READY TO DO COMPARISON
03 00106'  8A2A          BEI     2,PLSLN          ;REACHED LIMIT?
04 00107'  3803          MOVE    SCR,CM,18        ;GET <IDSTI> FOR INSPECTION
05 00108'  801A          BEI     01,PLSLN         ;=17
06 00109'  C09A          JUMP    PIDLE
07 0010A'  4EB1  PLSLN:  STI     0EB,IN           ;12 MICRO SEC DELAY
08 0010B'  C10A          INCRM
09 0010C'  A12E          BCN     EQZ,.+2
10 0010D'  010B          JUMP    .-2
11 0010E'  C50A          PCHON
12 0010F'  CF0A          PLS     0F               ;SET POSITIVE FLOP ON
13 00110'  4381          STI     38,IN            ;PULSE WIDTH (125 MICRO-SEC)
14 00111'  C10A          INCRM
15 00112'  A104          BCN     EQZ,.+2          ;OVERFLOW?
16 00113'  0111          JUMP    .-2
17 00114'  C70A          DISBD                    ;CLEAR WRITE CIRCUTRY
18 00115'  C3BA          JUMP    LOST
19
```

```
20 00116'  4A16  RESET:  STI    0A1,IOX       ;NOTIFY IOX OF AUTO RESTART
21 00117'  C30A          SETF2
22 00118'  A30A          BCN    F2,.          ;IOH RESPOND YET?
23 00119'  290A          MOVE   SCR,IOX,09    ;GET <ORG>
24 0011A'  C30A          SETF2                ;NOTIFY IOH
25 0011B'  A30A          BCN    F2,.
26 0011C'  C80A          PLS    0             ;NON-MASKABLE INTERRUPT
27 0011D'  002A          JUMP   INIT1         ;GO TO INIT1
28
29 0011E'  2803  HCCHK:  MOVE   SCR,CM,08     ;GET <ID> AGAIN
30 0011F'  8041          BEI    04,.+2        ;IS IT HAVE CONTROL?
31 00120'  0124          JUMP   INTCH         ;
32 00121'  3803          MOVE   SCR,CM,18     ;GET <IDSTI> FOR INSPECTION
33 00122'  8014          BEI    1,.+2         ;IS IT IDLE STATE # 1?
34 00123'  0395          JUMP   F018          ;NORMAL OR GRANTED CONTROL?
35 00124'  831A  INTCH:  BEI    31,INTR1      ;IS IT INTERROGATE # 1?
36 00125'  895E          BEI    98,.+9        ;IS IT RTS?
37 00126'  854F          BEI    54,RRS        ;IS IT REMOTE RESET?
38 00127'  033A          JUMP   F005          ;IS IT RESEND ACK?
39 00128'  4001  INTR1:  STI    00,IN         ;STORE 00 IN INCREMENTER
40 00129'  3C1A          MOVE   IN,SCR,1C     ;WRITE IT IN <K1>
41 0012A'  3803          MOVE   SCR,CM,18     ;GET <IDSTI> FOR INSPECTION
42 0012B'  8030          BEI    03,.+2        ;IS IT IDLE STATE THREE?
43 0012C'  00C4          JUMP   WON
44 0012D'  0137          JUMP   PHC1
45 0012E'  0246          JUMP   SRS           ;GO TO START RECEIVE SEQUENCE
46 0012F'  A001  RRS:    BCN    00,.+2        ;ARE WE COFIGURED TO RESET?
47 00130'  00EA          JUMP   RRACK         ;YES, REMOTE RESET ACKNOWLEDGE
48 00131'  4611          STI    61,IN         ;PREPARE NEGATIVE RESPONSE ID
49 00132'  2B1A          MOVE   IN,SCR,0B     ;DEPOSIT IT INTO <ID> FIELD
50 00133'  2901          MOVE   SCR,IN,09     ;GET <ORG>
51 00134'  351A          MOVE   IN,SCR,15     ;MAKE IT DESTINATION <RNBAA>
52 00135'  4011          STI    01,IN         ;01=RB1
53 00136'  0007          JUMP   PHRNT         ;GO TO WRITE EXIT TO PIDLE
54
55

1:008 NBA2C
 1                                            ;*SEND ROUTINE*
 02
 03 00137'  4021  PHC1:  STI    02,IN         ;PREPARE IDSTI=2
 04 00138'  381A          MOVE   IN,SCR,18    ;WRITE IT IN <IDSTI>
 05 00139'  4001          STI    00,IN        ;PREPARE 00 IN COUNTER
 06 0013A'  381A          MOVE   IN,SCR,18    ;RESET <8KPCT> INDICATOR
 07 0013B'  4026          STI    00,IOX       ;00(HAVE CONTROL)INTO IPX
 08 0013C'  C30A  PHC2:  SETF2                ;NOTIFY IOH
 09 0013D'  A30A          BCN    F2,.         ;F2 RESET YET?
 10 0013E'  2861          MOVE   IOX,IN       ;GET COMMAND
 11 0013F'  2013          MOVE   IN,CM        ;PREPARE IT FOR COMPARISON
 12 00140'  341A          MOVE   IN,SCR,14    ;ALSO STORE IN <XSLSB>
 13 00141'  8007          BEI    00,.+6       ;IS IT 00?
 14 00142'  C30A  SSS:   SETF2                ;NO,NOTIFY IOH
 15 00143'  A303          BCN    F2,.         ;F2 RESET ?
 16 00144'  355A          MOVE   IOX,SCR,15   ;GET <RNBAA> AND STORE IT
 17 00145'  015F          JUMP   MSS
 18 00146'  03EA          JUMP   F022         ;PASS NORMAL CONTROL?
 19 00147'  3C01          MOVE   SCR,IN,1C    ;GET <K1>
 20 00148'  A126          BCN    EQZ,.-2      ;IS K1 ON ?
 21 00149'  4001          STI    00,IN        ;YES,STORE 00,IN INCREMENTER
 22 0014A'  3C1A          MOVE   IN,SCR,1C    ;RESET <K1>
 23 0014B'  4521          STI    52,IN        ;PREPARE ANY NEWCOMER IO
 24 0014C'  2B1A          MOVE   IN,SCR,0B    ;STORE IT IN <ID>
 25 0014D'  4021          STI    02,IN        ;PREPARE RB1
 26 0014E'  0007          JUMP   PHRNT
 27
 28 0014F'  C40A  BFWR2: CLACT                ;CLEAR ACTIVITY INDICATOR
 29 00150'  44A1          STI    4A,IN        ;250 MICROSEC T.O.
 30 00151'  03F2          JUMP   F025
 31 00152'  A104          BCN    EQZ,.+2      ;TIME PASSED?
 32 00153'  0151          JUMP   .-2
 33 00154'  A426          BCN    LAI,.+2      ;LAI SET?
 34 00155'  0157          JUMP   PASCN        ;NO,GO AND PASS CONTROL
```

```
35  00156'  0AC4          JUMP    WON
36
37  00157'  4FC1  PASCN:  STI     0FC,IN              ;RESET PASS CONTROL COUNTER
38  00158'  321A          MOVE    IN,SCR,12           ;STORE IT IN <PCC>
39  00159'  4641          STI     64,IN               ;PREPARE PASS CONTROL ID
40  0015A'  2B1A          MOVE    IN,SCR,0B           ;STORE ID IN <ID> FIELD
41  0015B'  3B2A          MOVE    SCR,IN,19           ;PREPARE <NNR> AS DESTINATION
42  0015C'  03EF          JUMP    F024                ;
43
44  0015D'  42B1  PEOS1:  STI     2B,IN               ;NO, I CANNOT DO IT
45  0015E'  0190          JUMP    EOS
46
47  0015F'  882A  MSS:    BEI     80,SEND1            ;IS IT SEND?
48  00160'  881A          BEI     81,SEND1            ;IS IT SEND AND HOLD?
49  00161'  8013          BEI     01,.+2              ;IS IT REMOTE RESET?
50  00162'  0056          JUMP    PANIC               ;INVALID COMMAND. GO PANIC
51  00163'  4541          STI     54,IN               ;PREPARE REMOTE RESET ID
52  00164'  2B1A          MOVE    IN,SCR,0B           ;STORE IT IN <ID> FIELD
53  00165'  4B21          STI     02,IN               ;PREPARE SAWFR FIELD
54  00166'  371A  JOIN:   MOVE    IN,SCR,17           ;STORE IT IN <SAWFR> FIELD
55  00167'  4031          STI     03,IN               ;PREPARE RB1=03
56  00168'  3F1A          MOVE    IN,SCR,1F           ;WRITE IT IN <RB1>
57  00169'  0104          JUMP    WRITE
58
59  0016A'  C32A  SEND1:  SETF2                       ;SET F2
60  0016B'  A3BA          BCN     F2,.                ;IS IT RESET YET?

0009 NUA2C
01  0016C'  2A61          MOVE    IOX,IN              ;YES, MOVE MSB OF BYTE COUNT
02  0016D'  201A          MOVE    IN,SCR,0D           ;STORE IT IN <MSBC>
03  0016E'  2C1A          MOVE    IN,SCR,0C           ;STORE IT IN <MSBCE>
04  0016F'  C30A          SETF2                       ;SET F2
05  00170'  A30A          BCN     F2,.                ;IS IT RESET YET?
06  00171'  2A61          MOVE    IOX,IN              ;GET LSB OF BYTE COUNT FIELD
07  00172'  2F1A          MOVE    IN,SCR,0F           ;DEPOSIT IT IN <LSBC>
08  00173'  2E1A          MOVE    IN,SCR,0E           ;DEPOSIT IT IN <LSBCE>
09  00174'  0355          JUMP    F012                ;CHECK SPECIAL TRANSMITS
10  00175'  2B1A  PREJN:  MOVE    IN,SCR,0B           ;STORE IT IN <ID>
11  00176'  4001          STI     00,IN               ;PREPARE SAWFR=0
12  00177'  0166          JUMP    JOIN
13
14  00178'  4001  BFWR3:  STI     00,IN
15  00179'  331A          MOVE    IN,SCR,13           ;INITIALIZE <XSMSB>
16  0017A'  017C          JUMP    .+2
17  0017B'  0186          JUMP    PEOS
18  0017C'  4001          STI     00,IN               ;225 MICROSEC T.O.
19  0017D'  C10A          INCRM
20  0017E'  A10A          BCN     EQZ,.-3             ;OVERFLOW ?
21  0017F'  A7C1          BCN     DA,PRD2             ;DATA ARRIVING?
22  00180'  0170          JUMP    .-3                 ;
23
24  00181'  4001  PRD2:   STI     00,IN               ;PREPARE A 00 IN INCREMENTER
25  00182'  3E1A          MOVE    IN,SCR,1E           ;NON TEXT INDICATOR AT <CB1>
26  00183'  4B21          STI     02,IN               ;PREPARE 02 AS RETURN BYTE
27  00184'  3F1A          MOVE    IN,SCR,1F           ;STORE IT IN <RB1>
28  00185'  027E          JUMP    READ
29
30  00186'  3703  PEOS:   MOVE    SCR,CM,17           ;PREPARE <SAWFR> INDICATOR
31  00187'  4091          STI     09,IN               ;PREPARE 09 FOR NO ACKNOWLDGE
32  00188'  802C          BEI     2,EOS               ;IS IT EQUAL TO 02?
33  00189'  4071          STI     07,IN               ;PREPARE 07 FOR NO RESPONSE
34  0018A'  800C          BEI     0,EOS               ;IS IT EQUAL TO 0?
35  0018B'  032A          JUMP    F003                ;
36  0018C'  341A  EOS:    MOVE    IN,SCR,14           ;STORE AT <XSLSB>
37  0018D'  4806  EOS1:   STI     80,IOX              ;SEND COMPLETE CODE INTO IOX
38  0018E'  C30A          SETF2                       ;NOTIFY IOH
39  0018F'  019A          JUMP    .+1                 ;PAGE ADJUST
40  00190'  A30A          BCN     F2,.                ;WAIT FOR IOH TO RESPOND
41  00191'  3303          MOVE    SCR,IOX,13          ;MSB OF STATUS -<XSMSB>
42  00192'  C30A          SETF2                       ;NOTIFY IOH
43  00193'  A30A          BCN     F2,.                ;WAIT FOR IOH TO RESPOND
```

```
44 00194'  3408         MOVE    SCR,IDX,14    ;STORE AT <XSLSB>
45
46 00195'  013C         JUMP    PMC2
47
48 00196'  2B03  AKCHK: MOVE    SCR,CM,0B     ;GET <ID>
49 00197'  81AB         BEI     1A,PEOS0      ;IS IT ACK ?
50 00198'  894C         BEI     94,PEOS4      ;IS IT NAK ?
51 00199'  019A         JUMP    .+1
52 001 9A' 0316         JUMP    REACK
53 00198'  032E  PEOS0: JUMP    F004
54 00190'  4031  PEOS4: STI     03,IN
55 00190'  018C         JUMP    EOS
56
57 0019E'  4001  BFRD2: STI     00,IN         ;ZERO THE INCREMENTER
58 0019F'  331A         MOVE    IN,SCR,13     ;MSB OF STATUS -<XSMSB>
59 001A0'  341A         MOVE    IN,SCR,14     ;SET LSB OF STATUS IN <XSLSB>
60 001A1'  30A3         MOVE    SCR,CM,1D     ;ERROR INDICATOR -<EI>

001A  NBA2C
 1 001A2'  4051         STI     05,IN         ;PREPARE INVALID ERROR STATUS
 2 001A3'  80C7         BEI     00,NORER      ;NO ERROR?
 3 001A4'  8016         BEI     01,.+2        ;YES, WAS IT A FALSE ALARM
 4 001A5'  0338         JUMP    F006          ;NO GO TO F006
 5 001A6'  017A         JUMP    BFWR3         ;YES,FALSE ALARM. TRY AGAIN
 6 001A7'  4051  NORER: STI     05,IN         ;PREPARE INVALID MESSAGE ID
 7 001A8'  3A03         MOVE    SCR,CM,1A     ;GET THIS <NBAA>
 8 001A9'  6A0B         BER     0A,.+2        ;COMPARE TO MESSAGE DEST.
 9 001AA'  0338         JUMP    F006
10 001AB'  3503         MOVE    SCR,CM,15     ;GET <RNBAA>
11 001AC' 69CF          BER     09,.+2        ;COMPARE IT TO ORIGINATOR
12 001AD' 034D          JUMP    F010
13 001AE' 3703          MOVE    SCR,CM,17     ;GET <SAWFR> FOR COMPARISON
14 001AF' 8019          BEI     01,ACK01      ;
15 001B0' 80BA          BEI     00,CTSCK
16 001B1' 0359          JUMP    F013          ;CHECK SAWFR = 2 OR 3
17 001B2' 2B03  REMOT:  MOVE    SCR,CM,0B     ;PREPARE <ID> FOR COMPARISON
18 001B3' 8A17         BEI     0A1,.+4        ;"YES, I WILL AUTO RESTART"?
19 001B4' 830A         BEI     61,.+2         ;"NO, I CANNOT DO IT"?
20 001B5' 018C         JUMP    EOS
21 001B6' 015D         JUMP    PEOS1
22 001B7' 4001         STI     00,IN          ;PREPARE NO ERROR
23 001B8' 018C         JUMP    EOS
24 001B9' 0196  ACK01:  JUMP    AKCHK         ;GO TO ACK/NAK CHECK
25 001BA' 2B03  CTSCK:  MOVE    SCR,CM,0B     ;GET MESSAGE <ID>
26 001BB' 4001         STI     00,IN
27 001BC' 331A         MOVE    IN,SCR,13      ;<XSMSB> = 0
28 001BD' 01BE         JUMP    .+1
29 001BE' 4131         STI     13,IN
30 001BF' 8257         BEI     25,PEOS2       ;RECEIVED BUFFER BUSY ?
31 001C0' 4111         STI     11,IN
32 001C1' 8897         BEI     89,PEOS2       ;RECEIVED RECEIVE SUSPENDED ?
33 001C2' 40D1         STI     0D,IN
34 001C3' 8467         BEI     46,PEOS2       ;RECEIVED RECEIVE DISABLED ?
35 001C4' 841B         BEI     41,.+4         ;RECEIVED (CNTRO) ?
36 001C5' 813C         BEI     13,XMTXT       ;RECEIVED (CTS) ?
37 001C6' 4051         STI     05,IN
38 001C7' 018C PEOS2:  JUMP    EOS
39 001C8' 03A1         JUMP    CNTRO
40 001C9' 01CA         JUMP    .+1
41 001CA' 01CB         JUMP    .+1
42 001CB' 01CC         JUMP    .+1
43 001CC' 2E21  XMTXT:  MOVE    SCR,IN,0E     ;GET <LSBCE>
44 001CD' 2F1A         MOVE    IN,SCR,0F     ;STORE AT <LSBC>
45 001CE' 2C21         MOVE    SCR,IN,0C     ;GET <MSBCE>
46 001CF' 2D1A         MOVE    IN,SCR,0D     ;STORE AT <MSBC>
47 001D0' 4A41         STI     0A4,IN
48 001D1' 2B1A         MOVE    IN,SCR,0B     ;GET <ID>
49 001D2' 4011         STI     01,IN
50 001D3' 0325         JUMP    F001
51
```

```
10811 NBA2C
01                                      ;*WRITE ROUTINE*
02
03  001D4:  C4CA  WRITE:  CLACT                      ;CLEAR LAI
04  001D5:  CBCA          ZCRC                       ;RESET CRC
05  001D6:  4F71          STI     0F7,IN             ;PREPARE T3 CONSTANT
06  001D7:  C1CA          INCRM
07  001D8:  A1CA          BCN     EQZ,.+2            ;OVERFLOW?
08  001D9:  01D7          JUMP    .-2
09  001DA:  4FC1          STI     0FC,IN             ;LENGTH OF PREAMBLE CONSTANT
10  001DB:  CACA          RELSO                      ;RELEASE SEND
11  001DC:  01DD          JUMP    .+1
12  001DD:  C5CA          PCHON                      ;POSITIVE CHANNEL ON
13  001DE:  C6CA          NCHON                      ;NEGATIVE CHANNEL ON
14  001DF:  4004  PREAM:  STI     00,SHOLD           ;SEND A PREAMBLE WORD
15  001E0:  C1CA          INCRM
16  001E1:  A1CA          BCN     EQZ,.+5            ;OVERFLOW?
17  001E2:  A5C2          BCN     TBMT,.             ;TRANSMIT BUFFER EMPTY?
18  001E3:  A4C5          BCN     LAI,.+2
19  001E4:  0056          JUMP    PANIC              ;DON'T HEAR OUR OWN MESSAGE
20  001E5:  01DF          JUMP    PREAM
21  001E6:  A5C6          BCN     TBMT,.             ;TRANSMIT BUFFER EMPTY
22  001E7:  4014          STI     01,SHOLD           ;SEND SYNC BYTE
23  001E8:  A5CA          BCN     TBMT,.             ;TRANSMIT BUFFER EMPTY?
24  001E9:  2804          MOVE    SCR,SHOLD,0B       ;SEND <IO>
25  001EA:  28CR          MOVE    SCR,CRC,0B         ;CRC IT
26  001EB:  2823          MOVE    SCR,CM,0B          ;GET READY FOR TEXT CHECK
27  001EC:  A5CC          BCN     TBMT,.
28  001ED:  01EE          JUMP    .+1
29  001EE:  01EF          JUMP    .+1
30  001EF:  8A4A          BEI     0A4,TXT            ;IS IT TEXT MESSAGE ?
31  001F0:  4FF1  NTXT:   STI     0FF,IN
32  001F1:  2F1A          MOVE    IN,SCR,0F          ;SET <LSBC>
33  001F2:  2D1A          MOVE    IN,SCR,0D          ;SET <MSBC>
34  001F3:  3504          MOVE    SCR,SHOLD,15       ;SEND <RNBAA>
35  001F4:  3505          MOVE    SCR,CRC,15         ;CRC IT
36  001F5:  A5C5          BCN     TBMT,.
37  001F6:  3A01          MOVE    SCR,IN,1A          ;GET <NBAA>
38  001F7:  039A          JUMP    F015               ;CHECK FOR "NTYPE"
39  001F8:  CACA  TXT:    ZSBUF
40  001F9:  2D04          MOVE    SCR,SHOLD,0D       ;SEND MSB BYTE COUNT -<MSBC>
41  001FA:  2D05          MOVE    SCR,CRC,0D         ;CRC IT
42  001FB:  A52A          BCN     TBMT,.             ;BYTE NEEDED?
43  001FC:  2F04          MOVE    SCR,SHOLD,0F       ;SEND LSB OF BYTE COUNT -<LSBC
44  001FD:  03B5          JUMP    F016
45  001FE:  A53E  PJTXT:  BCN     TBMT,.             ;BYTE NEEDED?
46  001FF:  2021          MOVE    SBUF,IN            ;LOAD THE INCREMENTER
47  00200:  2015  JTXT:   MOVE    IN,CRC             ;CRC IT
48  00201:  2014          MOVE    IN,SHOLD           ;SEND IT
49  00202:  2F21          MOVE    SCR,IN,2F          ;GET LSB OF BYTE COUNT -<LSBC>
50  00203:  C12A          INCRM
51  00204:  2F1A          MOVE    IN,SCR,0F          ;WRITE IT BACK
52  00205:  A127          BCN     EQZ,.+2            ;OVERFLOW?
53  00206:  01FE          JUMP    PJTXT
54  00207:  2D21          MOVE    SCR,IN,2D          ;GET MSB OF BYTE COUNT -<MSBC>
55  00208:  C12A          INCRM
56  00209:  2D1A          MOVE    IN,SCR,2D          ;WRITE IT BACK
57  0020A:  A12C          BCN     EQZ,.+2            ;OVERFLOW?
58  0020B:  01FE          JUMP    PJTXT              ;
59  0020C:  4003          STI     00,CM              ;ZERO THE COMPARITOR
60  0020D:  A5CD  WRCRC:  BCN     TBMT,.             ;BYTE NEEDED

0812 NBA2C
01  0020E:  4005          STI     00,CRC             ;KICK OUT THE CRC BYTE
02  0020F:  4FD1          STI     0FD,IN             ;STORE -3 IN INCREMENTER
03  00210:  C1CA          INCRM
04  00211:  A1C4          BCN     EQZ,.+3            ;OVERFLOW?
05  00212:  E0CA          NOP     00
06  00213:  021A          JUMP    .-3
07  00214:  2054          MOVE    CRC,SHOLD          ;SEND CRC BYTE
08  00215:  8FFA          BEI     0FF,.+3            ;IF LAST CRC GO TO POSTAMBLE
09  00216:  4FF3          STI     0FF,CM             ;LOAD COMPARITOR WITH FF
```

```
10 002171  020D             JUMP    WRCRC        ;GO WRITE CRC
 1 002181  0242             JUMP    PSTAM        ;GO WRITE POSTAMBLE
12
13 002191  021A             JUMP    .+1
14 0021A1  4EB1   BFKU1:    STI     0EB,IN       ;PREPARE 24 POSTAMBLE BITS
15 0021B1  C10A             INCRM
16 0021C1  A12E             BCN     EQZ,.+2
17 0021D1  021B             JUMP    .-2
18 0021E1  C70A             DISBD                ;DISSABLE SEND
19 0021F1  4E01   XTRAW:    STI     0E0,IN
20 002201  C10A             INCRM
21 002211  A103             BCN     EQZ,.+2
22 002221  022A             JUMP    .-2
23 002231  C40A             CLACT                ;AGAIN TO BE SURE
24 002241  3F03             MOVE    SCR,CM,1F    ;GET RETURN BYTE <RB1>
25 002251  000F             BEI     0,.+0A
26 002261  001E             BEI     1,.+8
27 002271  002D             BEI     2,.+6
28 002281  003C             BEI     3,.+4
29 002291  004B             BEI     4,.+2
30 0022A1  023A             JUMP    .+8
31 0022B1  024F             JUMP    BFWR4
32 0022C1  017A             JUMP    BFWR3
33 0022D1  014F             JUMP    BFWR2
34 0022E1  0095             JUMP    PIDLE
35 0022F1  00DD             JUMP    BFWR0
36 002301  0054             BEI     05,.+4
37 002311  8063             BEI     06,.+2
38 002321  005A             JUMP    PANIC        ;NON OF THE ABOVE
39 002331  0235             JUMP    PASCV        ;GO TO PASS CONTROL VERIFY
40 002341  0118             JUMP    RESET        ;GO RESET
41
42 002351  C40A   PASCV:    CLACT                ;CLEAR ACTIVITY INDICATOR
43 002361  4A51             STI     0A5,IN       ;80 MICROSEC.T.O.
44 002371  C10A             INCRM
45 002381  A12C             BCN     EQZ,.+4      ;TIME OUT EXHAUSTED?
46 002391  A42B             BCN     LAI,.+2      ;LINE ACTIVITY?
47 0023A1  0237             JUMP    .-3          ;GO BUMP COUNT
48 0023B1  0095             JUMP    PIDLE        ;GO TO PRE-IDLE
49 0023C1  3201             MOVE    SCR,IN,12    ;PASS CONTROL COUNTER -<PCC>
50 0023D1  C10A             INCRM
51 0023E1  321A             MOVE    IN,SCR,12    ;PUT IT BACK
52 0023F1  A101             BCN     EQZ,.+2      ;THREE TRIES YET?
53 002401  0344             JUMP    F009         ;DID PASS IT TO OURSELVES?
54 002411  0095             JUMP    PIDLE        ;GO TO PRE-IDLE
55
56 002421  A522   PSTAM:    BCN     TBMT,.       ;BYTE NEEDED?
57 002431  4004             STI     00,SHOLD     ;YES, SEND BYTE OF ZERO
58 002441  4011             STI     01,IN
59 002451  0203             JUMP    KUPD         ; GO TO K-UPDATE
60

0013 NDA2C
41

10014 NDA2C
01                                               ;*RECEIVE ROUTINE*
02
03 002461  4016   SRS:      STI     01,IOX       ;DEPOSIT RTS INTO IOX
04 002471  C30A             SETF2                ;SET F2
05 002481  A33A             BCN     F2,.
06 002491  285A             MOVE    IOX,SCR,0H   ;GOOD,DEPOSIT THE <ID>
07 0024A1  2901             MOVE    SCR,IN,09    ;ORG OF LAST MESSAGE -<ORG>
08 0024B1  351A             MOVE    IN,SCR,15    ;MAKE IT DESTINATION -<RNBAA>
09 0024C1  4041             STI     04,IN        ;PREPARE 04 AS RETURN BYTE
10 0024D1  3F1A             MOVE    IN,SCR,1F    ;STORE IT IN <RB1>
11 0024E1  03C7             JUMP    F020
12
13 0024F1  2BC3   BFWR4:    MOVE    SCR,CM,0B    ;GET <ID> TO BE COMPARED
14 002501  8132             BEI     13,.+2       ;WAS IT CTS
15 002511  0095             JUMP    PIDLE
16 002521  0340             JUMP    F008         ;GO SET ACK/NAK TO NAK
```

```
17 00253  E00A TOL1:  NOP   0
18 00254  C13A        INCRM
19 00255  A10D        BCN   EQZ,NDARR    ;OVERFLOW?
20 00256  A70A        BCN   DA,.+2       ;DATA ARRIVING?
21 00257  0253        JUMP  TOL1
22 00258  4041 DARRV: STI   04,IN        ;PREPARE 04 TO BE RETURN BYTE
23 00259  3F1A        MOVE  IN,SCR,1F    ;STORE IT IN LOCATION <RB1>
24 0025A  4011        STI   01,IN        ;SET THE INCREMENTER=01
25 0025B  3E1A        MOVE  IN,SCR,1E    ;<CB1> = "TEXT IS EXPECTED"
26 0025C  027E        JUMP  READ
27
28 0025D  4191 NDARR: STI   19,IN        ;PREPARE ERROR CODE 03
29 0025E  3D1A        MOVE  IN,SCR,1D    ;STORE IT IN <EI>
30 0025F  4816 BFRD4: STI   81,IOX       ;DEPOSIT CODE 81 IN IOX
31 00260  C30A        SETF2
32 00261  A301        BCN   F2,.         ;DID IOH RESPOND YET?
33 00262  3D26        MOVE  SCR,IOX,1D   ;PASS <EI> TO IOH
34 00263  C30A        SETF2              ;NOTIFY IOH
35 00264  A304        BCN   F2,.         ;RESPOND YET?
36 00265  2906        MOVE  SCR,IOX,09   ;PASS <RNOAA>
37 00266  C30A        SETF2              ;NOTIFY IOH
38 00267  A307        BCN   F2,.         ;RESPOND YET?
39 00268  2C06        MOVE  SCR,IOX,0C   ;MSB OF BYTE COUNT -<MSBCE>
40 00269  C30A        SETF2              ;NOTIFY IOH
41 0026A  A30A        BCN   F2,.
42 0026B  2E06        MOVE  SCR,IOX,0E   ;LSB OF BYTE COUNT -LSBCE>
43 0026C  C30A        SETF2
44 0026D  A30D        BCN   F2,.         ;FINAL RESPONSE?
45 0026E  3D23        MOVE  SCR,CM,1D    ;GET <EI>
46 0026F  8031        BEI   3,.+2        ;WAS A TIMEOUT ERROR
47 00270  0272        JUMP  .+2          ;
48 00271  0095        JUMP  PIDLE        ;GO IDLE. GOOD LUCK NEXT TIME
49 00272  41A1        STI   1A,IN        ;PREPARE ACK ID
50 00273  8037        BEI   00,ACK       ;WAS IT A GOOD MESSAGE?
51 00274  81B6        BEI   1B,NAK       ;WAS THE CRC WRONG
52 00275  0095        JUMP  PIDLE        ;GO IDLE
53 00276  4941 NAK:   STI   94,IN        ;PREPARE NACK ID
54 00277  2B1A ACK:   MOVE  IN,SCR,0B    ;STORE IT IN THE <ID> FIELD
55 00278  0330        JUMP  F007
56 00279  3F1A        MOVE  IN,SCR,1F    ;<RB1> = 1
57 0027A  01D4        JUMP  WRITE
58

;RB15 NBA2C
01                                ;*READ ROUTINE*
02
03 0027B  027C        JUMP  .+1
04 0027C  027D        JUMP  .+1
05 0027D  027E        JUMP  .+1
06 0027E  CB0A READ:  ZCRC               ;ZERO THE CRC
07 0027F  4005        STI   00,CRC       ;RESET RBA FLAG
08 00280  A604        BCN   RBA,.+4      ;BYTE READY?
09 00281  A70A        BCN   DA,.-1       ;DATA STILL ARIVING?
10 00282  41F1 FIRD1: STI   1F,IN        ;ERROR =(TRANSMISSION ABORTED)
11 00283  0282        JUMP  FIRD         ;JUMP TO FINISH READ
12 00284  2045        MOVE  RHOLD,CRC    ;CRC IT
13 00285  2043        MOVE  RHOLD,CM     ;MOVE SAME TO COMPARISON
14 00286  3E01        MOVE  SCR,IN,1E    ;<CB1> SETS MESSAGE TYPE
15 00287  9A4B        BEI   0A4,MTXT     ;IS MESSAGE TEXT?
16 00288  A10D        BCN   EQZ,MNTXT    ;NON TEXT MESSAGE EXPECTED?
17 00289  41D1 FIRD2: STI   1D,IN        ;ERROR =(INVALID MESSAGE TYPE)
18 0028A  0282        JUMP  FIRD         ;JUMP TO FINISH READ
19 0028B  A10A MTXT:  BCN   EQZ,.-2
20 0028C  032A        JUMP  F002         ;JUMP TO START TEXT
21 0028D  284A MNTXT: MOVE  RHOLD,SCR,0B ;STORE MESSAGE AT <ID>
22 0028E  028F        JUMP  .+1
23 0028F  029A        JUMP  .+1
24 00290  A6C4        BCN   RBA,.+4      ;BYTE READY?
25 00291  A70A        BCN   DA,.-1       ;DATA STILL ARRIVING?
26 00292  41F1 FIRD3: STI   1F,IN        ;ERROR =(TIMEOUT)
27 00293  0282        JUMP  FIRD
```

```
28 002941   2045            MOVE    RHOLD,CRC       ;CRC THE BYTE
29 002951   2A4A            MOVE    RHOLD,SCR,0A    ;STORE DESTINATION IN <DEST>
30 002961   A6CA            BCN     RBA,.+3         ;BYTE READY?
31 002971   A7CR            BCN     DA,.-1          ;DATA STILL ARRIVING?
32 002981   0292            JUMP    FIRD3           ;JUMP TO FINISH READ 3
33 002991   2045            MOVE    RHOLD,CRC       ;CRC THE BYTE
34 0029A1   294A            MOVE    RHOLD,SCR,09    ;STORE ORIGINATOR # IN <ORG>
35 0029B1   4FF1  PRECRC:   STI     0FF,IN          ;PREPARE FOR CRC
36 0029C1   2F1A            MOVE    IN,SCR,0F       ;STORE BYTE IN <LSBC>
37 0029D1   C29E            JUMP    .+1
38 0029E1   C29F            JUMP    .+1
39 0029F1   C2A0            JUMP    .+1
40 002A01   A6C3  RDCRC:    BCN     RBA,.+3         ;BYTE READY?
41 002A11   A7CR            BCN     DA,.-1          ;DATA STILL ARRIVING?
42 002A21   0292            JUMP    FIRD3           ;
43 002A31   4005            STI     00,CRC          ;PUT 00 INTO CRC
44 002A41   234A            MOVE    RHOLD,SCR,03    ;STORE CRC BYTE IN <CRCBT>
45 002A51   4FC1            STI     0FC,IN          ;STORE 2 MICRO SEC TIME
46 002A61   C1CA            INCRM
47 002A71   A1CR            BCN     EOZ,.+2         ;TIME LAPSED?
48 002A81   C2A6            JUMP    .-2             ;NO JUMP BACK
49 002A91   2053            MOVE    CRC,CM          ;GET CRC OUT TO COMPARE
50 002AA1   53CD            BER     03,.+3          ;CHECK FOR EQUALITY
51 002AB1   4191            STI     1B,IN           ;ERROR *(CRC ERROR)
52 002AC1   0282            JUMP    FIRO            ;
53 002AD1   2F01            MOVE    SCR,IN,0F       ;GET <LSBC>
54 002AE1   C1CA            INCRM
55 002AF1   2F1A            MOVE    IN,SCR,0F       ;WRITE IT BACK
56 002B01   A1C4            BCN     EOZ,.+4         ;IS IT THE FIRST CRC?
57 002B11   4001            STI     00,IN           ;PREPARE A NO ERROR INDICATOR
58 002B21   3D1A  FIRD:     MOVE    IN,SCR,10       ;STORE IT IN <EI>
59 002B31   02C2            JUMP    KUPD1
60 002B41   02A0            JUMP    RDCRC           ;BACK TO GET SECOND CRC

0016 NBA2C
01
02 002B51   A6CA  STTXT:    BCN     RBA,.+3         ;BYTE READY?
03 002B61   A7C5            BCN     DA,.-1          ;DATA STILL ARRIVING?
04 002B71   0292            JUMP    FIRD3           ;
05 002B81   2045            MOVE    RHOLD,CRC       ;CRC THE BYTE
06 002B91   2D4A            MOVE    RHOLD,SCR,0D    ;BYTE TO BE EXHAUSTED -<MSBCE>
07 002BA1   2C4A            MOVE    RHOLD,SCR,0C    ;BYTE TO REMAIN -<MSBC>
08 002BB1   A6CE            BCN     RBA,.+3         ;BYTE READY?
09 002BC1   A7CR            BCN     DA,.-1          ;DATA STILL ARRIVING?
10 002BD1   0292            JUMP    FIRD3           ;
11 002BE1   2045            MOVE    RHOLD,CRC       ;CRC THE BYTE
12 002BF1   2F4A            MOVE    RHOLD,SCR,0F    ;BYTE TO BE EXHAUSTED -<LSBCE>
13 002C01   038D            JUMP    F017
14 002C11   A6C4  MDTXT:    BCN     RBA,.+3         ;BYTE READY?
15 002C21   A701            BCN     DA,.-1          ;DATA STILL ARRIVING?
16 002C31   0292            JUMP    FIRD3           ;
17 002C41   2045            MOVE    RHOLD,CRC
18 002C51   2042            MOVE    RHOLD,RBUF      ;WRITE IT IN RECEIVE BUFFER
19 002C61   2F01            MOVE    SCR,IN,0F       ;GET LS BYTE COUNT -<LSBCE>
20 002C71   C1CA            INCRM
21 002C81   2F1A            MOVE    IN,SCR,0F       ;WRITE IT BACK -<LSBCE>
22 002C91   A1CR            BCN     EOZ,.+2         ;IS IT EQUAL TO ZERO
23 002CA1   02C1            JUMP    MDTXT           ;CONTINUE
24 002CB1   2001            MOVE    SCR,IN,0D       ;GET MS BYTE COUNT -<MSBCE>
25 002CC1   C1CA            INCRM
26 002CD1   201A            MOVE    IN,SCR,0D       ;WRITE IT BACK -<MSBCE>
27 002CE1   02CF            JUMP    .+1
28 002CF1   A101            BCN     EOZ,.+2         ;WAS IT THE LAST BYTE
29 002D01   02C1            JUMP    MDTXT           ;CONTINUE
30 002D11   C29B            JUMP    PRECRC          ;
31
32 002D21   4001  KUPD1:    STI     00,IN           ;RETURN BYTE FOR K*TH COUNT
33 002D31   381A  KUPD:     MOVE    IN,SCR,1B       ;STORE RETURN BYTE IN <RB2>
34 002D41   3CC3            MOVE    SCR,CM,1C       ;GET <K1>
35 002D51   8017            BEI     01,.+2          ;IS <K1> ON?
36 002D61   02C8            JUMP    .+2             ;
```

```
37 002D7'  02EF           JUMP   KUEX         ;GO TO K UPDATE EXIT
38 002D8'  2601           MOVE   SCR,IN,06    ;GET <KB3>
39 002D9'  C130           INCRM
40 002DA'  2610           MOVE   IN,SCR,06    ;WRITE IT BACK
41 002DB'  A130           BCN    EQZ,.+2      ;OVERFLOW?
42 002DC'  02EF           JUMP   KUEX         ;GO TO K UPDATE EXIT
43 002DD'  2501           MOVE   SCR,IN,05    ;GET <KB2>
44 002DE'  C120           INCRM
45 002DF'  2510           MOVE   IN,SCR,05    ;WRITE IT BACK
46 002E0'  A122           BCN    EQZ,.+2      ;OVERFLOW SECOND BYTE?
47 002E1'  02EF           JUMP   KUEX         ;NO,GO TO K UPDATE EXIT
48 002E2'  02E7           JUMP   .+5
49 002E3'  02E4           JUMP   .+1
50 002E4'  02E5           JUMP   .+1
51 002E5'  02E6           JUMP   .+1
52 002E6'  02E7           JUMP   .+1
53 002E7'  4011           STI    01,IN        ;PREPARE K1 BYTE
54 002E8'  3C10  INIT2:   MOVE   IN,SCR,1C    ;STORE <K1> BYTE
55 002E9'  4471           STI    47,IN        ;INITIAL <KB3>
56 002EA'  2610           MOVE   IN,SCR,06    ;STORE IT IN <KB3> (LSB)
57 002EB'  4E41           STI    0E4,IN       ;INITIAL <KB2>
58 002EC'  2510           MOVE   IN,SCR,05    ;STORE IT IN <KB2> (MSB)
59 002ED'  02EF           JUMP   .+1
60 002EE'  02EF           JUMP   .+1

0017 NBA2C
01 002EF'  3B03  KUEX:    MOVE   SCR,CM,1B    ;CALL RETURN BYTE =<RB2>
02 002F0'  80C8           BEI    00,.+8
03 002F1'  8017           BEI    01,.+6
04 002F2'  8026           BEI    02,.+4
05 002F3'  8035           BEI    03,.+2
06 002F4'  C056           JUMP   PANIC
07 002F5'  0130           JUMP   BFKU3
08 002F6'  C00B           JUMP   BFKU2
09 002F7'  021A           JUMP   BFKU1
10 002F8'  3F03           MOVE   SCR,CM,1F    ;GET <RB1>
11 002F9'  A70P           BCN    0A,.
12 002FA'  02FB           JUMP   .+1
13 002FB'  02FC           JUMP   .+1
14 002FC'  02FD           JUMP   .+1
15 002FD'  02FE           JUMP   .+1
16 002FE'  02FF           JUMP   .+1
17 002FF'  8005  RDEXT:   BEI    0,.+6        ;RETURN BYTE =0?
18 00300'  8016           BEI    1,.+6        ;RETURN BYTE =1?
19 00301'  8027           BEI    2,.+6        ;RETURN BYTE =2?
20 00302'  8038           BEI    3,.+6        ;RETURN BYTE =3?
21 00303'  8049           BEI    4,.+6        ;RETURN BYTE =4?
22 00304'  C056           JUMP   PANIC
23 00305'  C0F5           JUMP   BFRD0
24 00306'  C056           JUMP   PANIC
25 00307'  019E           JUMP   BFRD2
26 00308'  C056           JUMP   PANIC
27 00309'  025F           JUMP   BFRD4
28 0030A'  030B           JUMP   .+1
29 0030B'  030C           JUMP   .+1
30 0030C'  030D           JUMP   .+1
31 0030D'  030E           JUMP   .+1
32 0030E'  030F           JUMP   .+1
33 0030F'  0310           JUMP   .+1
34 00310'  0311           JUMP   .+1
35 00311'  0312           JUMP   .+1
36 00312'  0313           JUMP   .+1
37 00313'  0314           JUMP   .+1
38 00314'  0315           JUMP   .+1
39 00315'  0316           JUMP   .+1

41 00316'  40E3  REACK:   STI    0E,CM        ;PREPARE FOR COMPARISON
42 00317'  2201           MOVE   SCR,IN,02    ;GET <REACK> COUNT
43 00318'  C130           INCRM
44 00319'  2210           MOVE   IN,SCR,02    ;PUT IT BACK
45 0031A'  620F           BER    02,NOACK     ;8 TRYS YET?
```

```
46 00318!  C109         INCRM
47 00310!  2210         MOVE    IN,SCR,02       ;PUT IT BACK
48 0031D!  C20F         BER     02,NOACK        ;8 TRYS YET?
49 0031E!  0321         JUMP    .+3
50 0031F!  4091 NOACK:  STI     09,IN           ;YES, REPORT NO ACK ERROR
51 00320!  018C         JUMP    EOS
52 00321!  42A1         STI     2A,IN
53 00322!  2819         MOVE    IN,SCR,0B       ;<ID> = REACK
54 00323!  4011         STI     01,IN           ;GO SET <SAWFR> = 01
55 00324!  0166         JUMP    JOIN            ;GO SEND REACK MESSAGE
56
57 00325!  3719 F001:   MOVE    IN,SCR,17       ;SET <SAWFR>
58 00326!  4001         STI     00,IN           ;SET REACK COUNT TO ZERO
59 00327!  2210         MOVE    IN,SCR,02       ;GET <REACK>
60 00328!  0167         JUMP    JOIN+1

0818 NUA2C
01
02 00329!  C909 F002:   ZRBUF                   ;ZERO RECEIVE BUFFER POINTER
03 0032A!  0285         JUMP    STTXT
04
05 0032B!  03E3 F003:   JUMP    F021            ;OOPS!
06 0032C!  032C         JUMP    .
07 0032D!  032D         JUMP    .
08
09 0032E!  2201 F004:   MOVE    SCR,IN,02       ;GET <REACK>
10 0032F!  019C         JUMP    EOS
11
12 00330!  82A2 F005:   BEI     2A,.+2          ;IS IT REACK?
13 00331!  0377         JUMP    F014            ;CHECK FOR "GTYPE" MESSAGE
14 00332!  2901         MOVE    SCR,IN,09       ;GET <ORG>
15 00333!  2013         MOVE    IN,CM
16 00334!  7506         BER     15,.+2          ;IS ORG THE SAME AS DEST?
17 00335!  0A95         JUMP    PIDLE           ;NO GO IDLE
18 00336!  2401         MOVE    SCR,IN,04       ;YES, GET LATEST <ACKNAK>
19 00337!  2819         MOVE    IN,SCR,0B       ;MAKE IT <ID>
20 00338!  033E         JUMP    F007+1          ;
21
22 00339!  4013 F006:   STI     01,CM           ;
23 0033A!  770C         BER     17,.+2          ;IS SAWFR = 01 ?
24 0033B!  018C         JUMP    EOS             ;NO
25 0033C!  0316         JUMP    REACK           ;YES
26
27 0033D!  2419 F007:   MOVE    IN,SCR,04       ;SAVE <ACKNAK>
28 0033E!  4011         STI     01,IN           ;RETURN BYTE = 1
29 0033F!  0279         JUMP    ACK+2           ;
30
31 00340!  4941 F008:   STI     94,IN           ;PREPARE NAK ID
32 00341!  2419         MOVE    IN,SCR,04       ;PUT IT IN <ACKNAK>
33 00342!  4221         STI     22,IN           ;PREPARE T.O. CONSTANT
34 00343!  0253         JUMP    TOL1            ;
35
36 00344!  3901 F009:   MOVE    SCR,IN,19       ;GET <NNR>
37 00345!  2013         MOVE    IN,CM
38 00346!  7A0B         BER     1A,.+2          ;OUR OWN NODE NUMBER?
39 00347!  0158         JUMP    PASCN+2         ;TRY PASSING CONTROL AGAIN
40 00348!  4701         STI     70,IN           ;80 MICRO SEC DELAY
41 00349!  C109         INCRM
42 0034A!  A19C         BCN     EOZ,.+2
43 0034B!  0349         JUMP    .-2
44 0034C!  0137         JUMP    PHC1            ;DELAY OVER
45
46 0034D!  3733 F010:   MOVE    SCR,CM,17       ;GET <SAWFR>
47 0034E!  034F         JUMP    .+1             ;ADDRESS ADJUST
48 0034F!  8031         BEI     03,.+2          ;= 3?
49 00350!  0339         JUMP    F006
50 00351!  035E         JUMP    TYPCK           ;YES, SAWFR = 3
51
52 00352!  4001 F011:   STI     00,IN
53 00353!  3119         MOVE    IN,SCR,11       ;SET DEFAULT <NTYPE> = 0
54 00354!  03ED         JUMP    F023
```

```
55
 56  00355'   2DC3 F012:   MOVE    SCR,CM,0D       ;MSB BYTE COUNT -<MSBCE>
 57  00356'   08CA         BEI     8C,SETTP        ;SPECIAL  -SET NODE TYPE-
 58  00357'   84CF         BEI     4C,GETTP        ;SPECIAL  -GET NODE TYPE-
 59  00358'   4881         STI     98,IN           ;PREPARE FOR RTS
 60  00359'   0175         JUMP    PREJN

0019 NBA2C
 01  0035A'   4201 SETTP:  STI     20,IN
 02  0035B'   331A         MOVE    IN,SCR,13       ;SET <XSMSB>
 03  0035C'   2F01         MOVE    SCR,IN,0F       ;GET <LSBCE>
 04  0035D'   311A         MOVE    IN,SCR,11       ;SET <NTYPE>
 05  0035E'   018C         JUMP    EOS
 06  0035F'   3503 GETTP:  MOVE    SCR,CM,15       ;GET <DEST>
 07  00360'   7A02         BER     1A,OURTP        ;ARE WE DESTINATION?
 08  00361'   036B         JUMP    REMTP
 09  00362'   3101 OURTP:  MOVE    SCR,IN,11       ;YES, GET <NTYPE>
 10  00363'   341A         MOVE    IN,SCR,14       ;LSB STATUS -<XSLSB>
 11  00364'   0374         JUMP    TWENTY          ;SET MSB STATUS
 12  00365'   4111 REMTP:  STI     11,IN           ;"GTYPE" ID
 13  00366'   281A         MOVE    IN,SCR,0B       ;<ID>
 14  00367'   4031         STI     03,IN           ;GO SET <SAWFR> = 3
 15  00368'   016A         JUMP    JOIN
 16
 17  00369'   882C F013:   BEI     2,RESCK         ;<SAWFR> = 2 ?
 18  0036A'   803E         BEI     3,TYPECK        ;<SAWFR> = 3?
 19  0036B'   005A         JUMP    PANIC
 20  0036C'   4051 RESCK:  STI     05,IN           ;INVALID MESSAGE ERROR
 21  0036D'   0182         JUMP    REMOT
 22  0036E'   2B03 TYPECK: MOVE    SCR,CM,0B       ;GET <ID>
 23  0036F'   8212         BEI     21,.+3          ;"NTYPE" MESSAGE
 24  00370'   4051         STI     05,IN
 25  00371'   018C         JUMP    EOS
 26  00372'   2901         MOVE    SCR,IN,09'      ;<ORG> (REALLY IT'S "NTYPE")
 27  00373'   341A         MOVE    IN,SCR,14       ;LSB STATUS -<XSLSB>
 28  00374'   4201 TWENTY: STI     20,IN
 29  00375'   331A         MOVE    IN,SCR,13       ;<XSMSB> = 20
 30  00376'   018D         JUMP    EOS1
 31
 32  00377'   811A F014:   BEI     11,.+2          ;IS IT "GTYPE"
 33  00378'   0095         JUMP    PIDLE
 34  00379'   4211         STI     21,IN           ;YES
 35  0037A'   281A         MOVE    IN,SCR,0B       ;SET <ID>
 36  0037B'   2901         MOVE    SCR,IN,09       ;GET <ORG>
 37  0037C'   351A         MOVE    IN,SCR,15       ;MAKE IT DESTINATION -<RNBAA>
 38  0037D'   4011         STI     01,IN           ;RB1 = 1
 39  0037E'   3F1A         MOVE    IN,SCR,1F       ;SET <RB1>
 40  0037F'   0104         JUMP    WRITE
 41
 42  00380'   2B03 F015:   MOVE    SCR,CM,0B       ;GET <ID>
 43  00381'   8213         BEI     21,.+2          ;"NTYPE" ?
 44  00382'   0220         JUMP    JTXT
 45  00383'   3101         MOVE    SCR,IN,11       ;GET <NTYPE>
 46  00384'   0220         JUMP    JTXT
 47
 48  00385'   2F2B F016:   MOVE    SCR,CRC,0F      ;CRC <LSBCE>
 49  00386'   2F01         MOVE    SCR,IN,0F       ;LSB BYTE COUNT
 50  00387'   A129         BCN     EQZ,.+2         ;= 0 ?
 51  00388'   01FF         JUMP    PJTXT           ;NOT A ZERO LENGTH MESSAGE
 52  00389'   2001         MOVE    SCR,IN,0D       ;MSB BYTE COUNT -<MSBCE>
 53  0038A'   A12C         BCN     EQZ,.+2         ;= 0 ?
 54  0038B'   01FF         JUMP    PJTXT           ;NOT A ZERO LENGTH MESSAGE
 55  0038C'   022C         JUMP    WRCRC-1         ;ZERO LENGTH MESSAGE
 56
 57  0038D'   2E4A F017:   MOVE    RHOLD,SCR,0E    ;LS BYTE TO REMAIN -<LSBC>
 58  0038E'   2F01         MOVE    SCR,IN,0F       ;LS BYTE COUNT -<LSBCE>
 59  0038F'   A101         BCN     EQZ,.+2         ;= 0 ?
 60  00390'   02C1         JUMP    MOTXT           ;NOT ZERO LENGTH MESSAGE

0020 NBA2C
 01  00391'   2001         MOVE    SCR,IN,0D       ;MSB BYTE COUNT -<MSBCE>
 02  00392'   A104         BCN     EQZ,.+2         ;= 0 ?
```

```
03 003931  02C1          JUMP   MDTXT           ;NOT ZERO LEGNTH MESSAGE
04 003941  029A          JUMP   PRECRC          ;ZERO LEGNTH MESSAGE
05
06 003951  2103 FO18:    MOVE   SCR,CM,01       ;GET <CNTFLG>
07 003961  4001          STI    00,IN
08 003971  211A          MOVE   IN,SCR,01       ;CLEAR <CNTFLG>
09 003981  8A2B          BEI    02,GRANT        ;HAVE WE GRANTED CONTROL?
10 003991  801C          BEI    01,REQEST       ;HAVE WE REQUESTED CONTROL?
11 0039A1  0137          JUMP   PHC1            ;RECEIVED NORMAL CONTROL
12 0039B1  0157 GRANT:   JUMP   PASCN           ;PASS A NORMAL CONTROL
13 0039C1  4031 REQEST:  STI    03,IN
14 0039D1  211A          MOVE   IN,SCR,01       ;<CNTFLG> = 03 =ACCEPTED
15 0039E1  2901          MOVE   SCR,IN,09       ;GET <ORG> OF PASS CONTROL
16 0039F1  301A          MOVE   IN,SCR,10       ;SET <CONTROL>
17 003A01  0137          JUMP   PHC1
18
19 003A11  2103 CNTRQ:   MOVE   SCR,CM,01       ;GET <CNTFLG>
20 003A21  8004          BEI    00,.+2
21 003A31  03BF          JUMP   RETURN          ;GO RETURN CONTROL
22 003A41  4021          STI    02,IN
23 003A51  211A          MOVE   IN,SCR,01       ;<CNTFLG> = 2 =GRANTED
24 003A61  4006          STI    00,IOX          ;SEND COMPLETE
25 003A71  C3CA          SETF2
26 003A81  A3CA          BCN    F2,.
27 003A91  4006          STI    00,IOX          ;MSB STATUS = 00
28 003AA1  C3CA          SETF2
29 003AB1  A3CA          BCN    F2,.
30 003AC1  4136          STI    13,IOX          ;LSB STATUS = 13
31 003AD1  C3CA          SETF2
32 003AE1  A3CE          BCN    F2,.            ;GET COMMAND
33 003AF1  2063          MOVE   IOX,CM
34 003B01  8002          BEI    00,.+2
35 003B11  0383          JUMP   FAKE            ;
36 003B21  03BA          JUMP   PRERTN
37 003B31  C3CA FAKE:    SETF2
38 003B41  A3C4          BCN    F2,.            ;GET RNBAA
39 003B51  C3CA          SETF2
40 003B61  A3CA          BCN    F2,.            ;GET MSB COUNT
41 003B71  C3CA          SETF2
42 003B81  A3CA          BCN    F2,.            ;GET LSB COUNT
43 003B91  4FC1 PRERTN:  STI    0FC,IN          ;PC COUNT
44 003BA1  321A          MOVE   IN,SCR,12       ;SET <PCC> = -4
45 003BB1  4641          STI    64,IN
46 003BC1  281A          MOVE   IN,SCR,0B       ;SET <ID> = 64
47 003BD1  2A01          MOVE   SCR,IN,09       ;GET <ORG> OF CNTRQ
48 003BE1  03EF          JUMP   F024
49 003BF1  4021 RETURN:  STI    00,IN
50 003C01  211A          MOVE   IN,SCR,01       ;CLEAR <CNTFLG>
51 003C11  4FC1          STI    0FC,IN          ;PC COUNT
52 003C21  321A          MOVE   IN,SCR,12       ;SET <PCC>
53 003C31  4641          STI    64,IN           ;PASS CONTROL ID
54 003C41  2B1A          MOVE   IN,SCR,0B       ;SET <ID> = 64
55 003C51  3A21          MOVE   SCR,IN,10       ;GET <CONTROL>
56 003C61  03EF          JUMP   F024
57
58 003C71  03F6 F020:    JUMP   F026            ;IS <CNTFLG>= 00?
59 003C81  825A          BEI    25,.+2          ;BBSY?
60 003C91  0104          JUMP   WRITE

H021 NUA2C
01 003CA1  4E01          STI    0E0,IN          ;20 MICRO SEC DELAY
02 003CB1  C13A          INCRM
03 003CC1  A1CE          BCN    EQZ,.+2
04 003CD1  03CA          JUMP   .-2
05 003CE1  400A          STI    00,IOX          ;WE HAVE CONTROL
06 003CF1  C3CA          SETF2                  ;
07 003D01  A3CA          BCN    F2,.
08 003D11  2063          MOVE   IOX,CM
09 003D21  8CC4          BEI    02,.+2
10 003D31  C3D5          JUMP   .+2
11 003D41  0104          JUMP   WRITE           ;WE DON'T NEED TO SEND
```

```
  2 003D5'   4011          STI      01,IN
 13 003D6'   211A          MOVE     IN,SCR,01        ;<CNTFLG> = 1 = REQUESTED
 14 003D7'   C3CA          SETF2
 15 003D8'   A3CA          BCN      F2,.
 16 003D9'   C3CA          SETF2
 17 003DA'   C3CA          JUMP     .+1
 18 003DB'   A3CA          BCN      F2,.
 19 003DC'   C3CA          SETF2
 20 003DD'   A3CD          BCN      F2,.
 21 003DE'   4011          STI      01,IN
 22 003DF'   3F1A          MOVE     IN,SCR,1F        ;<RB1> = 1
 23 003E0'   4411          STI      41,IN
 24 003E1'   0B1A          MOVE     IN,SCR,0B        ;<ID> = CNTRO
 25 003E2'   0104          JUMP     WRITE
 26
 27 003E3'   003A F021:    BEI      03,.+3           ;<SAWFR> = 3 ?
 28 003E4'   0017          BEI      01,.+3           ;<SAWFR> = 1 ?
 29 003E5'   0056          JUMP     PANIC
 30 003E6'   018C          JUMP     EOS
 31 003E7'   0316          JUMP     REACK
 32
 33 003E8'   2103 F022:    MOVE     SCR,CM,01        ;GET <CNTFLG>
 34 003E9'   03EA          JUMP     .+1
 35 003EA'   003C          BEI      03,.+2           ;<CNTFLG> = RECEIVED
 36 003EB'   0157          JUMP     PASCN            ;PASS TO UNR
 37 003EC'   03BF          JUMP     RETURN           ;PASS TO MAIN GUY
 38
 39 003ED'   211A F023:    MOVE     IN,SCR,01        ;CLEAR <CNTFLG>
 40 003EE'   0095          JUMP     PIDLE
 41
 42 003EF'   351A F024:    MOVE     IN,SCR,15        ;MAKE IT DEST. =<RNBAA>
 43 003F0'   4051          STI      06,IN            ;<RB1> = 06
 44 003F1'   00D7          JUMP     PWRNT
 45
 46 003F2'   C1CA F025:    INCRM                     ;BUMP COUNTER
 47 003F3'   E0CA          NOP      0                ;TIME DELAY
 48 003F4'   E0CA          NOP      0
 49 003F5'   0152          JUMP     BFWR2+3
 50
 51 003F6'   2103 F026:    MOVE     SCR,CM,01        ;GET <CNTFLG>
 52 003F7'   C02A          BEI      00,.+2           ;<CNTFLG> = 00?
 53 003F8'   0104          JUMP     WRITE            ;NO
 54 003F9'   0B23          MOVE     SCR,CM,0B        ;GET <ID>
 55 003FA'   03CA          JUMP     F020+1
 56
```

00000 TOTAL ERRORS, 00000 PASS 1 ERRORS

3022 NBA2C

```
ACK    000277'    14/50    14/54*   18/29
ACK01  000189'    10/14    10/24*
ADJN   0000D8'     6/04     6/15*
AKCHK  000196'     9/46*   10/24
BCHS   000045'     3/06     3/18*
BFKU1  00021A'    12/14*   17/09
BFKU2  0000D8'     2/15*   17/08
BFKU3  000100'     6/57*   17/07
BFRDA  0000F5'     6/45*   17/23
BFRD2  00019E'     9/57*   17/25
BFRD4  00025F'    14/30*   17/27
BFWRA  0000DD'     6/18*   12/35
BFWR2  00014F'     8/26*   12/33    21/49
BFWR3  000178'     9/14*   10/05    12/32
BFWR4  00024F'    12/31    14/13*
BFWT1  000042'     2/33     3/14*
CNTRO  0003A1'    10/39    22/19*
CONN   0000BF'     3/01     3/10*
CTBMT  000062'     3/22     3/27     3/32    3/54*
CTSCK  0001BA'    10/15    10/25*
DACH1  00007C'     4/11*    4/49
```

| | | | | | | | | |
|---|---|---|---|---|---|---|---|---|
| DACH2 | 000088' | 4/32 | 4/38* | | | | | |
| DACHK | 0000A3' | 5/12 | 5/17* | | | | | |
| DARRV | 000258' | 14/22* | | | | | | |
| DELTA | 000080' | 5/36* | | | | | | |
| ELECT | 0000A0' | 5/16 | 5/22* | | | | | |
| EOS | 00010C' | 8/45 | 9/32 | 9/34 | 9/36* | 9/55 | 10/20 | 10/23 |
| | | 10/38 | 17/51 | 18/10 | 18/24 | 19/05 | 19/26 | 21/38 |
| EOS1 | 00010D' | 9/37* | 19/30 | | | | | |
| ERR1 | 00006C' | 4/05* | 4/47 | | | | | |
| ERR2 | 00007B' | 4/13 | 4/22* | 4/41 | | | | |
| ERR3 | 000079' | 4/10 | 4/20* | | | | | |
| ERR4 | 00006E' | 3/50 | 4/08* | | | | | |
| ERR5 | 000080' | 4/27* | | | | | | |
| FAKE | 0003B3' | 20/35 | 20/37* | | | | | |
| FIRD | 000282' | 15/11 | 15/18 | 15/27 | 15/52 | 16/58* | | |
| FIRD1 | 000282' | 15/10* | | | | | | |
| FIRD2 | 000289' | 15/17* | | | | | | |
| FIRD3 | 000292' | 15/26* | 15/32 | 15/42 | 16/04 | 16/10 | 16/16 | |
| FN10 | 000340' | 15/12 | 18/46* | | | | | |
| FN11 | 000352' | 3/16 | 18/52* | | | | | |
| FN12 | 000355' | 9/09 | 18/56* | | | | | |
| FN13 | 000369' | 10/16 | 19/17* | | | | | |
| FN14 | 000377' | 18/13 | 19/32* | | | | | |
| FN15 | 000380' | 11/38 | 19/42* | | | | | |
| FN16 | 000385' | 11/44 | 19/48* | | | | | |
| FN17 | 00038C' | 15/13 | 19/57* | | | | | |
| FN18 | 000395' | 7/34 | 20/06* | | | | | |
| FN20 | 0003C7' | 14/11 | 20/58* | 21/55 | | | | |
| FN21 | 0003E3' | 18/05 | 21/27* | | | | | |
| FN22 | 0003E8' | 8/18 | 21/33* | | | | | |
| FN23 | 0003ED' | 18/54 | 21/39* | | | | | |
| FN24 | 0003EF' | 8/42 | 20/48 | 20/56 | 21/42* | | | |
| FN25 | 0003F2' | 8/30 | 21/46* | | | | | |
| FN26 | 0003F6' | 20/50 | 21/51* | | | | | |
| FN01 | 000325' | 18/50 | 17/57* | | | | | |
| FN02 | 000320' | 15/20 | 18/02* | | | | | |
| FN03 | 000328' | 9/35 | 18/05* | | | | | |
| FN04 | 00032E' | 9/53 | 18/09* | | | | | |

0023 HBA2C

| | | | | | | | | |
|---|---|---|---|---|---|---|---|---|
| FN05 | 000332' | 7/38 | 18/12* | | | | | |
| FN06 | 000339' | 10/04 | 10/09 | 18/22* | 18/49 | | | |
| FN07 | 00033D' | 14/55 | 18/20 | 18/27* | | | | |
| FN08 | 000340' | 14/16 | 18/31* | | | | | |
| FN09 | 000344' | 12/53 | 18/36* | | | | | |
| GCRC | 00001F' | 2/36* | 3/07 | | | | | |
| GETTP | 00035F' | 18/58 | 19/06* | | | | | |
| GRANT | 00039B' | 20/09 | 20/12* | | | | | |
| HCCHK | 00011E' | 6/53 | 7/29* | | | | | |
| IDLE | 00009A' | 5/08* | 5/19 | | | | | |
| INIT1 | 000029' | 2/34 | 2/42 | 2/48* | 3/47 | 4/37 | 4/44 | 7/27 |
| INIT2 | 0002EC' | 2/13 | 16/54* | | | | | |
| INTCH | 000124' | 7/31 | 7/35* | | | | | |
| INTR1 | 000120' | 7/36 | 7/39* | | | | | |
| INTR2 | 0000FE' | 6/49 | 6/54* | | | | | |
| JOIN | 000106' | 8/54* | 9/12 | 17/55 | 17/60 | 19/15 | | |
| JTXT | 000202' | 11/47* | 19/44 | 19/48 | | | | |
| KUEX | 0002EF' | 16/37 | 16/42 | 16/47 | 17/01* | | | |
| KUPD | 000203' | 12/59 | 16/33* | | | | | |
| KUPD1 | 0002D2' | 15/59 | 16/32* | | | | | |
| LACH | 000091' | 4/03 | 4/46* | | | | | |
| LIST | 000001 | 1/06* | | | | | | |
| LOCAL | 000062' | 3/03 | 3/34* | | | | | |
| LOST | 000088' | 5/38 | 5/41* | 6/20 | 7/18 | | | |
| MAXNC | 00007F | 1/12* | 5/03 | | | | | |
| MAXNO | 00008C | 1/11* | 6/04 | | | | | |
| MNTXT | 0002C1' | 16/14* | 16/23 | 16/29 | 19/60 | 20/03 | | |
| MNTXT | 0002BD' | 15/16 | 15/21* | | | | | |
| MOCMD | 000026' | 2/44* | 3/02 | | | | | |
| MSS | 00015F' | 8/17 | 8/47* | | | | | |

| Symbol | Address | | | | | | |
|---|---|---|---|---|---|---|---|
| MTXT | 000288' | 15/15 | 15/19* | | | | |
| NAK | 000276' | 14/51 | 14/53* | | | | |
| NCH | 00004A' | 3/05 | 3/24* | | | | |
| NDARR | 000250' | 14/19 | 14/28* | | | | |
| NNU | 0000CD' | 6/01* | 6/29 | | | | |
| NOACK | 00031F' | 17/45 | 17/48 | 17/50* | | | |
| NOACT | 0000BE' | 5/40 | 5/45* | | | | |
| NORER | 0001A7' | 10/02 | 10/06* | | | | |
| NTXT | 0001F0' | 11/31* | | | | | |
| OURTP | 000362' | 19/07 | 19/09* | | | | |
| PANIC | 000055' | 2/45 | 3/39* | 3/42 | 6/50 | 11/19 | 12/38 | 17/06 |
| | | 17/22 | 17/24 | 17/26 | 19/19 | 21/29 | | |
| PASCN | 000157' | 8/34 | 8/37* | 18/39 | 20/12 | 21/36 | |
| PASCV | 000235' | 12/39 | 12/42* | | | | |
| PCH | 00004E' | 3/04 | 3/29* | | | | |
| PEOS | 000185' | 9/17 | 9/30* | | | | |
| PEOSA | 000199' | 9/49 | 9/53* | | | | |
| PEOS1 | 000150' | 8/44* | 10/21 | | | | |
| PEOS2 | 0001C7' | 10/30 | 10/32 | 10/34 | 10/38* | | |
| PEOS4 | 00019C' | 9/50 | 9/54* | | | | |
| PHC1 | 000137' | 6/30 | 7/44 | 8/03* | 18/44 | 20/11 | 20/17 |
| PHC2 | 00013C' | 8/06* | 9/46 | | | | |
| PIDLE | 000095' | 5/03* | 5/21 | 5/43 | 6/47 | 6/52 | 7/06 | 12/34 |
| | | 12/48 | 12/54 | 14/15 | 14/48 | 14/52 | 18/17 | 19/33 |
| | | 21/40 | | | | | |
| PINIT | 00005A' | 3/09 | 3/44* | | | | |
| PJTXT | 0001FE' | 11/45* | 11/53 | 11/56 | 19/51 | 19/54 | |
| PLSLN | 00010A' | 6/59 | 7/03 | 7/05 | 7/07* | | |

0024 NBA2C

| Symbol | Address | | | | | | |
|---|---|---|---|---|---|---|---|
| PRD0 | 0000F1' | 5/20 | 6/40* | | | | |
| PRD2 | 000181' | 9/21 | 9/24* | | | | |
| PREAM | 0001DF' | 11/14* | 11/28 | | | | |
| PRECR | 000290' | 15/35* | 16/30 | 20/04 | | | |
| PREJN | 000175' | 9/10* | 16/60 | | | | |
| PRERT | 000380' | 20/36 | 20/43* | | | | |
| PSTAM | 000242' | 12/11 | 12/56* | | | | |
| PURG | 0000D4' | 6/08* | | | | | |
| PWRNT | 0000D7' | 6/11* | 7/53 | 8/26 | 21/44 | | |
| PWT | 0000CC' | 2/16* | 3/12 | | | | |
| RDCRC | 0002A0' | 15/40* | 15/60 | | | | |
| RDEXT | 0002FF' | 17/17* | | | | | |
| REACK | 000316' | 9/52 | 17/41* | 18/28 | 21/31 | | |
| READ | 00027E' | 6/43 | 9/28 | 14/26 | 15/06* | | |
| REMOT | 0001B2' | 18/17* | 19/21 | | | | |
| REMTP | 000365' | 19/08 | 19/12* | | | | |
| REQES | 00039C' | 20/10 | 20/13* | | | | |
| RESCK | 00036C' | 19/17 | 19/20* | | | | |
| RESET | 000116' | 2/46 | 7/20* | 12/40 | | | |
| RETUR | 0003BF' | 20/21 | 20/40* | 21/37 | | | |
| REV | 00008F' | 3/08 | 4/43* | | | | |
| REVNO | 00000C2 | 1/10* | 4/43 | | | | |
| ROM | 000000B | 1/04* | 1/06 | | | | |
| RRACK | 0000EA' | 6/32* | 7/47 | | | | |
| RRS | 00012F' | 7/37 | 7/46* | | | | |
| SEND1 | 00016A' | 8/47 | 8/48 | 8/59* | | | |
| SETTP | 00035A' | 18/57 | 19/01* | | | | |
| SRS | 000246' | 7/45 | 14/03* | | | | |
| SSS | 000142' | 8/14* | | | | | |
| START | 000000 MC | 1/05 | | | | | |
| STELC | 0000B5' | 5/35* | 5/50 | | | | |
| STEX | 0000B7' | 3/37 | 4/06 | 4/09 | 4/21 | 4/23 | 4/28 | 4/34* |
| STNNR | 0000D1' | 6/05* | 6/16 | | | | |
| STRT | 000001' | 2/03 | 2/04* | 6/55 | | | |
| STTXT | 000285' | 16/02* | 16/03 | | | | |
| TOFS | 000097' | 5/05* | | | | | |
| TOLI | 000253' | 14/17* | 14/21 | 18/34 | | | |
| TRAP | 0000E6' | 6/21 | 6/27* | | | | |
| THENT | 000374' | 19/11 | 19/28* | | | | |

| | | | | | | |
|---|---|---|---|---|---|---|
| TXT | 0001F0' | 11/30 | 11/39* | | | |
| TYPEC | 00030E' | 18/50 | 19/18 | 19/22* | | |
| WAIT | 000011' | 2/21* | 2/25 | 2/30 | | |
| WON | 0000C4' | 5/46 | 5/52* | 7/43 | 8/35 | |
| WRCRC | 000200' | 11/60* | 12/18 | 19/55 | | |
| WRITE | 000104' | 6/14 | 6/38 | 8/57 | 11/03* 14/57 19/40 20/60 | |
| | | 21/11 | 21/25 | 21/53 | | |
| XMTXT | 0001CC' | 10/36 | 10/43* | | | |
| XTRAW | 0021F' | 12/19* | | | | |
| ...ST | 000003' FN | 1/06* | | | | |

What is claimed is:

1. A computer network comprising network transmission means and a plurality of computer stations coupled to said network transmission means, each of said computer stations being capable of either acting as an independent work station or transmitting information to any one or more of said other computer stations over said network transmission means or receiving information from any one or more of said other computer stations over said network transmission means, each computer station including a computer and an adapter unit, each computer including an interface unit for interfacing with said adapter unit, each adapter unit including an internal bus and circuitry for interfacing with said network transmission means and along with said other adapter units collectively controlling access to said network transmission means, said circuitry comprising:

a. a microcontroller coupled to said internal bus for controlling the operation of said adapter unit,
   b. data transfer buffers coupled to said internal bus and said interface unit in said computer for transferring data between said adapter unit and said computer,
   c. means coupled to said microcontroller for storing a unique number indicating the address of said adapter unit,
   d. scratch pad memory means in said microcontroller for storing a unique number indicating the address of a next adapter unit to which control of the network transmission means is to be passed,
   e. a digital phase locked loop and data separator coupled to said network transmission means for separating data received into clock and data signals,
   f. a read circuit coupled to the output of said digital phase locked loop and data separator for converting serial data received into parallel data,
   g. a write circuit for converting parallel data from said data transfer buffers to serial form for transmission over said network transmission means,
   h. means for generating a pass control signal over said network transmission means for passing control to said next adapter unit when said adapter unit wishes to relinquish control,
   i. means for generating a signal over said network transmission means indicating that said adapter unit has received control pursuant to a pass control signal,
   j. means for generating a request to access signal over said network transmission means to any one of said other adapter units in order to send or receive data when said adapter unit has control of said network transmission means,
   k. means responsive to a request to access signal received from any one of said other adapter units for generating a first reply signal for accepting said request if said adapter unit is able to accept said request and responding thereto, and
   l. means responsive to a request to access signal received from another adapter unit for generating a second reply signal indicating said adapter unit is unable to accept said request because said data transfer buffers in said adapter unit are full,
   m. said pass control signal generating means responsive to said second reply signal received from any one of said other adapter units for generating a pass control signal over said network transmission means for passing control directly to said adapter unit generating said second reply signal so that said adapter unit generating said second reply signal can unload said data transfer buffers, said pass control signal generating means responsive to the completion of using said network transmission means for unloading said data buffers when control is acquired in response to said second reply signal for generating a pass control signal for passing control back to said adapter unit it received control from so that normal passing sequence can be resumed.

2. The computer network of claim 2 and wherein said pass control signal generating means for generating a pass control signal for passing control to itself when said unique number in said scratch pad memory means is said unique number in said adapter unit.

3. The computer network of claim 1 and wherein said circuitry further includes:

a. means for storing information concerning the type of computer to which said adapter unit is coupled,
   b. means for generating a signal indicative of said information stored in response to a signal received over said network transmission means requesting such information, and
   c. means responsive to a signal received by said microcontroller of said adapter unit for generating an interrogation signal over said network transmission means requesting information as to the type of computer at another computer station.

4. The computer network of claim 1 and wherein said circuitry further includes a receiver circuit coupled to said network transmission means for receiving signals transmitted over said network transmission means and a line activity indicator coupled to the output of said receiver circuit for monitoring said network transmission means for activity.

5. The computer network of claim 4 and wherein said circuitry further includes:

a. a driver circuit coupled to said network transmission means for converting the outgoing signals from said adapter unit to said transmission means to analog levels, and
   b. a receiver ciruict for translating incoming signals received from said network transmission means to digital levels.

6. The computer network of claim 5 and wherein said circuitry further includes:

a. a relay circuit connecting said driver circuit and said receiver circuit to said network transmission means and b. a switch coupled to said relay circuit and said microcontroller for opening and closing said relay circuit.

7. The computer network of claim 6 and wherein said circuitry further includes a message detector coupled to the output of said receiver circuit for detecting the presence of a message on said network transmission means.

8. The computer network of claim 7 and wherein said network transmission means comprises a single electrically continous bi-directional bus.

9. The computer network of claim 8 and wherein said bus is a coaxial cable.

10. An adapter unit for use in interfacing a computer to a computer network transmission means and controlling access of said computer to said computer network transmission means along with other equal adapter units connecting other computers to said computer network transmission means comprising:

a. a microcontroller, b. an internal bus coupled to said microcontroller, c. data transfer buffers coupled to said internal bus and said interface unit in said computer for transferring data between said adapter unit and said computer, d. means coupled to said microcontroller for storing a unique number indicating the address of said adapter unit, e. scratch pad memory means in said microcontroller for storing a unique number indicating the address of a next adapter unit to which control of the network transmission means is to be passed, f. a digital phase locked loop and data separator coupled to said network transmission means for separating data received into clock and data signals, g. a read circuit coupled to the output of said digital phase locked loop and data separator for converting serial data received into parallel data, h. a write circuit for converting parallel data from said data transfer buffers to serial form for transmission over said network transmission means, i. meas for generating a pass control signal over said network transmission means for passing control to said next adapter unit when said adapter unit wishes to relinquish control, j. means for generating a signal over said network transmission means indicating that said adapter unit has received control pursuant to a pass control signal, k. means for generating a request to access signal over said network transmission means to any one of said other adapter units in order to send or receive data when said adapter unit has control of said network transmission means, l. means responsive to a request to access signal received from any one of said other adapter units for generating a first reply signal for accepting said request if said adapter unit is able to accept said request and responding thereto, m. means responsive to a request to access signal received from another adapter unit for generating a second reply signal indicating said adapter unit is unable to accept said request because said data transfer buffers in said adapter unit are full, n. said pass control signal generating means responsive to said second reply signal received from any one of said other adapter unit for generating a pass control signal over said network transmission means for passing control directly to said adapter unit generating said second reply signal so that said adapter unit generating said second reply signal can unload said data transfer buffers, said pass control signal generating means responsive to the completion of using said network transmission means for unloading said data buffers when control is acquired in response to said second reply signal for generating a pass control signal for passing control back to said adapter unit it received control from so that normal passing sequence can be resumed.

11. The adapter unit of claim 10 and wherein said circuitry further includes means for generating a pass control signal for passing control to itself in the absence of a next adapter unit to which control may be passed.

12. The adapter unit of claim 11 and wherein said circuitry further includes means for storing information concerning the type of computer to which the adapter unit is coupled and means responsive to the operation of said adapter unit for generating a signal indicative of said information stored.

13. The adapter unit of claim 12 and further including:

a. a driver circuit coupled to said network transmission means for converting the outgoing signals from said adapter unit to said transmission means to analog levels, and b. a receiver circuit for translating the incoming signals from said network transmission means to digital levels.

14. The adapter unit of claim 13 and further including:

a. a relay circuit connecting said driver circuit and said receiver circuit to said network transmission means, and a switch coupled to said relay circuit and said microcontroller for opening and closing said relay circuit.

15. The adapter unit of claim 14 and wherein said adapter unit further includes a message detector coupled to the output of said receiver circuit for detecting the presence of a message on network transmission means.

16. The adapter unit of claim 15 and wherein said adapter unit further includes line activity indicator coupled to the output of said receiver circuit for detecting activity over said network transmission means.

17. The adapter unit of claim 10 and further including:

a. means responsive to a signal received over said network transmission means for sending a remote restart signal to said computer coupled to said adapter unit to restart said computer, and b. means responsive to a signal received from said microcontroller for sending a remote restart signal over said network transmission means to another station.

18. A method of passing control of a network transmission medium amongst a plurality of adapter units coupled to said network transmission medium, each adapter unit being coupled to a computer and including means for separating data received from the network transmission medium into clock and serial data signals and converting said separated serial data signals into parallel data signals for passing to said computer, the method comprising:

a. storing a unique number in each adapter unit indicating its own address, b. storing a unique number in each adapter unit indicating the address of a next adapter unit to which control is to be passed by said adapter unit, c. generating a pass control signal for passing control to said next adapter unit when an adapter unit in control does not wish to use said network transmission means, d. generating an accept control signal in response to a pass control signal directed to it from another adapter unit, e. generating a request to access signal to access any one of said other adapter units in order to send or receive data, f. generating a first reply signal for accepting a request to access signal if said adapter unit is able to accept said request, g. generating a second reply signal if said adapter unit is unable to accept said request because its buffers are full, h. generating a pass control signal for passing control to said adapter unit generating said second reply signal, and i. generating a pass control signal for passing control back to said adapter unit it received control from after using said network transmission medium for unloading said data transfer buffers if control was acquired in response to said second reply signal.

19. The method of claim 1 and further including passing control to itself if there is no next adapter unit to which control can be passed.

20. The method of claim 1 and further including electing an adapter unit to assume control in the event that control passing ceases.

* * * * *